(12) United States Patent
Mano et al.

(10) Patent No.: US 11,625,155 B2
(45) Date of Patent: Apr. 11, 2023

(54) INFORMATION PROCESSING SYSTEM, USER TERMINAL, METHOD OF PROCESSING INFORMATION

(71) Applicants: Takuro Mano, Kanagawa (JP); Ryo Iwasaki, Tokyo (JP); Hiromasa Koike, Tokyo (JP); Seiya Koura, Kanagawa (JP); Masaaki Kagawa, Tokyo (JP)

(72) Inventors: Takuro Mano, Kanagawa (JP); Ryo Iwasaki, Tokyo (JP); Hiromasa Koike, Tokyo (JP); Seiya Koura, Kanagawa (JP); Masaaki Kagawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/172,176

(22) Filed: Feb. 10, 2021

(65) Prior Publication Data
US 2021/0294483 A1 Sep. 23, 2021

(30) Foreign Application Priority Data

Mar. 23, 2020 (JP) .............................. JP2020-051267
Jan. 13, 2021 (JP) .............................. JP2021-003426

(51) Int. Cl.
*G06F 3/0484* (2022.01)
*G10L 15/26* (2006.01)
*G06F 3/04842* (2022.01)

(52) U.S. Cl.
CPC .......... *G06F 3/04842* (2013.01); *G10L 15/26* (2013.01)

(58) Field of Classification Search
CPC .............................. G06F 3/04842; G10L 15/26
See application file for complete search history.

(56) References Cited

U.S. PATENT DOCUMENTS 8,738,414 B1 * 5/2014 Nagar .................. G06Q 10/103
  705/7.12
8,913,026 B2 * 12/2014 Yoo ......................... G06F 9/452
  345/173

(Continued)

FOREIGN PATENT DOCUMENTS

JP 2008-140089 6/2008
JP 2017-174085 9/2017

(Continued)

OTHER PUBLICATIONS

Office Action dated Feb. 1, 2022 issued with respect to the corresponding Japanese Patent Application No. 2021-003426.
Japanese Office Action for 2021-003426 dated Jun. 14, 2022.

*Primary Examiner* — Daeho D Song
(74) *Attorney, Agent, or Firm* — IPUSA, PLLC

(57) ABSTRACT

An information processing system includes user terminals; and a collaboration work assisting system for assisting a work performable by users. The collaboration work assisting system includes circuitry configured to transmit an action item candidate based on statement data of users to each user terminal. Each user terminal includes another circuitry configured to receive the action item candidate from the collaboration work assisting system; display, on a display, the received action item candidate, and a screen for receiving a registration request for registering an action item selected from the action item candidate, an execution person who will execute the action item, and a due date of the action item; receive a registration operation that requests registering of the action item, execution person, and due date; and request an action item management server, to register the action item, execution person, and due date in response to receiving the registration operation.

8 Claims, 44 Drawing Sheets

(56) References Cited

U.S. PATENT DOCUMENTS

| | | | |
|---|---|---|---|
| 9,535,567 B1* | 1/2017 | Bagrinovskiy | G06F 3/04845 |
| 9,766,849 B2* | 9/2017 | Kim | G06F 3/0346 |
| 10,509,116 B2* | 12/2019 | McLaughlin | G01S 13/0209 |
| 10,779,427 B2* | 9/2020 | Lee | H04M 1/0202 |
| 10,817,782 B1* | 10/2020 | Rando | G06F 40/205 |
| 10,841,174 B1* | 11/2020 | Ely | G02B 27/0172 |
| 10,846,111 B2* | 11/2020 | Dwivedi | G06F 9/453 |
| 10,890,644 B1* | 1/2021 | Berger | G01S 13/74 |
| 11,061,744 B2* | 7/2021 | Louch | G06F 3/03545 |
| 11,119,574 B1* | 9/2021 | Moussette | G06F 3/0412 |
| 11,128,342 B2* | 9/2021 | McLaughlin | G01S 5/12 |
| 11,262,968 B2* | 3/2022 | Tian | G06F 3/1454 |
| 11,363,500 B1* | 6/2022 | Matsimanis | H04W 36/32 |
| 2005/0086230 A1* | 4/2005 | Frees | G06Q 10/10 |
| 2005/0246176 A1* | 11/2005 | Creamer | H04M 3/4938 704/270.1 |
| 2008/0281525 A1* | 11/2008 | Boone | G05B 15/02 702/9 |
| 2009/0284532 A1* | 11/2009 | Kerr | G06F 3/0481 345/442 |
| 2010/0299436 A1* | 11/2010 | Khalid | G06F 3/04886 709/226 |
| 2011/0112819 A1* | 5/2011 | Shirai | G06F 3/1454 703/21 |
| 2011/0276911 A1* | 11/2011 | Choi | G06F 9/452 715/835 |
| 2012/0084663 A1* | 4/2012 | Momchilov | G06F 3/1454 715/744 |
| 2012/0150577 A1* | 6/2012 | Berg | G06Q 10/0631 705/342 |
| 2012/0315887 A1* | 12/2012 | Konishi | H04M 1/72415 455/420 |
| 2013/0060594 A1* | 3/2013 | Motoyama | G06Q 10/1097 705/7.21 |
| 2013/0080201 A1* | 3/2013 | Miller | G06Q 10/00 705/7.15 |
| 2013/0179825 A1* | 7/2013 | Seo | H04L 67/025 715/778 |
| 2013/0234984 A1* | 9/2013 | Yoo | H04N 21/4222 345/174 |
| 2013/0252600 A1* | 9/2013 | Seo | G06F 3/023 455/420 |
| 2014/0052728 A1* | 2/2014 | Nakazawa | G06F 16/285 707/737 |
| 2014/0229852 A1* | 8/2014 | Lee | G06F 3/1423 715/748 |
| 2015/0120817 A1* | 4/2015 | Jeong | H04L 67/10 709/203 |
| 2015/0201234 A1* | 7/2015 | Hayakawa | G06F 13/00 725/35 |
| 2016/0063852 A1* | 3/2016 | Ishizawa | G08B 31/00 340/540 |
| 2016/0103653 A1* | 4/2016 | Jang | H03G 3/02 381/107 |
| 2016/0112839 A1* | 4/2016 | Choi | H04W 4/80 455/41.2 |
| 2016/0155442 A1* | 6/2016 | Kannan | G10L 15/22 704/275 |
| 2016/0224939 A1* | 8/2016 | Chen | G06Q 10/06311 |
| 2016/0226854 A1* | 8/2016 | Chen | G06Q 10/101 |
| 2016/0249006 A1* | 8/2016 | Park | H04N 21/42204 |
| 2016/0259531 A1* | 9/2016 | Cho | G06Q 20/321 |
| 2016/0306762 A1* | 10/2016 | Lee | H02J 50/10 |
| 2016/0364200 A1* | 12/2016 | Beveridge | H04L 12/4633 |
| 2017/0085293 A1* | 3/2017 | Marrow | H04B 1/71637 |
| 2017/0085854 A1* | 3/2017 | Furesjo | G06F 3/0485 |
| 2017/0220997 A1* | 8/2017 | Shima | H04L 65/403 |
| 2017/0278073 A1* | 9/2017 | Anjo | G06Q 10/1097 |
| 2017/0344535 A1* | 11/2017 | Shima | G09G 3/025 |
| 2017/0351531 A1* | 12/2017 | Li | G06F 3/1454 |
| 2017/0357477 A1* | 12/2017 | Im | H04W 76/10 |
| 2018/0060818 A1* | 3/2018 | Ishiyama | G06Q 10/0635 |
| 2018/0063332 A1* | 3/2018 | Ishiyama | H04M 3/42382 |
| 2018/0101281 A1* | 4/2018 | Nelson | G06Q 10/10 |
| 2018/0139405 A1* | 5/2018 | Baek | H04N 21/84 |
| 2018/0176269 A1* | 6/2018 | Griffin | H04L 65/403 |
| 2018/0284967 A1* | 10/2018 | Lee | G06F 3/04812 |
| 2019/0089838 A1 | 3/2019 | Ishiyama et al. | |
| 2019/0156788 A1* | 5/2019 | Lee | H04M 1/72409 |
| 2019/0220500 A1* | 7/2019 | Dhaundiyal | G06F 3/048 |
| 2019/0306321 A1 | 10/2019 | Ishiyama et al. | |
| 2019/0324963 A1* | 10/2019 | Mano | G06F 16/2477 |
| 2019/0327104 A1* | 10/2019 | Kagawa | G06Q 10/06313 |
| 2019/0347069 A1* | 11/2019 | Park | G06F 3/167 |
| 2020/0034387 A1* | 1/2020 | Kagawa | G10L 21/10 |
| 2020/0154583 A1* | 5/2020 | Lee | H05K 5/0247 |
| 2020/0175991 A1* | 6/2020 | Mano | G11B 27/34 |
| 2020/0273464 A1* | 8/2020 | Kagawa | G06F 3/1454 |
| 2020/0302344 A1* | 9/2020 | Just | G06F 21/34 |
| 2020/0356722 A1* | 11/2020 | Mano | G06F 3/167 |
| 2021/0097502 A1* | 4/2021 | Hilleli | G06N 3/0454 |
| 2021/0099317 A1* | 4/2021 | Hilleli | H04L 12/1822 |
| 2021/0166685 A1* | 6/2021 | Myoga | G06V 40/174 |
| 2021/0294484 A1* | 9/2021 | Mano | G06Q 10/10 |
| 2021/0344804 A1* | 11/2021 | Watariuchi | H04N 1/00408 |
| 2022/0304084 A1* | 9/2022 | Ahmed | H04W 28/22 |

FOREIGN PATENT DOCUMENTS

| | | |
|---|---|---|
| JP | 2017-215931 | 12/2017 |
| JP | 2017-215943 | 12/2017 |
| JP | 2019-113996 | 7/2019 |
| JP | 2019-191276 | 10/2019 |
| WO | WO2011/099086 A1 | 8/2011 |

* cited by examiner

FIG. 5

USER AUTHENTICATION MANAGEMENT TABLE

| USER ID | USER NAME | ORGANIZATION ID | PASSWORD |
|---|---|---|---|
| u0001 | Taro Ricoh | o1001 | p9991 |
| u0002 | Goro Kondo | o1002 | p9992 |
| ... | ... | ... | ... |

FIG. 6

ACCESS MANAGEMENT TABLE

| ORGANIZATION ID | ACCESS ID | ACCESS PASSWORD |
|---|---|---|
| o1001 | a1001 | p1001 |
| ... | ... | ... |

FIG. 7

SCHEDULE MANAGEMENT TABLE

SCHEDULED EVENT ID: pe0001, CONDUCTED EVENT ID: ee0001

| ORGAN- IZATION ID | USER ID OF RESER- VATION HOLDER | PAR- TICIPA- TION | NAME OF RESER- VATION HOLDER | SCHED- ULED START TIME | SCHED- ULED END TIME | EVENT NAME | USER ID OF OTHER PARTIC- IPANT | PAR- TICIPA- TION | USER NAME OF OTHER PARTICIPANT | FILE DATA |
|---|---|---|---|---|---|---|---|---|---|---|
| o1001 | u0001 | ✓ | Taro Ricoh | 9:00 | 10:00 | Meeting on strategic plan | u0000 | ✓ | Electronic Whiteboard | •XXX.ppt •YYY.xsl • • |
|  |  |  |  |  |  |  | u0002 | ✓ | Goro Kondo |  |
|  |  |  |  |  |  |  | u0003 | ✓ | Yoshio Yamashita |  |

FIG. 8
CONDUCTED EVENT MANAGEMENT TABLE

| PROJECT ID | CONDUCTED EVENT ID |
|---|---|
| p0001 | ee0001, ee0011, ee0021 |
| p0002 | ee0002, ee0012 |
| ... | ... |

FIG. 9
CONTENT MANAGEMENT TABLE

CONDUCTED EVENT ID: ee0001

| CONTENT PROCESSING ID | CONTENT PROCESSING TYPE | CONTENT DATA | START DATE/TIME | END DATE/TIME |
|---|---|---|---|---|
| c0001 | Audio Recording | • Audio data URL: c://••• | 2018/1/15 9:00:00 | 2018/1/15 9:00:30 |
| c0002 | Snapshot | • Image data URL: c://••• | 2018/1/15 9:00:30 | 2018/1/15 9:00:30 |
| c0003 | Voice text conversion | • Text data URL: c://••• | 2018/1/15 9:00:00 | 2018/1/15 9:00:30 |
| ... | ... | ... | ... | ... |
| c0201 | Action item Generation | • Action Item ID: ai0001<br>• User ID of execution person of action item: u0003<br>• Due: 2018/1/30<br>• Text data URL ; c://••• | 2018/1/15 9:44:47 | 2018/1/15 9:44:47 |
| c0202 | Audio Recording | • Audio data URL: c://••• | 2018/1/15 9:45:00 | 2018/1/15 9:45:30 |
| c0203 | chat | • Text data URL ; c://••• | 2018/1/15 9:45:30 | 2018/1/15 9:45:30 |
| c0204 | Voice text conversion | • Text data URL ; c://••• | 2018/1/15 9:45:00 | 2018/1/15 9:45:30 |
| ... | ... | ... | ... | ... |
| c0301 | Reference transmission | • Reference Data; c://••• | 2018/1/15 10:00:00 | 2018/1/15 10:00:00 |

FIG. 10

USER AUTHENTICATION MANAGEMENT TABLE

| USER ID | ORGANIZATION ID | PASSWORD |
|---|---|---|
| u0001 | o1001 | p9991 |
| u0002 | o1002 | p9992 |
| ... | ... | ... |

FIG. 11

USER MANAGEMENT TABLE

ORIGINATION ID: o1001

| USER ID | USER NAME |
|---|---|
| u0001 | Taro Ricoh |
| u0002 | Goro Kondo |
| u0003 | Yoshio Yamashita |
| u0004 | Jim Berger |
| ... | ... |

FIG. 12

RESOURCE MANAGEMENT TABLE

ORIGINATION ID: o1001

| RESOURCE ID | RESOURCE NAME |
|---|---|
| s1001 | Conference room X |
| s1002 | Conference room Y |
| ... | ... |

FIG. 13

RESOURCE RESERVATION MANAGEMENT TABLE

ORIGINATION ID: o1001

| RE-SOURCE ID | RESOURCE NAME | USER ID OF COMMUNI-CATION TERMINAL | USER ID OF RESER-VATION HOLDER | SCHEDULED USE START DATE/TIME | SCHEDULED USE END DATE/TIME | EVENT NAME |
|---|---|---|---|---|---|---|
| s1001 | Conference room X | u0000 | u0001 | 2018/1/15 9:00 | 2018/1/15 10:00 | Meeting on strategic plan |
| s1001 | Conference room X | u0000 | u0004 | 2018/1/15 10:00 | 2018/1/15 11:00 | Regular meeting |
| s1001 | Conference room X | u0000 | u0002 | 2018/1/15 10:11 | 2018/1/15 15:00 | Management meeting |
| s1002 | Conference room Y | u1000 | u0005 | 2018/1/15 9:00 | 2018/1/15 10:00 | Meeting on new product development |
| ... | ... | ... | ... | ... | ... | ... |

FIG. 14

EVENT MANAGEMENT TABLE

SCHEDULED EVENT ID: pe0001

| ORGAN-IZATION ID | USER ID | USER NAME | SCHEDULED EVENT START DATE/TIME | SCHEDULED EVENT END DATE/TIME | EVENT NAME | MEMO | FILE DATA |
|---|---|---|---|---|---|---|---|
| o1001 | u0000 | Electronic Whiteboard | 2018/1/15 9:00 | 2018/1/15 10:00 | Meeting on strategic plan | ... | *XXX.ppt *YYY.xsl * |
| o1001 | u0001 | Taro Ricah | 2018/1/15 9:00 | 2018/1/15 10:00 | Meeting on strategic plan | ... | |
| o1001 | u0002 | Goro Kondo | 2018/1/15 9:00 | 2018/1/15 10:00 | Meeting on strategic plan | ... | |
| o1001 | u0003 | Yoshio Yamashita | 2018/1/15 9:00 | 2018/1/15 10:00 | Meeting on strategic plan | ... | |
| ... | ... | ... | ... | ... | ... | ... | |

FIG. 15

SERVER AUTHENTICATION MANAGEMENT TABLE

| ACCESS ID | ACCESS PASSWORD |
|---|---|
| a1001 | p1001 |
| a1002 | p1002 |
| ... | ... |

FIG. 16

PROJECT MEMBER MANAGEMENT TABLE

ORGANIZATION ID: o1001

| PROJECT ID | PROJECT NAME | USER ID OF PROJECT MEMBER |
|---|---|---|
| p0001 | Plan for next year | u0000, u0001, u0002, u0003 |
| p0002 | R&D project | u0000, u0004, u0005 |
| p0003 | New product development | u0000, u0005, u0006, u0007 |
| ... | ... | ... |

FIG. 17

CONDUCTED EVENT RECORD MANAGEMENT TABLE

PROJECT ID: P0001  CONDUCTED EVENT ID : ee0001

| CONTENT PROCESSING ID | CONTENT PROCESSING TYPE | CONTENT DATA | START DATE/TIME | END DATE/TIME |
|---|---|---|---|---|
| c0001 | Audio Recording | • Audio data URL: c://··· | 2018/1/15 9:00:00 | 2018/1/15 9:00:30 |
| c0003 | Voice text conversion | • Text data URL: c://··· | 2018/1/15 9:00:00 | 2018/1/15 9:00:30 |
| c0002 | Snapshot | • Image data URL: c://··· | 2018/1/15 9:00:30 | 2018/1/15 9:00:30 |
| ... | ... | ... | ... | ... |
| c0201 | Action item Generation | • Action Item ID: ai0001<br>• User ID of execution person of action item: u0003<br>• Due: 2018/1/30<br>• Text data URL ; c://··· | 2018/1/15 9:44:47 | 2018/1/15 9:44:47 |
| c0202 | Audio Recording | • Audio data URL: c://··· | 2018/1/15 9:45:00 | 2018/1/15 9:45:30 |
| c0204 | Voice text conversion | • Text data URL: c://··· | 2018/1/15 9:45:00 | 2018/1/15 9:45:30 |
| c0203 | chat | • Text data URL ; c://··· | 2018/1/15 9:45:30 | 2018/1/15 9:45:30 |
| ... | ... | ... | ... | ... |
| c0301 | Reference transmission | • Reference Data URL: c://··· | 2018/1/15 10:00:00 | 2018/1/15 10:00:00 |

FIG. 18

CONDUCTED EVENT MANAGEMENT TABLE

| CONDUCTED EVENT ID | EVENT NAME | START DATE/TIME | END DATE/TIME |
|---|---|---|---|
| ee0001 | Meeting on strategic plan | 2018/1/15 9:00 | 2018/1/15 10:00 |
| ee0002 | Regular meeting | 2018/1/15 10:00 | 2018/1/15 11:00 |
| ... | ... | ... | ... |

FIG. 19

RELATED INFORMATION MANAGEMENT TABLE

PROJECT ID: p0001, CONDUCTED EVENT ID: ee0001

| CONTENT GENERA-TION TIME | AUDIO DATA | | | VOICE-TEXT DATA | | | | IMAGE DATA | | |
|---|---|---|---|---|---|---|---|---|---|---|
| | CONTENT PROCESS-ING ID | CONTENT PROCESS-ING TYPE | CONTENT ID | CONTENT PROCESSING TYPE | SEQUENCE NO. | CONTENT PROCESS-ING ID | CONTENT PROCESSING TYPE | SEQUENCE NO. | | |
| 00:00 | c0001 | Audio-Recording | c0002 | Voice text conversion | 1 | - | - | - | | |
| 00:30 | c0004 | Audio-Recording | c0005 | Voice text conversion | 2 | c0003 | Snapshot | 1 | | |
| 01:00 | c0007 | Audio-Recording | c0008 | Voice text conversion | 3 | c0006 | Snapshot | 2 | | |
| ... | ... | ... | ... | ... | ... | ... | ... | ... | | |
| 24:30 | c0202 | Video-Recording | c0203 | Voice text conversion | 61 | c0199 | Snapshot | 60 | | |
| ... | ... | ... | ... | ... | ... | ... | ... | ... | | |
| 59:30 | c0298 | Video-Recording | c0299 | Voice text conversion | 93 | c0297 | Snapshot | 92 | | |

FIG. 20

ACTION ITEM MANAGEMENT TABLE

| ACTION ITEM ID | STATE | USER ID OF EXECUTION PERSON | DUE DATE | CONTENT | ... |
|---|---|---|---|---|---|
| ai0001 | COMPLETED | u0003 | 2018/1/30 | Text data URL:http://... | ... |
| ai0002 | NOT COMPLETED | u0002 | 2018/2/3 | Text data URL:http://... | ... |
| ... | ... | ... | ... | ... | ... |

FIG. 27

RESERVATION LIST

Resource name: Conference room X
Today : 2018/1/15

| Scheduled use start/end time | Event name | Reservation holder | |
|---|---|---|---|
| 9:00 – 10:00 | Meeting on strategic plan | Taro Ricoh | Start |
| 10:00 – 11:00 | Regular meeting | Jim Berger | Start |
| 11:00 – 12:00 | Management meeting | Yoshio Yamashita | Start |

230
231
232
235s
236s
237s
EVENT INFORMATION 235
EVENT INFORMATION 236
EVENT INFORMATION 237

FIG. 38

⊕ NEW CREATION  🗑 DELETE  CLASSIFICATION ∨  CHARM ∨  COMPLETE

ACTION ITEM

ACTIVE ∨

TODAY

☑ MR. YAMASHITA MODIFIES AND SUBMITS DOCUMENT 1 BY TOMORROW 🗑 ☑ P  ~273
SEPTEMBER 19, 2019

293 [BOARD]  GRAPH  292 [SCHEDULE]

< > September 2019 ⌄

| Sun. | Mon. | Tue. | Wed. | Thr. | Fri. | Sat. |
|------|------|------|------|------|------|------|
| 1    | 2    | 3    | 4    | 5    | 6    | 7    |
| 8    | 9    | 10   | 11   | 12   | 13   | 14   |
| 15   | 16   | 17   | 18   | 19 [by tomorrow] 291 | 20 | 21 |
| 22   | 23   | 24   | 25   | 26   | 27   | 28   |
| 29   | 30   | 1    | 2    | 3    | 4    | 5    |

300

INFORMATION PROCESSING SYSTEM, USER TERMINAL, METHOD OF PROCESSING INFORMATION

CROSS-REFERENCE TO RELATED APPLICATION

This application claims priority pursuant to 35 U.S.C. § 119(a) to Japanese Patent Application Nos. 2020-051267, filed on Mar. 23, 2020, and 2021-003426, filed on Jan. 13, 2021 in the Japan Patent Office, the disclosure of which are incorporated by reference herein in its entirety.

BACKGROUND

Technical Field

This disclosure relates to an information processing system, a user terminal, a method of processing information.

Background Art

Conference assistance or supporting apparatuses are known and used in various scenes. Typically, a conference assistance apparatus converts speech (i.e., voice) spoken by a conference participant into text, detects an important spoken content from the text by applying a plurality of rules used for specifying the important spoken content, extracts a matter indicating the important spoken content, and presents the extracted matter to the conference participant.

Further, tools such as collaboration tools for assisting or supporting collaboration works performable by a group have been developed and used, in which the tools provide various functions, such as communication function and information sharing function, to a plurality of users who are working as one group or team. For example, a plurality of users who are working as one group or team for a collaborative work or collaboration work can use communication function, such as chat function and voice communication function, and information sharing function to hold an online meeting, and in-person meeting where the users gather at the same physical place.

When a conference using the communication function, information sharing function, or other function is held, a plurality of users who are working as one group or team speak opinions and provide text information, and some of the spoken content and text content may be required to be assigned to one or more specific users to execute some works as action items.

However, conventional collaboration tools have no configuration that assists or supports a function of registering action item (e.g., task) included in the content spoken during the meeting and is required to be assigned and conducted by one or more specific users.

SUMMARY

As one aspect of the present disclosure, an information processing system is devised. The information processing system includes a plurality of user terminals; and a collaboration work assisting system for assisting a collaboration work performable by a plurality of users who operate the respective plurality of user terminals. The collaboration work assisting system includes circuitry configured to transmit an action item candidate based on statement data of the one or more users to each of the plurality of user terminals. Each of the user terminals includes another circuitry configured to receive the action item candidate from the collaboration work assisting system; display, on a display, the received action item candidate, and a screen for receiving a registration request for registering a particular action item selected from the action item candidate, a particular execution person who will execute the particular action item, and a particular due date of the particular action item; receive a registration operation that requests registering of the particular action item, the particular execution person who will execute the particular action item, and the particular due date of the particular action item; and request an action item management server for managing one or more action items, to register the particular action item, the particular execution person who will execute the particular action item, and the particular due date of the particular action item in response to receiving the registration operation of the particular action item.

As another aspect of the present disclosure, a user terminal capable of communicating with a collaboration work assisting system for assisting a collaboration work performable by a plurality of users is devised. The user terminal includes circuitry configured to receive an action item candidate based on statement data of the one or more users from the collaboration work assisting system; display, on a display, the received action item candidate, and a screen for receiving a registration request of a particular action item selected from the action item candidate, a particular execution person who will execute the particular action item, and a particular due date of the particular action item; receive a registration operation of the particular action item selected from the action item candidate, the particular execution person who will execute the particular action item, and the particular due date of the particular action item; and request, to an action item management server for managing one or more action items, a registration request of the particular action item, the particular execution person who will execute the particular action item, and the particular due date of the particular action item in response to receiving the registration operation of the particular action item.

As another aspect of the present disclosure, a method of processing information performable by a user terminal capable of communicating with a collaboration work assisting system for assisting a collaboration work performable by a plurality of users is devised. The method includes receiving an action item candidate based on statement data of the one or more users from the collaboration work assisting system; displaying, on a display, the received action item candidate, and a screen for receiving a registration request of a particular action item selected from the action item candidate, a particular execution person who will execute the particular action item, and a particular due date of the particular action item; receiving a registration operation of the particular action item selected from the action item candidate, the particular execution person who will execute the particular action item, and the particular due date of the particular action item; and requesting, to an action item management server for managing one or more action items, a registration request of the particular action item, the particular execution person who will execute the particular action item, and the particular due date of the particular action item in response to receiving the registration operation of the particular action item.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 5 is an example of schematic diagram of a user authentication management table;

FIG. 6 is an example of schematic diagram of an access management table;

FIG. 7 is an example of schematic diagram of a schedule management table;

FIG. 8 is an example of schematic diagram of a conducted event management table;

FIG. 9 is an example of schematic diagram of a content management table;

FIG. 10 is an example of schematic diagram of a user authentication management table;

FIG. 11 is an example of schematic diagram of a user management table;

FIG. 12 is an example of schematic diagram of a resource management table;

FIG. 13 is an example of schematic diagram of a resource reservation management table;

FIG. 14 is an example of schematic diagram of an event management table;

FIG. 15 is an example of schematic diagram of a server authentication management table;

FIG. 16 is an example of schematic diagram of a project member management table;

FIG. 17 is an example of schematic diagram of a conducted event record management table;

FIG. 18 is an example of schematic diagram of a conducted event management table;

FIG. 19 is an example of schematic diagram of a related information management table;

FIG. 20 is an example of schematic diagram of an action item management table.

FIG. 27 is an example of resource reservation list screen;

FIG. 38 is an example of a part of task management screen;

FIG. 49 is an example of a part of task management tool screen;

The accompanying drawings are intended to depict embodiments of this disclosure and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description is given of one or more embodiments with reference to the drawings, but the present invention is not limited to embodiment described in this description. In this description, a group or team of users gathering for performing a collaborative work (or collaboration work) is referred to as a project, and each user belonging to the project is referred to as a member of project or project member. Further, in this description, a work or job to be assigned and conducted by each member is referred to as an action item, but is not limited thereto. For example, the action item may also be referred to as a task or follow-up matter. Further, in this description, "file" may indicate "electronic file".

First Embodiment (System Configuration)

Figure 1:
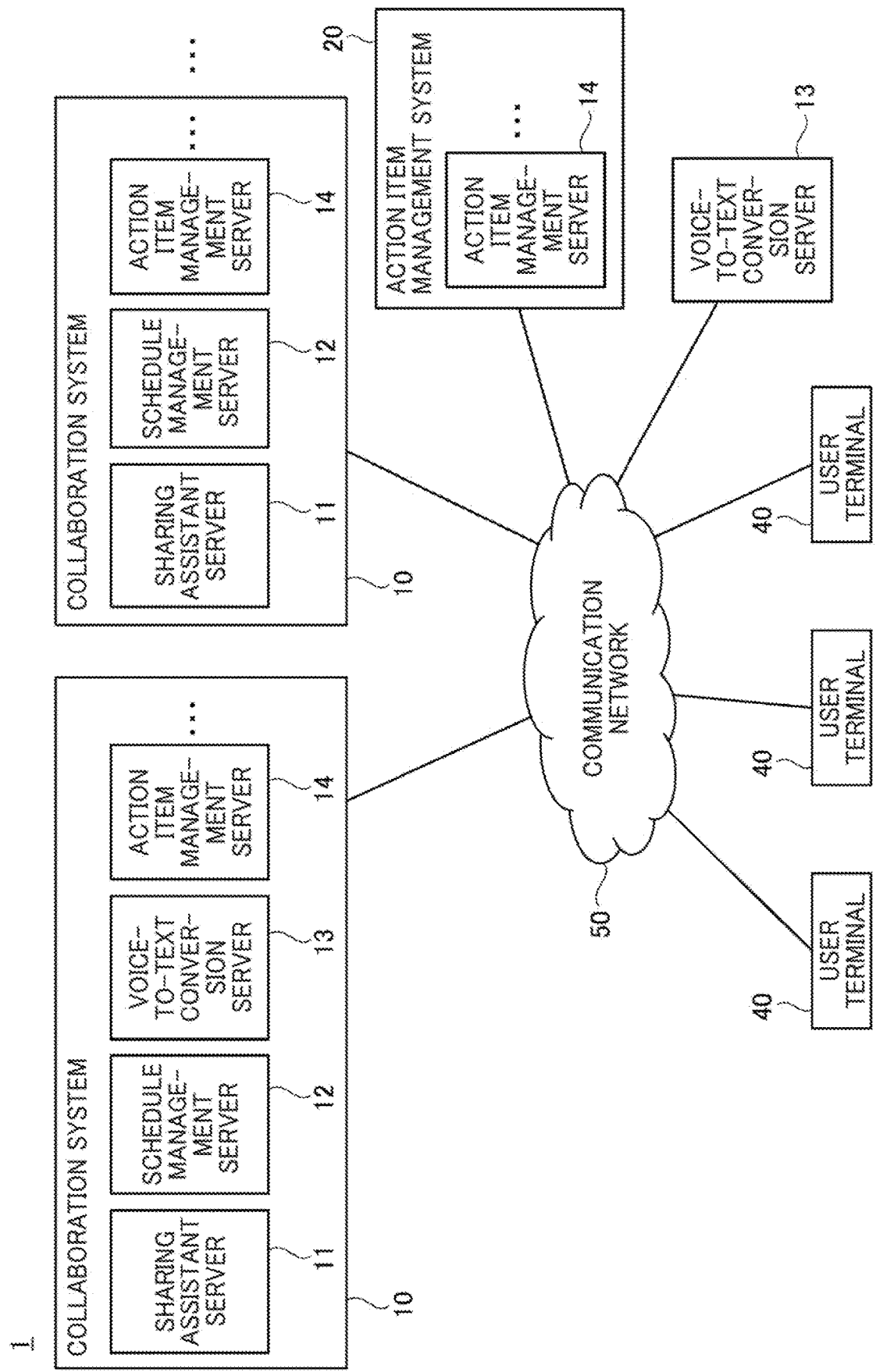
FIG. 1 is an example of system configuration of an information processing system according to a first embodiment.

FIG. 1 is an example of system configuration of an information processing system 1 according to a first embodiment. As illustrated in FIG. 1, the information processing system 1 includes, for example, a collaboration system 10, a voice-to-text conversion server 13 (or audio-to-text conversion server), an action item management system 20, and a user terminal 40 communicably connected with each other via a communication network 50.

The communication network 50 is constructed, for example, by the Internet, a mobile communication network, local area network (LAN) or the like. The communication network 50 may include not only wired communication but also a wireless communication network such as 3rd Generation (3G), Worldwide Interoperability for Microwave Access (WiMAX) or Long Term Evolution (LTE).

The collaboration system 10 is a system that assists or supports a plurality of persons or users to perform one work together. For example, the collaboration system is a system that is used to perform voice call, video call, chat, screen sharing (projection), information sharing, review of agenda, preparation and compilation of reference materials, schedule setting, determination of action item, or the like, using personal computer (PC), portable terminal, electronic information board (e.g., electronic whiteboard), projector, conference tool, or the like, in a place where persons gather to discuss and share opinions, consultation, or the like for a specific purpose (including a case where persons gather at the same physical space, and a case where persons are physically separated but user terminals are connected to each other via a network).

The collaboration system 10 has the same meaning as the collaboration work assistance or supporting system. The collaboration system 10 provides various collaboration tools to assist or support a collaborative work or collaboration work performable by project members. Each collaboration tool is a unit, function, or tool for assisting or supporting a plurality of persons who are working together to accomplish one work or job. The collaborative work (or collaboration work) means that a plurality of persons perform one work together. The collaboration tools include various functions, such as communication function, scheduling function (schedule management function), information sharing function, and action item management function.

Further, the collaboration tools provided by a plurality of collaboration systems may not be the same functions. Therefore, in an example case of FIG. 1, the server configuration of the two collaboration systems 10 are different.

A sharing assistant server 11 (or sharing support server 11) included in the collaboration system 10 provides various functions, such as communication function, and information sharing function, to each project member.

A schedule management server 12 included in the collaboration system 10 provides a schedule management function to each project member.

A voice-to-text conversion server 13 included in the collaboration system 10 converts voice data of each project member into text data. As illustrated in the information processing system 1 of FIG. 1, the voice-to-text conversion server 13 may be provided separately from the collaboration system 10.

An action item management server 14 included in the collaboration system 10 provides an action item management function to each project member. The action item is a work or job, which is required to be assigned and executed or conducted by one or more users. As illustrated in the information processing system 1 of FIG. 1, the action item management server 14 may be provided in the action item management system 20, separately from the collaboration system 10.

The action item management system 20 provides the action item management function to each user who operates the user terminal 40. The action item management function is a function for receiving a registration of action item from each user, and managing the action item. The action item management function includes at least one function or unit provided in the action item management server 14 illustrated in FIG. 1. Further, the action item management function may include all functions and units provided by the action item management server 14. In this description, the action management function has the same meaning as the action management unit.

The user terminal 40, which is an example of information processing terminal, is operated by each user, such as each project member. The user can use the collaboration system 10 and the action item management system 20 from the user terminal 40.

Further, the user terminal 40 is not limited to a PC as long as the user terminal has the communication function. The user terminal 40 may be, for example, projector (PJ), interactive whiteboard (IWB) having electronic board function that can communicate with each other, output device such as a digital signage, head up display (HUD) device, industrial machine, imaging device, sound collecting device, medical device, network appliance, connected car, personal computer, portable telephone, smart phone, tablet terminal, game machine, personal digital assistant (PDA), digital camera, wearable PC, and desktop PC.

Further, the sharing assistant server 11, the schedule management server 12, the voice-to-text conversion server 13, and the action item management server 14 can be implemented by, for example, one or more information processing apparatuses. Further, the collaboration system 10 may be one or more computers in which a part or all of the functions of the sharing assistant server 11, the schedule management server 12, the voice-to-text conversion server 13, and the action item management server 14 are integrated.

Further, one or more functions of the sharing assistant server 11, the schedule management server 12, the voice-to-text conversion server 13, and the action item management server 14 can be distributed over a plurality of computers.

Further, the sharing assistant server 11, the schedule management server 12, the voice-to-text conversion server 13, and the action item management server 14 may be implemented by computers in a cloud environment or computers in an on-premise environment. As described above, the information processing system 1 illustrated in FIG. 1 is just one example.

Further, the collaboration system 10, the sharing assistant server 11, the schedule management server 12, the voice-to-text conversion server 13, the action item management server 14, and the action item management system 20 are not limited to PCs as long as these apparatuses have the communication function.

Further, each of the collaboration system 10, the sharing assistant server 11, the schedule management server 12, the voice-to-text conversion server 13, the action item management server 14, and the action item management system 20 may be, for example, projector (PJ), interactive whiteboard (IWB), output device such as a digital signage, head up display (HUD) device, industrial machine, imaging device, sound collecting device, medical device, network appliance, connected car, personal computer, portable telephone, smart phone, tablet terminal, game machine, personal digital assistant (PDA), digital camera, wearable PC, and desktop PC.

Further, the collaboration information provided by the collaboration system 10 to each project member by the collaboration tool includes, for example, synchronous collaboration information and asynchronous collaboration information.

The synchronous collaboration information is information that is exchanged in real time in a place (e.g., meeting), in which persons gather to discuss and share opinions or consult for a specific purpose. The synchronous collaboration information is, for example, voice call, video call, and screen shared by PC/portable terminal/electronic whiteboard (including text and diagrams input from PC, portable terminal, and handwritten input contents to a screen of electronic whiteboard).

Further, the asynchronous collaboration information is information that is input or shared on the network. The asynchronous collaboration information includes, for example, information that can be shared and referenced by participants before and after an event (e.g., meeting) where persons gather to discuss and share opinions or consult for a specific purpose. The asynchronous collaboration information includes, for example, chat, message, content, scheduling, action item, content of audio recording/video recording, or the like.

These terms are included in Conference Solutions Report, "Magic Quadrant for Meeting Solution", published in September 2019, by Gartner, Inc.

(Hardware Configuration)

Figure 2:
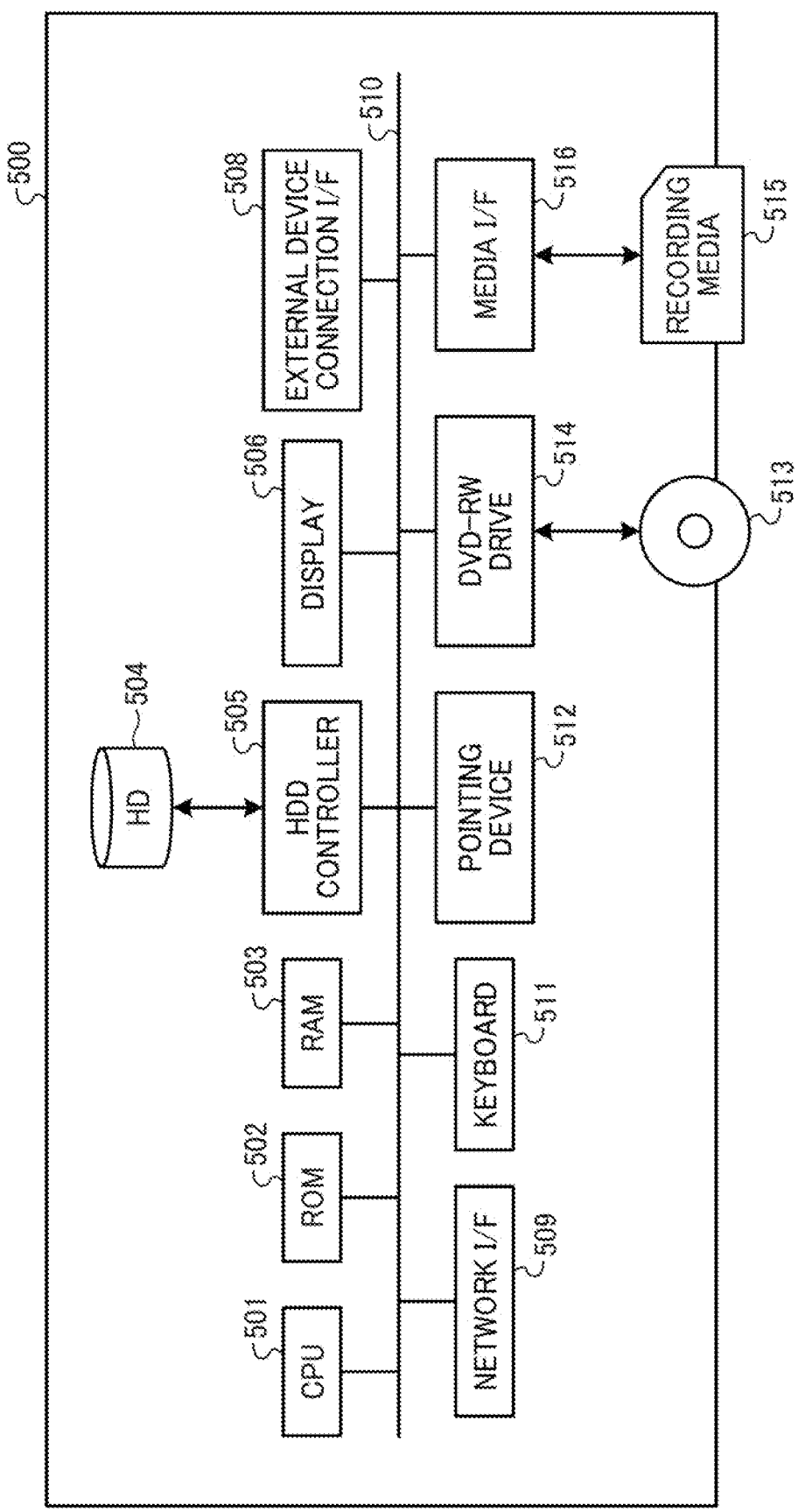
FIG. 2 is an example of hardware block diagram of a computer according to a first embodiment.

The collaboration system 10, the sharing assistant server 11, the schedule management server 12, the voice-to-text conversion server 13, the action item management server 14, the action item management system 20, and the user terminal 40 illustrated in FIG. 1 are implemented by, for example, a computer 500 having a hardware configuration illustrated in FIG. 2. FIG. 2 is an example of hardware block diagram of the computer 500 according to the first embodiment.

As illustrated in FIG. 2, the computer 500 includes, for example, a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a data bus 510, a keyboard 511, a pointing device 512, a digital versatile disk rewritable (DVD-RW) drive 514, and a media I/F 516.

The CPU 501 controls the operation of the computer 500 entirely in accordance with one or more programs. The ROM 502 stores programs for driving the CPU 501, such as initial program loader (IPL). The RAM 503 is used as a work area of the CPU 501.

The HD 504 stores various data, such as programs. The HDD controller 505 controls reading or writing of various data from or to the HD 504 under the control of the CPU 501.

The display 506 displays various information, such as cursor, menu, window, characters, or image.

The external device connection I/F 508 is an interface for connecting various external devices. In this case, the external device is, for example, a universal serial bus (USB) memory or a printer. The network I/F 509 is an interface for performing data communication using the communication network 50. The bus line 510 is address bus and data bus for electrically connecting each component, such as the CPU 501 illustrated in FIG. 2.

The keyboard 511 is a type of input means including a plurality of keys for inputting characters, letters, numbers, and various instructions.

The pointing device 512 is a type of input means for selecting or executing various instructions, selecting processing target, moving a cursor, or the like.

The DVD-RW drive 514 controls reading or writing of various data from or to the DVD-RW 513, which is as an example of removable recording medium. Further, the removable recording medium may be digital versatile disk recordable (DVD-R) in addition to DVD-RW. The media I/F 516 controls reading or writing of data from or to a recording medium 515, such as flash memory.

Further, each of the above described programs may be recorded on a computer-readable recording medium in an installable form or an executable form and distributed. Examples of the recording medium include compact disc recordable (CD-R), digital versatile disk (DVD), Blu-Ray (registered trademark) disc, and secure digital (SD) card. Further, the recording medium can be provided to a country or a foreign country as a program product.

(Software Configuration)

Figure 3:
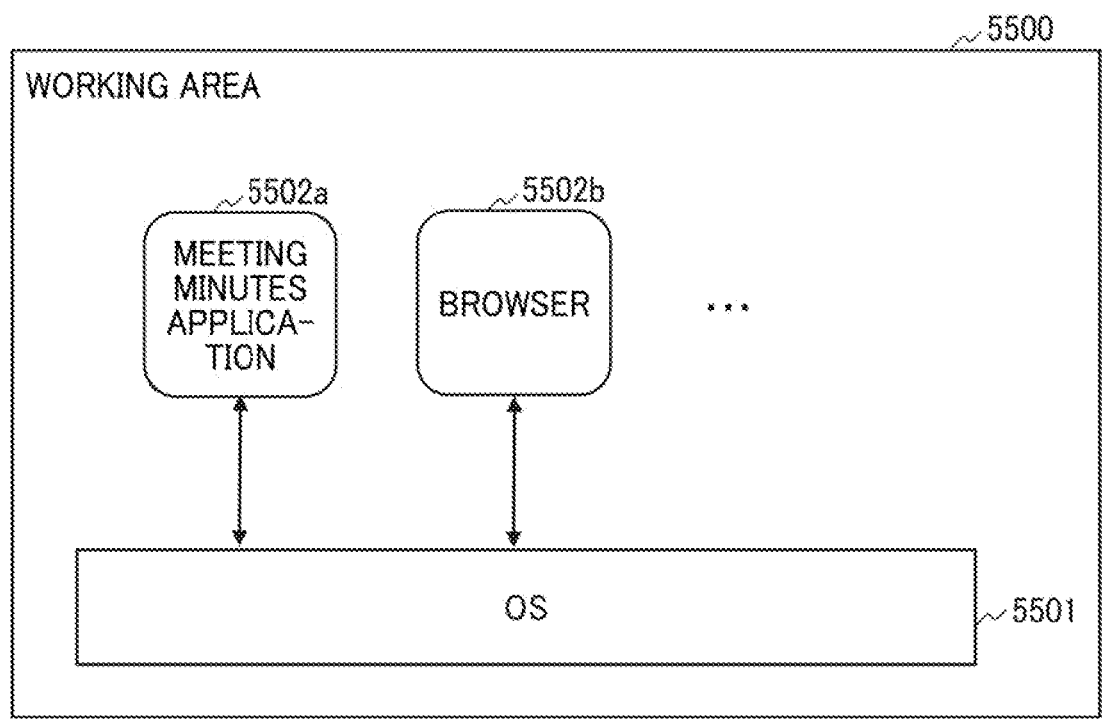
FIG. 3 is an example of software configuration of a user terminal.

Hereinafter, with reference to FIG. 3, a description is given of software installed on the user terminal 40. FIG. 3 is an example of software configuration of the user terminal 40. As illustrated in FIG. 3, operating system (OS) 5501, meeting minutes application 5502a, and browser 5502b that operate on a work area 5500 of the RAM 503. The OS5501 is basic software that provides basic functions of the user terminal 40, and manages the user terminal 40 entirely.

The meeting minutes application 5502a and the browser 5502b are applications used for generating and displaying a conducted event record screen to be described later with reference to FIG. 33. The conducted event record screen displays, for example, minutes of event (e.g., online meeting) conducted or performed using various data transmitted from the schedule management server 12. Although FIG. 3 indicates an example in which two external applications, such as the meeting minutes application 5502a and browser 5502b are installed on the user terminal 40, but the number of external applications is not limited thereto. The number of external applications installed on the user terminal 40 may be one, or two or more. Further, the meeting minutes application 5502a and the browser 5502b may be downloaded and installed from, for example, a server provided in the collaboration system 10, or a server provided in the cloud or on-premises.

(Functional Configuration)

Figure 4:
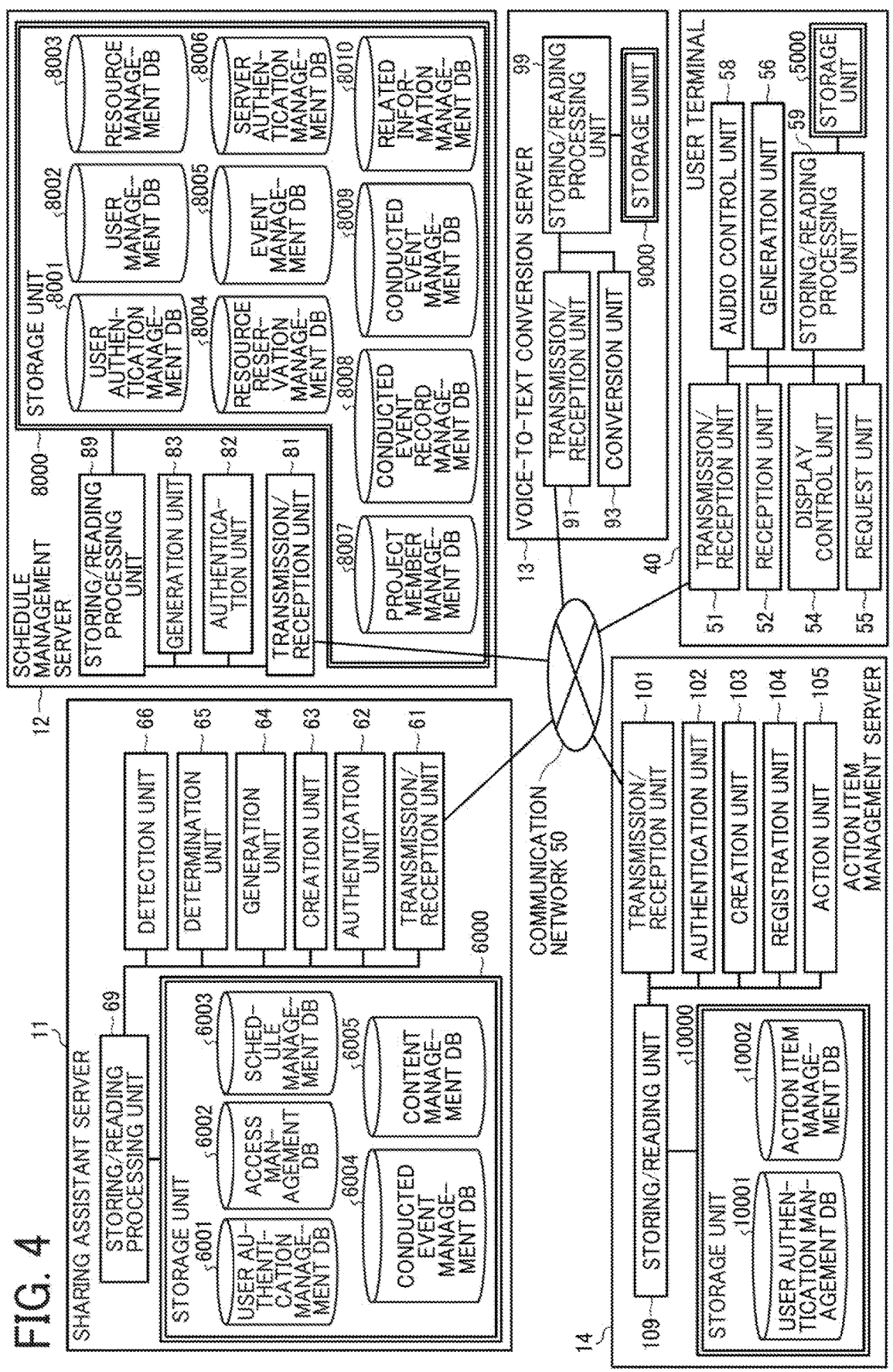
FIG. 4 is an example of functional block diagram of an information processing system according to a first embodiment.

The information processing system 1 according to the first embodiment is implemented by a functional units illustrated in FIG. 4. FIG. 4 is an example of functional block diagram of the information processing system 1 according to the first embodiment. FIG. 4 appropriately omits some functional unit not necessary for the description of the first embodiment.

(Functional Configuration of Sharing Assistant Server)

As illustrated in FIG. 4, the sharing assistant server 11 includes, for example, a transmission/reception unit 61, an authentication unit 62, a creation unit 63, a generation unit 64, a determination unit 65, a detection unit 66, and a storing/reading processing unit 69. Each of the functional units of the sharing assistant server 11 is a function or means implemented by any one of the components illustrated in FIG. 2 under the instructions from the CPU 501 executing programs loaded on the RAM 503 from the HD 504. Further, the sharing assistant server 11 includes a storage unit 6000, implemented by the HD 504 illustrated in FIG. 2.

(User Authentication Management Table)

FIG. 5 is an example of schematic diagram of a user authentication management table. The storage unit 6000 includes a user authentication management database (DB) 6001 configured by the user authentication management table illustrated in FIG. 5. The user authentication management table stores or manages user ID identifying each user, user name, organization ID identifying each organization to which each user belongs, and password in association with each other. Further, the organization ID includes a domain name representing a group or organization managing a plurality of computers connected on the communication network 50.

(Access Management Table)

FIG. 6 is an example of schematic diagram of an access management table. The storage unit 6000 includes an access management DB 6002 configured by the access management table illustrated in FIG. 6. The access management table stores or manages organization ID, access ID, and access password required for authentication when accessing the schedule management server 12 in association with each other. The access ID and access password are required for the sharing assistant server 11 to use a service or function provided by the schedule management server 12 via a web application programming interface (WebAPI) or the like using a given protocol, such as Hypertext Transfer Protocol (HTTP) or Hypertext Transfer Protocol Secure (HTTPS).

The schedule management server 12 stores and manages a plurality of schedulers. Since different organizations may use different schedulers, the management using the access management table illustrated in FIG. 6 is required.

(Schedule Management Table)

FIG. 7 is an example of schematic diagram of a schedule management table. The storage unit 6000 includes a schedule management DB 6003 configured by the schedule management table illustrated in FIG. 7. The schedule management table stores or manages organization ID, user ID of reservation holder, participation or absence of reservation holder, reservation holder name (user name), scheduled start time, scheduled end time, event name, user ID of other participant, participation or absence of other participant, other participant name (user name), and file data in association with each other for each scheduled event ID and conducted event ID.

The scheduled event ID is identification information identifying each scheduled or reserved event. The scheduled event ID is an example of scheduled event identification information identifying each event to be conducted.

The conducted event ID is identification information identifying each event that was actually conducted or each event that is being conducted among the scheduled or reserved events.

The conducted event ID is an example of conducted event identification information identifying each conducted event or each being-conducted event.

The reservation holder name is a name of a person who has reserved a shared resource, such as a conference room.

The shared resource is an object, service, space (room), place, or information that can be used by a plurality of persons or a group. The conference room is an example of shared resource that is shared by a plurality of users. If the shared resource is a conference room, the reservation holder name is, for example, a name of organizer or host.

The scheduled start time indicates a scheduled use start time of shared resource. The scheduled end time indicates a scheduled use end time of shared resource. The event name indicates a name of each event scheduled to be conducted by the reservation holder.

Hereinafter, the "shared resource" may be simply referred to as the "resource" to simplify the expression in this description.

The user ID of other participant is identification information identifying each participant other than the reservation holder.

The other participant name is a name of each participant other than the reservation holder.

The file data is file data of reference file to be used in each event corresponding to the scheduled event ID registered by a user. The file data is data that is created using various applications and a given file format. The file format of file data is, for example, a file for presentation software, a file for spread sheet software, or the like.

(Conducted Event Management Table)

FIG. 8 is an example of schematic diagram of a conducted event management table. The storage unit 6000 includes a conducted event management DB 6004 configured by the conducted event management table illustrated in FIG. 8. The conducted event management table stores or manages conducted event ID in association with each project ID.

The project ID is identification information identifying each project (e.g., project identification information). The project represents a group, team, or grouping of users configured to achieve a particular goal, plan, project, or the like. Members belonging to the same project can share conducted event record, such as the minutes of event associated with the project ID. The project ID is allocated to each project. Further, the project ID may be also referred to as group ID or team ID.

(Content Management Table)

FIG. 9 is an example of schematic diagram of a content management table. The storage unit 6000 includes a content management DB 6005 configured by the content management table illustrated in FIG. 9. The content management table stores or manages content processing ID, type of content processing (content processing type), material of content (content data), and start date/time and end date/time of content processing in association with each other for each conducted event ID. In this description, the date may mean day (e.g., day of month, day of week) and time (e.g., 10 AM, 10:00-10:30 AM).

The content is a content of conducted event that was generated in each event (e.g., meeting) in a particular project, or reference materials that was used in each particular event.

The type of content processing includes, for example, audio recording, snapshot, voice-to-text conversion, generation of action item, chatting, and sending or transmitting reference materials. The type of content processing may include video recording.

Further, the content processing ID is identification information identifying each content processing that was generated in each event.

The content includes, for example, history information indicating the content of conducted event, and an action item generated by the conducted event. The history information indicating the content of conducted event includes data, such as recorded audio data, recorded video data, snapshot, statement text data, or reference materials. The statement text data includes, for example, voice-text data converted from the recorded audio data or recorded video data by performing the voice-to-text conversion, and text data input for chat and message.

In this description, the statement data includes, for example, statement text data and voice data. The voice data is used for a method of extracting an action item by performing the voice recognition processing on the voice data without converting the voice data into text data.

The snapshot is a process of acquiring a display screen at a certain time point in an event being conducted, as image data. The snapshot is also referred to, for example, capture or image recognition.

If the type of content processing is "audio recording", the material of content (content data) includes, for example, universal resource locator (URL) indicating a storage destination of the recorded audio data.

Further, if the type of content processing is "snapshot", the material of content (content data) includes, for example, URL indicating a storage destination of image data of a screen acquired by the snapshot (capture). The capture means saving of image (e.g., still image, movie image) displayed on the display 506 as image data.

If the type of content processing is "voice-to-text conversion", the material of content (content data) includes, for example, URL indicating a storage destination of text data of the received voice data.

The action item indicates a content of action, which occurs in each event (e.g., meeting) in each project and is required to be performed or executed by one or more persons related to each event. If the type of content processing is "action item generation", the material of content (content data) includes, for example, user ID of execution person of action item, due date for completing action item, and URL indicating a storage destination of text data indicating the content of action item.

(Functional Configuration of Sharing Assistant Server)

Hereinafter, with reference to FIG. 4, a description is given of each functional unit of the sharing assistant server 11. In the following description, each functional unit of the sharing assistant server 11, among the components illustrated in FIG. 2, the relationship with the main components for implementing each functional unit of the sharing assistant server 11 is to be also described.

The transmission/reception unit 61 of the sharing assistant server 11 illustrated in FIG. 4 is implemented by the instructions from the CPU 501 illustrated in FIG. 2 and the network I/F 509 illustrated in FIG. 2. The transmission/reception unit 61 transmits and receives various data or information to and from the user terminal 40, other server, other system, or the like via the communication network 50. The transmission/reception unit 61 is an example of transmission unit or reception unit.

The authentication unit 62, which is implemented by the instructions from the CPU 501 illustrated in FIG. 2, performs authentication by determining whether information (e.g., user ID, organization ID, and password) transmitted from the user terminal 40 matches information registered in the user authentication management DB 6001 in advance.

The creation unit 63, which is implemented by the instructions from the CPU 501 illustrated in FIG. 2, creates, for example, image data of various screens in addition to image data of reservation list screen based on reservation information and schedule information transmitted from the schedule management server 12.

The generation unit 64, which is implemented by the instructions from the CPU 501 illustrated in FIG. 2, generates conducted event ID, content processing ID, and URL of storage destination.

The determination unit 65, which is implemented by the instructions from the CPU 501 illustrated in FIG. 2, performs various determinations. The various determinations will be described later.

The detection unit 66, which is implemented by the instructions from the CPU 501 illustrated in FIG. 2, detects statement text data to be settable as action item candidate, to be described later, from statement text data of user.

The storing/reading processing unit 69, which is implemented by the instructions from the CPU 501 illustrated in FIG. 2 and the HDD controller 505 illustrated in FIG. 2, stores various data in the storage unit 6000 and reads out various data stored in the storage unit 6000.

(Functional Configuration of Schedule Management Server)

As illustrated in FIG. 4, the schedule management server 12 includes, for example, a transmission/reception unit 81, an authentication unit 82, a generation unit 83, and a storing/reading processing unit 89. Each of the functional units of the schedule management server 12 is a function or means implemented by any one of the components illustrated in FIG. 2 under the instructions from the CPU 501 executing programs loaded on the RAM 503 from the HD 504. Further, the schedule management server 12 includes a storage unit 8000, implemented by the HD 504 illustrated in FIG. 2.

(User Authentication Management Table)

FIG. 10 is an example of schematic diagram of a user authentication management table. The storage unit 8000 includes a user authentication management DB 8001 configured by the user authentication management table illustrated in FIG. 10.

The user authentication management table stores or manages organization ID identifying each organization to which each user belongs, and password in association with each other for user ID identifying each user.

(User Management Table)

FIG. 11 is an example of schematic diagram of a user management table. The storage unit 8000 includes a user management DB 8002 configured by the user management table illustrated in FIG. 11. The user management table stores or manages user ID, and name (user name) of each user indicated by user ID in association with each other for each organization ID.

(Resource Management Table)

FIG. 12 is an example of schematic diagram of a resource management table. The storage unit 8000 includes, for example, a resource management DB 8003 configured by the resource management table illustrated in FIG. 12. The resource management table stores or manages resource ID identifying each resource, and name of resource (resource name) in association with each other for each organization ID.

(Resource Reservation Management Table)

FIG. 13 is an example of schematic diagram of a resource reservation management table. The storage unit 8000 includes a resource reservation management DB 8004 configured by the resource reservation management table illustrated in FIG. 13. The resource reservation management table stores or manages reservation information in a state, in which each piece of information is associated with each other. The reservation information includes, for example, resource ID, resource name, user ID of a person who has made a reservation, scheduled use start date/time, scheduled use end date/time, and event name for each organization ID.

The scheduled use start date/time indicates, for example, a scheduled use start date/time of each resource. The scheduled use end date/time indicates, for example, a scheduled use end date/time of each resource. Each date indicates, for example, year, month, day, hour, minute, second, and time zone. Each date illustrated in FIG. 13 represents year, month, day, hour, and minute due to the limitation of space.

(Event Management Table)

FIG. 14 is an example of schematic diagram of an event management table. The storage unit 8000 includes an event management DB 8005 configured by the event management table illustrated in FIG. 14. The event management table stores or manages schedule information in a state, in which each piece of information is associated with each other. The schedule information includes organization ID, user ID, user name, scheduled event start date/time, scheduled event end date/time, and event name in association with each other for each scheduled event ID.

The scheduled event start date/time indicates a scheduled start date/time when an event is to be conducted. The scheduled event end date/time indicates a scheduled end date/time when an event is to be conducted.

Each date/time indicates, for example, year, month, day, hour, minute, second, and time zone. Each/time date illustrated in FIG. 14 represents year, month, day, hour, and minute for the limitation of sheet. Further, as illustrated in FIG. 14, the event management table stores or manages file data of reference file, to be used in an event indicated in the schedule information, in association with the scheduled event ID.

(Server Authentication Management Table)

FIG. 15 is an example of schematic diagram of a server authentication management table. The storage unit 8000 includes a server authentication management DB 8006 configured by the server authentication management table illustrated in FIG. 15. The server authentication management table stores or manages access ID, and access password in association with each other. The access ID and access password have the same concept as the access ID and access password stored or managed by the access management DB 6002 of the sharing assistant server 11.

(Project Member Management Table)

FIG. 16 is an example of schematic diagram of a project member management table. The storage unit 8000 includes a project member management DB 8007 configured by the project member management table illustrated in FIG. 16. The project member management table stores or manages project ID, project name, and user ID of each project member in association with each other for each organization ID.

(Conducted Event Record Management Table)

FIG. 17 is an example of schematic diagram of a conducted event record management table. The storage unit 8000 includes a conducted event record management DB 8008 configured by the conducted event record management table illustrated in FIG. 17. The conducted event record management DB may be also referred to as the conducted event history management DB.

The conducted event record management table stores or manages content processing ID, type of content processing, material of content (content data), and start date/time and end date/time of content processing in association with each other for each project ID and conducted event ID.

The conducted event record management DB 8008 stores or manages data, which are partially the same as the content management DB 6005. The same data includes, for example, conducted event ID, content processing ID, type of content processing, start date/time of content processing, and end date/time of content processing. The material of content (content data) has the same storage destination only different in expression of storage destination of content data, such as http:// or c://.

(Conducted Event Management Table)

FIG. 18 is an example of schematic diagram of a conducted event management table. The storage unit 8000 includes a conducted event management DB 8009 configured by the conducted event management table illustrated in FIG. 18. The conducted event management table stores or manages event name, start date/time of event, and end date/time of event in association with each other for each conducted event ID. The conducted event management DB 8009 stores or manages information related to each event that was actually conducted among the schedule information stored or managed in the event management DB 8005.

(Related Information Management Table)

FIG. 19 is an example of schematic diagram of a related information management table. The storage unit 8000 includes a related information management DB 8010 configured by the related information management table illustrated in FIG. 19. The related information management table stores or manages related information in a state, in which each piece of information or data is associated with each other for each project ID and conducted event ID. The related information is stored or managed by associating content generation time, audio data, voice-text data, and screen data (image data) with each other.

The content generation time indicates a time of generation of content in a conducted event, which is elapsed from a start date/time of the conducted event. The content generation time is generated by the generation unit 83 based on the start date/time of event stored in the event management DB 8005 and the start date/time and end date/time of the content processing stored in the conducted event record management DB 8008. The content generation time is an example of time information.

Further, the audio data includes, for example, content processing ID and content processing type (type of content processing).

The voice-text data and screen data include, for example, content processing ID, content processing type, and sequence number (No.). The sequence No. indicates an occurrence time sequence in which the content processing has occurred on the voice-text data and the screen data, respectively.

(Functional Configuration of Schedule Management Server)

Hereinafter, with reference to FIG. 4, a description is given of each functional unit of the schedule management server 12. In the following description, each functional unit of the schedule management server 12, among the components illustrated in FIG. 2, the relationship with the main components for implementing each functional unit of the schedule management server 12 is to be also described.

The transmission/reception unit 81 of the schedule management server 12 illustrated in FIG. 4 is implemented by the instructions from the CPU 501 illustrated in FIG. 2 and the network I/F 509 illustrated in FIG. 2. The transmission/reception unit 81 transmits and receives various data (or information) to and from the user terminal 40, other server, other system, or the like via the communication network 50.

The authentication unit 82, which is implemented by the instructions from the CPU 501 illustrated in FIG. 2, performs authentication by determining whether information (e.g., user ID, organization ID, and password) transmitted from the user terminal 40 is information registered in the user authentication management DB 8001 in advance.

Further, the authentication unit 82 performs authentication by determining whether information (e.g., access ID and access password) transmitted from the sharing assistant server 11 is information registered in the server authentication management DB 8006 in advance.

The generation unit 83, which is implemented by the instructions from the CPU 501 illustrated in FIG. 2, has a function of generating related information to be registered in the related information management DB 8010.

The storing/reading processing unit 89, which is implemented by the instructions from the CPU 501 illustrated in FIG. 2 and the HDD controller 505 illustrated in FIG. 2, performs processing for storing various data in the storage unit 8000 and reading various data stored in the storage unit 8000.

(Functional Configuration of Voice-to-Text Conversion Server)

As illustrated in FIG. 4, the voice-to-text conversion server 13 includes, for example, a transmission/reception unit 91, a conversion unit 93, and a storing/reading processing unit 99. Each of the functional units of the voice-to-text conversion server 13 is a function or means implemented by any one of the components illustrated in FIG. 2 under the instructions from the CPU 501 executing programs loaded on the RAM 503 from the HD 504. Further, the voice-to-text conversion server 13 illustrated in FIG. 4 includes a storage unit 9000, implemented by the HD 504 illustrated in FIG. 2.

(Functional Configuration of Voice-to-Text Conversion Server)

Hereinafter, with reference to FIG. 4, a description is given of each functional unit of the voice-to-text conversion server 13. In the following description, each functional unit of the voice-to-text conversion server 13, among the components illustrated in FIG. 2, the relationship with the main components for implementing each functional unit of the voice-to-text conversion server 13 is to be also described.

The transmission/reception unit 91 of the voice-to-text conversion server 13 illustrated in FIG. 4 is implemented by the instructions from the CPU 501 illustrated in FIG. 2 and the network I/F 509 illustrated in FIG. 2. The transmission/reception unit 91 transmits and receives various data (or information) to and from other servers or other systems via the communication network 50.

The conversion unit 93, which is implemented by the instructions from the CPU 501 illustrated in FIG. 2, converts voice data (audio data) received by the transmission/reception unit 91 via the communication network 50 into voice-text data.

The storing/reading processing unit 99, which is implemented by the instructions from the CPU 501 illustrated in FIG. 2 and the HDD controller 505 illustrated in FIG. 2, performs processing for storing various data in the storage unit 9000 and reading various data stored in the storage unit 9000.

(Functional Configuration of Action Item Management Server)

As illustrated in FIG. 4, the action item management server 14 includes, for example, a transmission/reception unit 101, an authentication unit 102, a creation unit 103, a registration unit 104, an action unit 105, and a storing/reading processing unit 109. Each of the functional units of the action item management server 14 is a function or means implemented by any one of the components illustrated in FIG. 2 under the instructions from the CPU 501 executing programs loaded on the RAM 503 from the HD 504. Further, the action item management server 14 includes a storage unit 10000, implemented by the HD 504 illustrated in FIG. 2.

(User Authentication Management Table)

The storage unit 10000 includes a user authentication management DB 10001 configured by the user authentication management table illustrated in FIGS. 5 and 10. The user authentication management table stores or manages user ID identifying a user who can use the action item management function provided by the action item management server 14, user name, organization ID identifying an organization to which each user belongs, and password in association with each other.

(Action Item Management Table)

FIG. 20 is an example of schematic diagram of an action item management table. The storage unit 10000 includes, for example, an action item management DB 10002 configured by the action item management table illustrated in FIG. 20. The action item management table stores or manages action item ID, state, user ID of execution person who executes each action item, due date of each action item, and content of each action item in association with each other. The state indicates whether each action item has been completed or has not been completed.

(Functional Configuration of Action Item Management Server)

Hereinafter, with reference to FIG. 4, a description is given of each functional unit of the action item management server 14. In the following description of each functional unit of the action item management server 14, among the components illustrated in FIG. 2, the relationship with the main components for implementing each functional unit of the action item management server 14 is to be also described.

The transmission/reception unit 101 of the action item management server 14 illustrated in FIG. 4 is implemented by the instructions from the CPU 501 illustrated in FIG. 2 and the network I/F 509 illustrated in FIG. 2. The transmission/reception unit 101 transmits and receives various data or information to and from the user terminal 40, other server, other system, or the like via the communication network 50.

The authentication unit 102, which is implemented by the instructions from the CPU 501 illustrated in FIG. 2, performs authentication by determining whether information (e.g., user ID, organization ID, and password) transmitted from the user terminal 40 matches information registered in the user authentication management DB 10001 in advance.

The creation unit 103, which is implemented by the instructions from the CPU 501 illustrated in FIG. 2, creates, for example, image data of screen used for displaying one or more action items registered in the action item management table. The image data of screen created by the creation unit 63 is used to display a particular user who operates a particular user terminal 40, or an action item of project member to which a particular user belongs, using the particular user terminal 40.

The registration unit 104, which is implemented by the instructions from the CPU 501 illustrated in FIG. 2, receives a registration request of action item from, for example, the user terminal 40, and registers the action item in the action item management table illustrated in FIG. 20.

The action unit 105 is implemented by the instructions from the CPU 501 illustrated in FIG. 2. The action unit 105 receives a completion notification of action item from, for example, the user terminal 40, and updates the status or state of the action item management table illustrated in FIG. 20 from "not completed" to "completed" in accordance with the completion notification.

Further, when the action unit 105 receives an inquiry request for a state of an action item from, for example, the sharing assistant server 11 or the user terminal 40, the action unit 105 reads out the status or state of the action item corresponding to the inquiry request from the action item management table illustrated in FIG. 20, and then responds the status or state of the action item to the sharing assistant server 11 or the user terminal 40. With this configuration, the sharing assistant server 11 or the user terminal 40 can confirm whether the action item has been completed or has not been completed.

The storing/reading processing unit 109, which is implemented by the instructions from the CPU 501 illustrated in FIG. 2 and the HDD controller 505 illustrated in FIG. 2, performs processing for storing various data in the storage unit 10000 and reading various data stored in the storage unit 10000.

(Functional Configuration of User Terminal)

As illustrated in FIG. 4, the user terminal 40 includes, for example, a transmission/reception unit 51, a reception unit 52, a display control unit 54, a request unit 55, a generation unit 56, an audio control unit 58, and a storing/reading processing unit 59. Each of the functional units of the user terminal 40 is a function or means implemented by any one of the components illustrated in FIG. 2 under the instructions from the CPU 501 executing programs loaded on the RAM 503 from the HD 504. Further, the user terminal 40 includes a storage unit 5000, implemented by the HD 504 illustrated in FIG. 2.

(Functional Configuration of User Terminal)

Hereinafter, with reference to FIG. 4, a description is given of each functional unit of the user terminal 40.

The transmission/reception unit 51, which is implemented by the instructions from the CPU 501 and the network I/F 509 illustrated in FIG. 2, transmits and receives various data or information to and from other servers or other systems via the communication network 50. The transmission/reception unit 51 is an example of a transmission unit or reception unit.

The reception unit 52 is implemented mainly by the instructions from the CPU 501, the keyboard 511, and the pointing device 512 illustrated in FIG. 2, and receives various inputs from a user. The reception unit 52 is an example of reception unit.

The display control unit 54 is implemented by the instructions from the CPU 501 illustrated in FIG. 2, and displays various screens on the display 506.

For example, the display control unit 54 accesses the sharing assistant server 11, the schedule management server 12, or the action item management server 14 by activating and executing the meeting minutes application 5502a or the browser 5502b operable on the OS 5501 illustrated in FIG. 3.

Then, the display control unit 54 downloads WebApplication (WebAPP) including at least HyperText Markup Language (HTML), and Cascading Style Sheets (CSS), JAVASCRIPT (registered trademark), or the like, and instructs the display 506 to display various image data generated by the WebAPP. Further, for example, the display control unit 54 instructs the display 506 to display image data generated by "HTML5" including data expressed using a given format, such as Extensible Markup Language (XML), JavaScript Object Notation (JSON), or Simple Object Access Protocol (SOAP) format. The display control unit 54 is an example of display control unit.

The request unit 55, which is implemented by the instructions from the CPU 501 illustrated in FIG. 2, transmits various requests to the action item management server 14, such as a registration request of action item, and an inquiry request of state of action item.

The generation unit 56, which is implemented by the instructions from the CPU 501 illustrated in FIG. 2, has a function of generating image data of various screens to be displayed on the display 506. The generation unit 56 generates the image data of various screens using the content data received by the transmission/reception unit 51.

For example, the generation unit 56 generates image data related to text data, which is content image data, in order to render text data, which is content data, and to display the rendered data. The rendering is a process of interpreting data written in a web page description language (e.g., HTML, CSS, XML), and calculating an arrangement of characters, image data, or the like actually displayed on a screen.

The audio control unit 58 which is implemented by the instructions from the CPU 501 illustrated in FIG. 2, has a function of outputting sound signal from a speaker. The audio control unit 58 sets sound data to be output from the speaker, and reproduces the sound data by outputting sound signals related to the set sound data from the speaker.

The storing/reading processing unit 59, which implemented by the instructions from the CPU 501 and the HDD controller 505 illustrated in FIG. 2, stores various data in the storage unit 5000 and reads various data from the storage unit 5000. In this description, some devices and controllers can be configured using one or more circuits.

Each of the above described IDs is an example of identification information. The organization ID includes, for example, company name, business office name, department name, region name, or the like. The user ID includes, for example, employee number, driver's license number, and a social number in the Japanese social security and tax number system.

(Processing/Operation)

Hereinafter, with reference to FIGS. 21 to 24, a description is given of processing/operation of each embodiment.

(Schedule Registration Processing)

Hereinafter, a description is given of a process that a reservation holder A (e.g., name is Taro Riko) registers his/her own schedule from the user terminal 40 to the schedule management server 12. The reservation holder is a reservation person.

Figure 21:
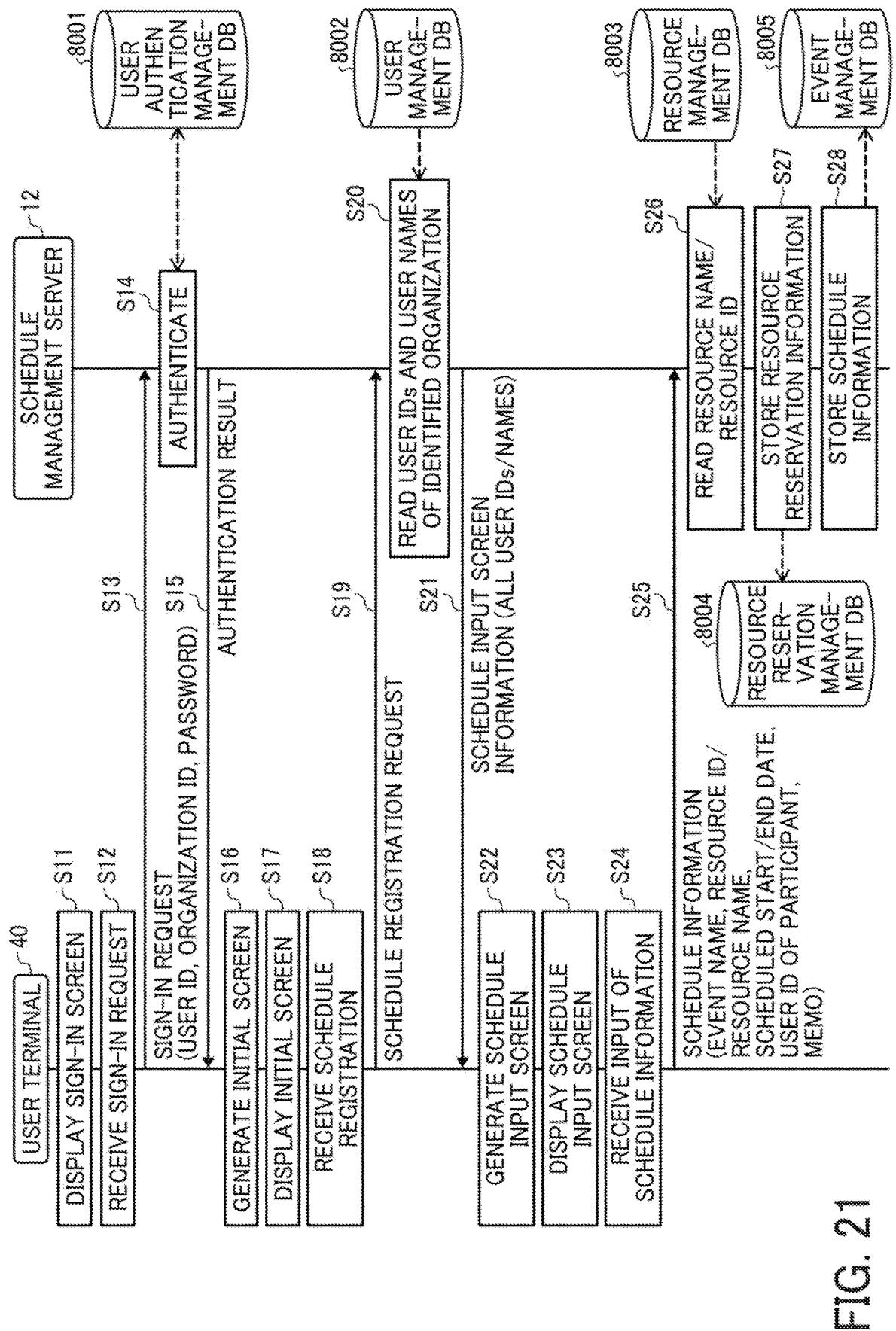
FIG. 21 is an example sequence diagram illustrating a process of registering a schedule.
Figure 22:
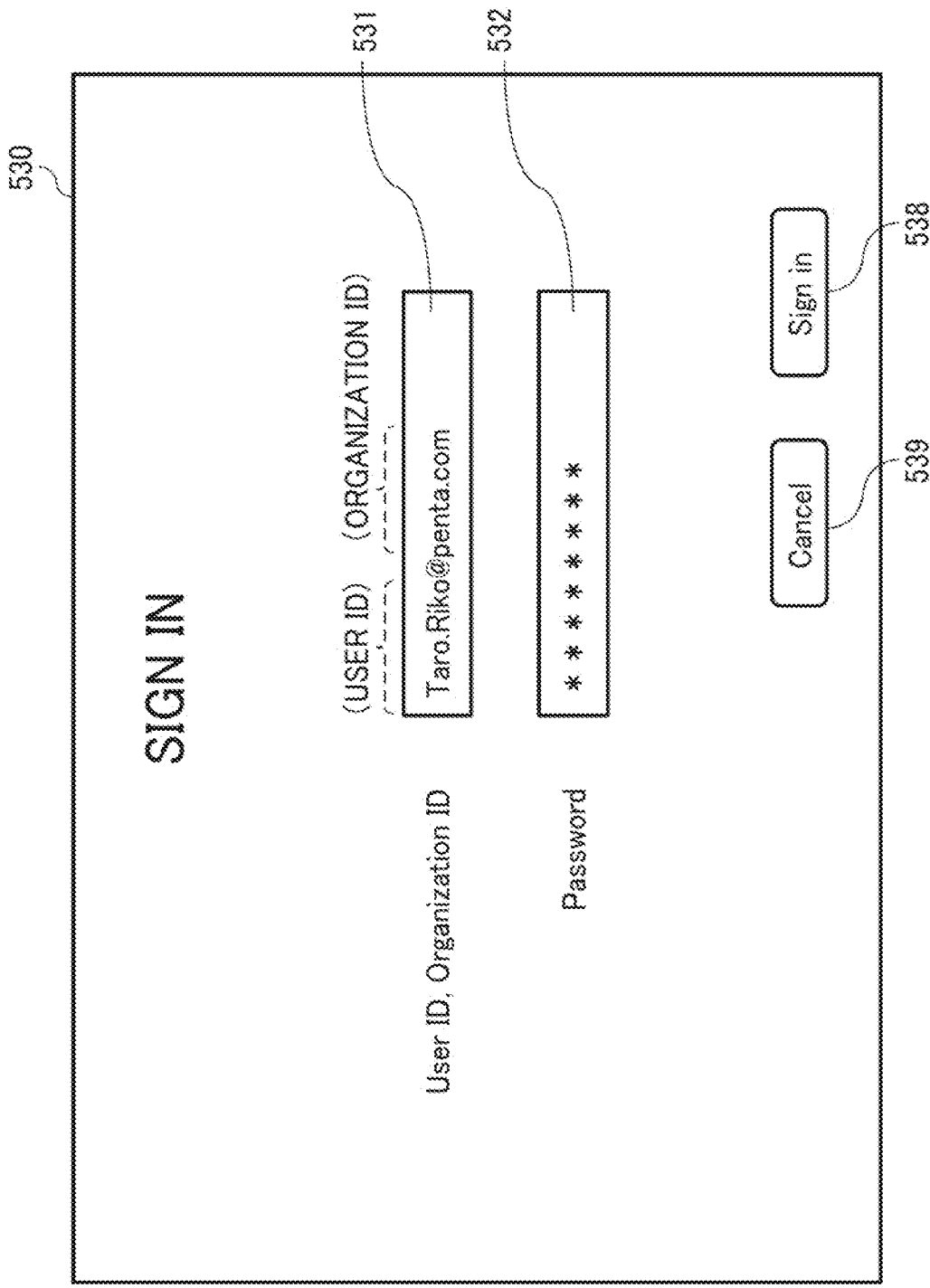
FIG. 22 is an example of sign-in screen.
Figure 23:
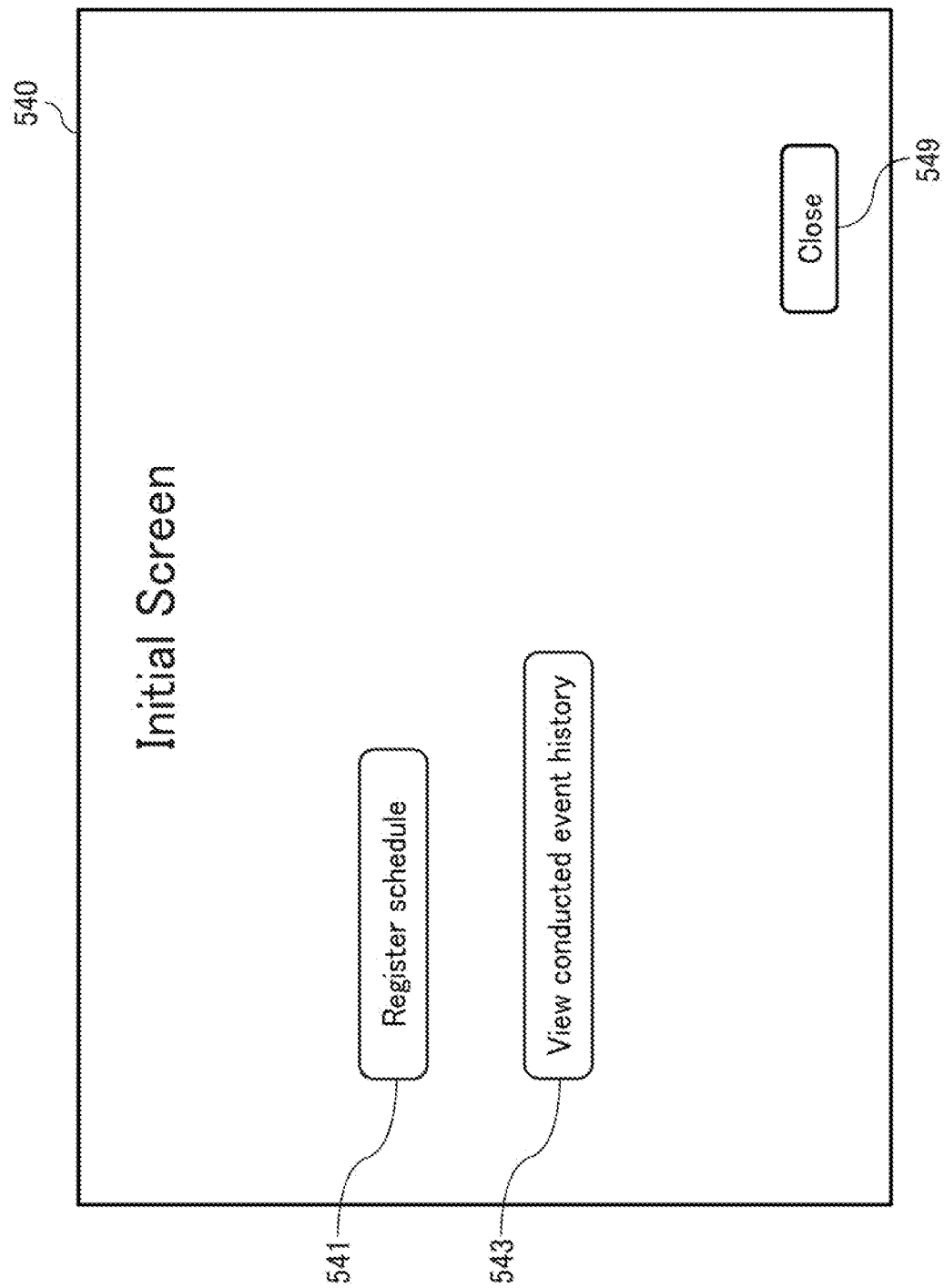
FIG. 23 is an example of initial screen of a user terminal.
Figure 24:
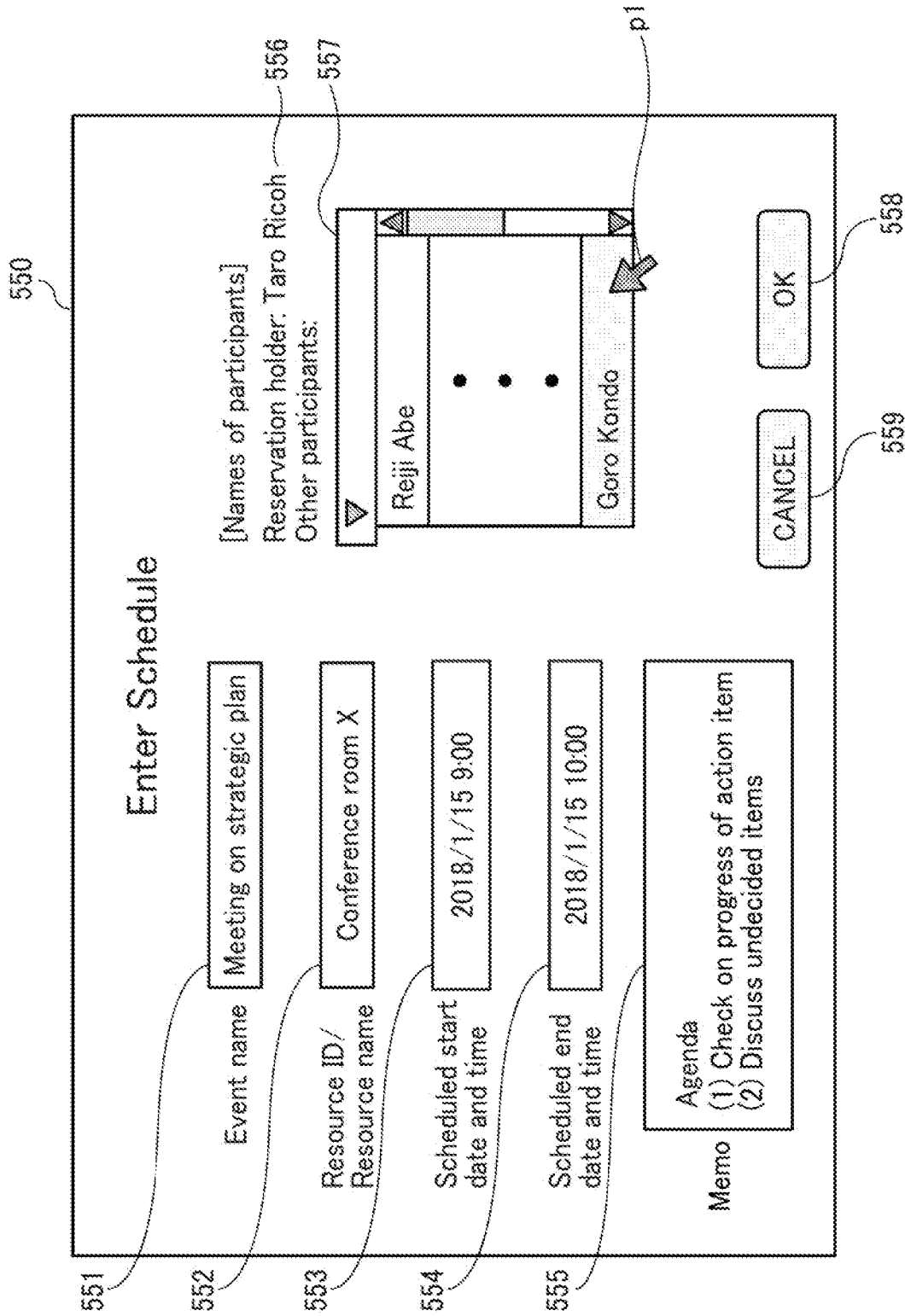
FIG. 24 is an example of schedule input screen.

FIG. 21 is an example sequence diagram of a process of registering a schedule (schedule registration process). FIG. 22 is an example of sign-in screen. FIG. 23 is an example of initial screen of the user terminal 40. FIG. 24 is an example of schedule input screen.

At first, when the user A operates the keyboard 511 of the user terminal 40, the display control unit 54 of the user terminal 40 displays a sign-in screen 530 used for performing the sign-in on the display 506 as illustrated in FIG. 22 (step S11).

The sign-in screen 530 includes, for example, an input field 531, an input field 532, a sign-in button 538, and a cancel button 539.

The input field 531 is used for inputting a user ID and an organization ID of a user. The input field 532 is used for inputting a password.

The sign-in button 538 is to be pressed in a case of performing the sign-in. The cancel button 539 is to be pressed in a case of cancelling the sign-in.

In this example case, the user ID and the organization ID configure an e-mail address of the user A. The user name portion of the e-mail address indicates the user ID, and the domain name portion indicates the organization ID. Further, the input field 531 may be an input field used for separately inputting the user ID and the organization ID instead of the e-mail address.

Then, if the user A inputs his/her user ID and organization ID in the input field 531, inputs his/her password in the input field 532, and then presses the sign-in button 538, the reception unit 52 receives or accepts a sign-in request (step S12).

Then, the transmission/reception unit 51 of the user terminal 40 transmits sign-in request information indicating the sign-in request to the schedule management server 12 (step S13). The sign-in request information includes information received in step S12 such as user ID, organization ID, and password. Then, the transmission/reception unit 81 of the schedule management server 12 receives the sign-in request information.

Then, the authentication unit 82 of the schedule management server 12 authenticates the user A using the user ID, organization ID, and password (step S14). Specifically, the storing/reading processing unit 89 searches a combination of user ID, organization ID, and password corresponding to a combination of the user ID, organization ID, and password received in step S13, in the user authentication management DB 8001 (see FIG. 10).

If the corresponding combination exists in the user authentication management DB 8001, the authentication unit 82 determines that the user A of request source is an authenticated user.

On the other hand, if the corresponding combination does not exist in the user authentication management DB 8001, the authentication unit 82 determines that the user A is not an authenticated user (i.e., the user A is an unauthenticated user). If the user A is the unauthenticated user, the transmission/reception unit 81 notifies the user terminal 40 that the user A is the unauthenticated user. In this example case, the description is given by assuming the user A is the authenticated user.

Then, the transmission/reception unit 81 transmits an authentication result to the user terminal 40 (step S15). Then, the transmission/reception unit 51 of the user terminal 40 receives the authentication result.

Then, in response to receiving the authentication result indicating that the authentication result is valid in step S15, the generation unit 56 of the user terminal 40 generates an initial screen 540 illustrated in FIG. 23 (step S16).

Then, the display control unit 54 of the user terminal 40 instructs the display 506 to display the initial screen 540 as illustrated in FIG. 23 (step S17).

As illustrated in FIG. 23, the initial screen 540 includes, for example, a "register schedule" button 541 to be pressed when a schedule is registered, and a "view conducted event record" button 543 to be pressed when a conducted event record is to be viewed.

If the user presses the "register schedule" button 541, the reception unit 52 receives the schedule registration request (step S18).

Then, the transmission/reception unit 51 transmits the schedule registration request information to the schedule management server 12 (step S19). Then, the transmission/reception unit 81 of the schedule management server 12 receives the schedule registration request information.

Then, the storing/reading processing unit 89 of the schedule management server 12 searches the user management DB 8002 (see FIG. 11) using the organization ID received in step S13 as a search key to read out all of corresponding user IDs and all of corresponding user names (step S20).

Then, the transmission/reception unit 81 transmits schedule input screen information to the user terminal 40 (step S21). Then, the transmission/reception unit 51 of the user terminal 40 receives the schedule input screen information.

The schedule input screen information includes all of user IDs and all of user names read out in step S20. All of user names also include a title (name) of the reservation holder, such as the user A, who has input the information for the sign-in in step S12.

Then, at the user terminal 40, the generation unit 56 generates a schedule input screen 550 (see FIG. 24) using the schedule input screen information received in step S21 (step S22).

Then, the display control unit 54 of the user terminal 40 instructs the display 506 to display the schedule input screen 550 (step S23).

As illustrated in FIG. 24, the schedule input screen 550 includes, for example, an input field 551, an input field 552, an input field 553, an input field 554, an input field 555, a display area 556, a selection menu 557, an "OK" button 558, and a "CANCEL" button 559.

The input field 551 is used for inputting an event name. The input field 552 is used for inputting a resource ID or a resource name to be used. The input field 553 is used for inputting a scheduled start date/time of execution of event.

The input field 554 is used for inputting a scheduled end date/time of execution of event. The input field 555 is used for inputting a memo such as agenda or the like.

The display area 556 is used for displaying a reservation holder name. The selection menu 557 is used for selecting one or more participant names of participants other than the reservation holder.

The "OK" button 558 is to be pressed in a case of registering a reservation. The "CANCEL" button 559 is to be pressed in a case of canceling information being input or input information.

Further, it is not required to input the resource ID or resource name in the input field 552, and the input field 552 can be left blank when no resources is used.

The reservation holder name is a name of a user who has input information for the sign-in to the user terminal 40 in step S12. Further, a pointer p1 of the pointing device 512, such as a mouse pointer, is also displayed on the schedule input screen 550.

Then, the user A inputs given information items into the input fields 551 to 555, selects a name (user name) of a user who is requested to be participated an event from the selection menu 557 using the pointer p1, and then presses the "OK" button 558.

Then, the reception unit 52 receives an input of the schedule information (step S24).

Then, the transmission/reception unit 51 transmits the schedule information to the schedule management server 12 (step S25).

The schedule information includes event name, resource ID (or resource name), scheduled start date/time, scheduled end date/time, user ID of each participant, and memo.

If a resource ID is input in the input field 552 on the schedule input screen 550, the transmission/reception unit 51 transmits the resource ID to the schedule management server 12. Further, if a resource name is input in the input field 552 on the schedule input screen 550, the transmission/reception unit 51 transmits the resource name to the schedule management server 12.

Further, if a user name is selected in the selection menu 557 on the schedule input screen 550, since the user ID is also received in step S21, the transmission/reception unit 51 transmits the user ID corresponding to the selected user name to the schedule management server 12. Then, the transmission/reception unit 81 of the schedule management server 12 receives the schedule information.

Then, if the schedule management server 12 receives the resource ID (or resource name) in step S25, the schedule management server 12 searches the resource management DB 8003 (see FIG. 12) using the received resource ID as a search key to read out the corresponding resource name (or resource ID) (step S26).

Then, the storing/reading processing unit 89 stores reservation information for the resource name (or resource ID) read out in step S26 in the resource reservation management DB 8004 (see FIG. 13) (step S27). The storing/reading processing unit 89 adds one record of the reservation information to the resource reservation management table stored in the resource reservation management DB 8004 managed by the scheduler registered in advance. The reservation information is configured based on the schedule information received in step S25 and the resource name (or resource ID) read out in step S26.

Further, the scheduled use start date/time stored in the resource reservation management DB 8004 corresponds to the scheduled start date/time included in the schedule information. Further, the scheduled use end date/time stored in the resource reservation management DB 8004 corresponds to the scheduled end date/time included in the schedule information.

Further, the storing/reading processing unit 89 stores the schedule information (event information) in the event management DB 8005 (see FIG. 14) (step S28). The storing/reading processing unit 89 adds one record of the schedule information to the event management table of the event management DB 8005 managed by the scheduler registered in advance.

The schedule information is configured based on the schedule information received in step S25. Further, the scheduled event start date/time stored in the event management DB 8005 corresponds to the scheduled start date/time included in the schedule information. Further, the scheduled event end date/time stored in the event management DB 8005 corresponds to the scheduled end date/time included in the schedule information.

With this configuration, the user A can register his/her schedule in the schedule management server 12.

(Event Start Processing)

Hereinafter, with reference to FIGS. 25 to 29, a description is given of a process of holding a meeting with other participant using the user terminal 40 in a conference room X reserved by the reservation holder A (e.g., name is Taro Riko).

Figure 25:
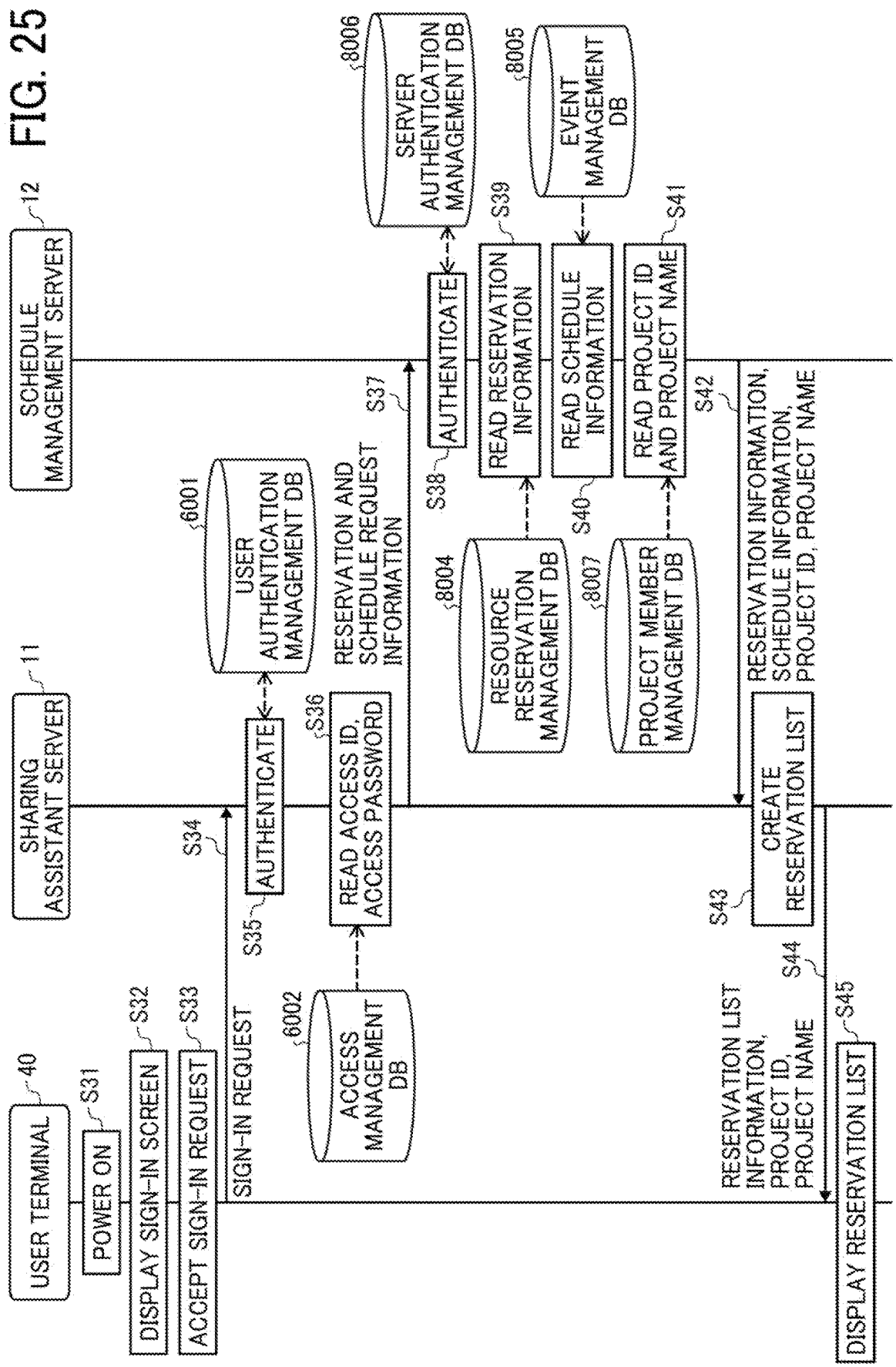
FIGS. 25 and 26 are examples of sequence diagrams indicating a process of starting an event.
Figure 26:
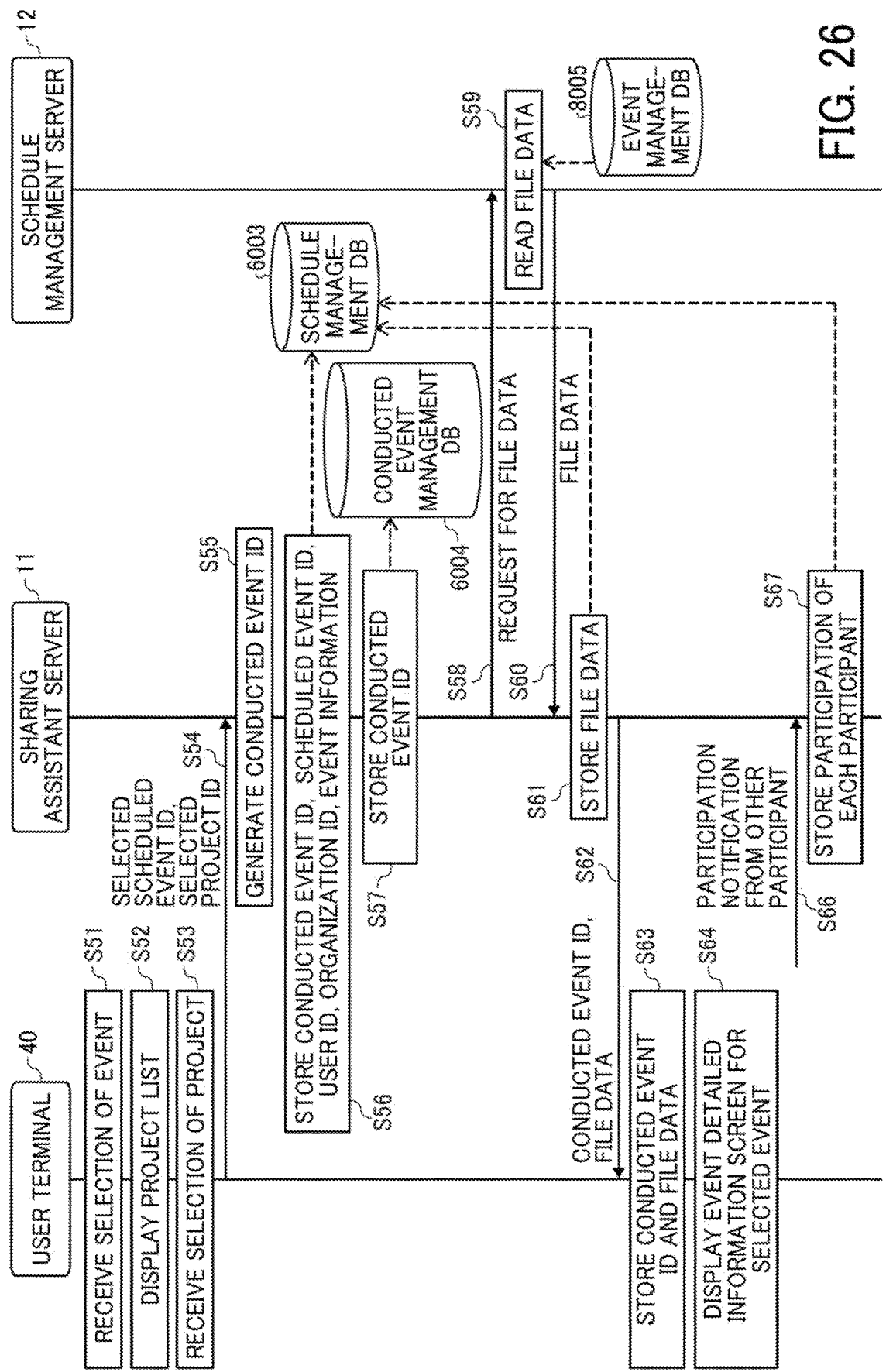
Figure 28:
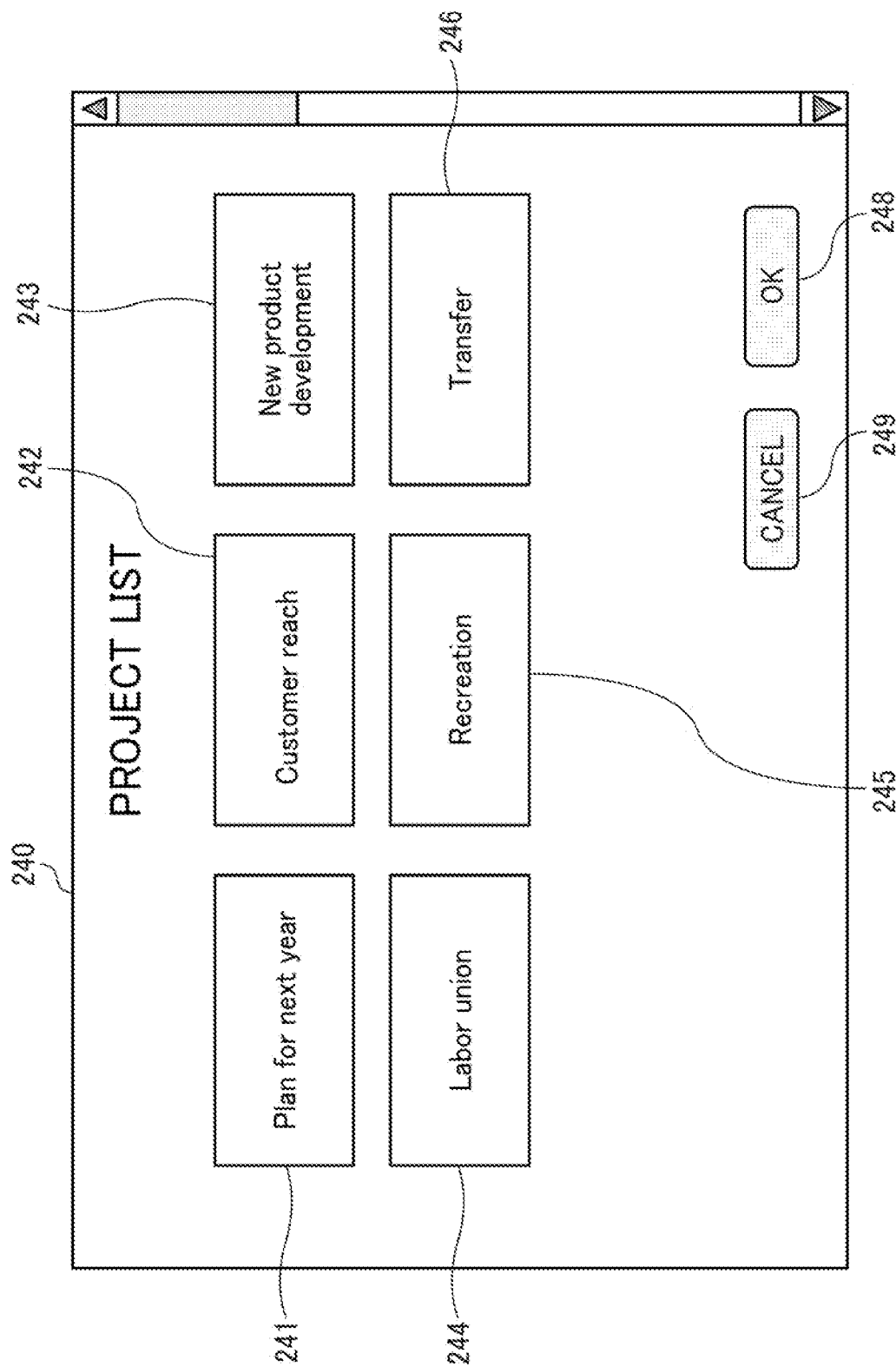
FIG. 28 is an example of project list screen.
Figure 29:
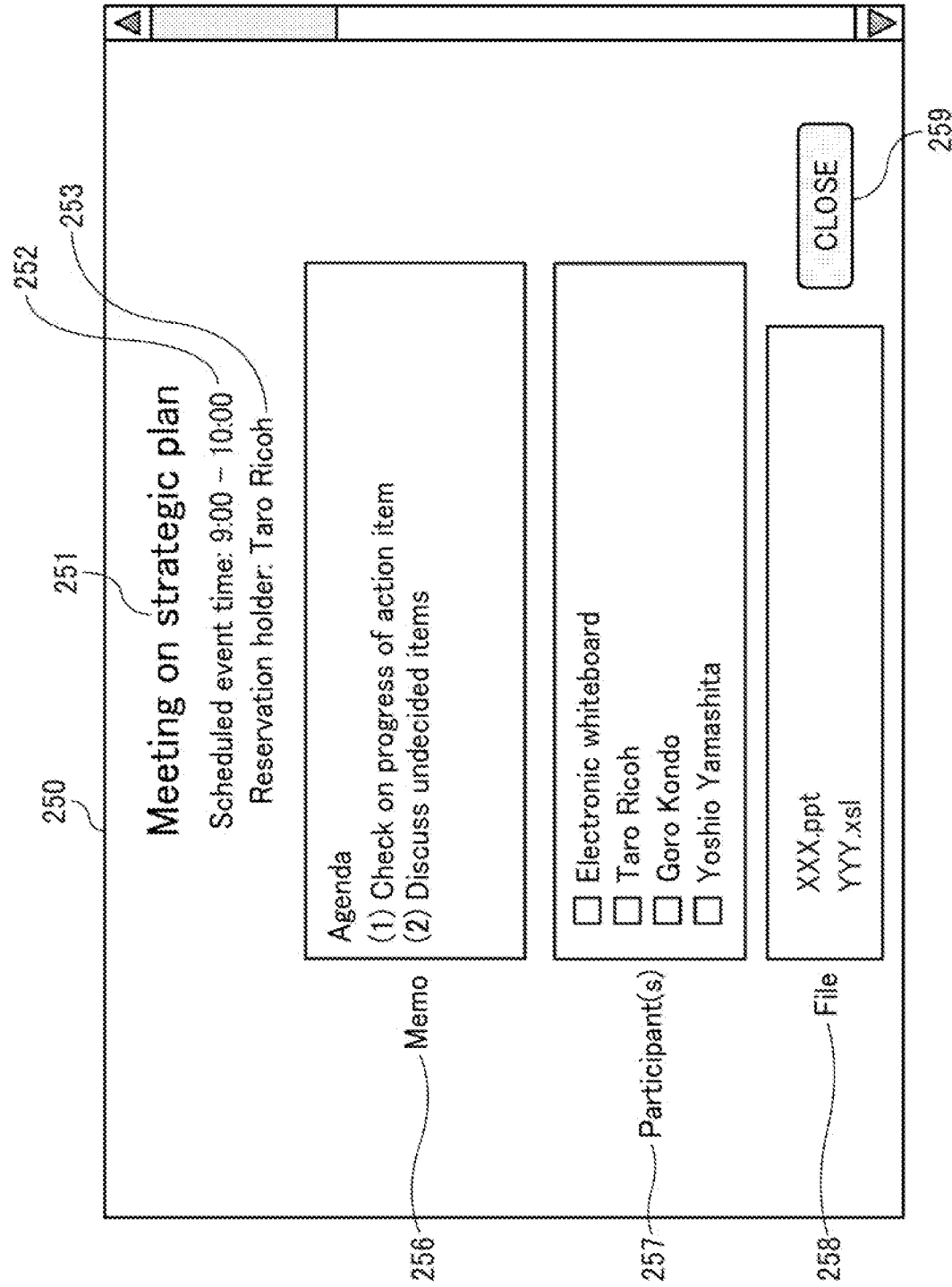
FIG. 29 is an example of event detailed information screen.

FIGS. 25 and 26 are examples of sequence diagrams indicating a process of starting an event. FIG. 27 is an example of reservation list screen of resource. FIG. 28 is an example of project list screen. FIG. 29 is an example of event detailed information screen.

At first, when the user A presses a power switch of the user terminal 40, the reception unit 52 of the user terminal 40 receives a power ON signal from the user A (step S31).

Then, the display control unit 54 of the user terminal 40 displays a sign-in screen used for performing a sign-in on the display 506 (step S32).

Then, if the user A inputs his/her e-mail address and password on the sign-in screen, the reception unit 52 receives or accepts a sign-in request (step S33).

Then, the transmission/reception unit 51 transmits sign-in request information indicating the sign-in request to the sharing assistant server 11 (step S34). The sign-in request information includes the information received in step S33 such as user ID, organization ID, and password. Then, the transmission/reception unit 61 of the sharing assistant server 11 receives the sign-in request information.

Then, the authentication unit 62 of the sharing assistant server 11 authenticates the user A using the user ID of the user A, organization ID, and password of the user A received in step S34 (step S35). Specifically, the storing/reading processing unit 69 uses the user ID, organization ID, and password of the user A received in step S34 as search keys to search a combination of user ID, organization ID, and password corresponding to a combination of the user ID, organization ID, and password of the user A received in step S34, in the user authentication management DB 6001 (see FIG. 5).

If the corresponding combination exists in the user authentication management DB 6001, the authentication unit 62 determines that the user A of request source is an authenticated user.

On the other hand, if the corresponding combination does not exist in the user authentication management DB 6001, the authentication unit 62 determines that the user A of request source is not an authenticated user (i.e., the user A is an unauthenticated user). If the user A is the unauthenticated user, the transmission/reception unit 61 notifies the user terminal 40 that the user A is the unauthenticated user. In this example case, the description is given by assuming the user A is the authenticated user.

Then, the storing/reading processing unit 69 of the sharing assistant server 11 searches the access management DB 6002 (see FIG. 6) using the organization ID of the user A received in step S34 as a search key to read out the corresponding access ID and access password (step S36).

Then, the transmission/reception unit 61 transmits, to the schedule management server 12, reservation request information indicating a request for reservation information of resource, and schedule request information indicating a request for schedule information of user (step S37). The reservation request information and the schedule request information include the user ID, organization ID, and password of the user A received in step S34, and the access ID and access password read out in step S36. Then, the transmission/reception unit 81 of the schedule management server 12 receives the reservation request information and the schedule request information.

Then, the authentication unit 82 of the schedule management server 12 authenticates the sharing assistant server 11 using the access ID and access password (step S38).

Specifically, the storing/reading processing unit 89 searches a combination of the access ID and access password corresponding to a combination of the access ID and access password received in step S37, in the server authentication management DB 8006 (see FIG. 15).

If the corresponding combination exists in the server authentication management DB 8006, the authentication unit 82 determines that the sharing assistant server 11 of request source is an authenticated access user.

On the other hand, if the corresponding combination does not exist in the server authentication management DB 8006, the authentication unit 82 determines that the sharing assistant server 11 of request source is not an authenticated access user (i.e., the sharing assistant server 11 is an unauthenticated access user). If the sharing assistant server 11 is the unauthenticated user, the transmission/reception unit 81 notifies the sharing assistant server 11 that the sharing assistant server 11 is the unauthenticated access user. In this example case, the description is given by assuming the sharing assistant server 11 is the authenticated access user.

Then, the storing/reading processing unit 89 of the schedule management server 12 reads out the corresponding reservation information by searching the resource reservation management DB 8004 (see FIG. 13) managed by the scheduler using the resource ID received in step S37 as a search key (step S39). In step S39, the storing/reading processing unit 89 reads out the reservation information whose scheduled use start date/time is today.

Further, the storing/reading processing unit 89 searches the event management DB 8005 (see FIG. 14) managed by the scheduler using the user ID of the user A received in step S37 as a search key to read out the corresponding schedule information (step S40).

In this example case, the storing/reading processing unit 89 reads out the schedule information whose event start schedule date is today. If the schedule management server 12 is located in a country or region different from the user terminal 40, the schedule management server 12 adjusts the time zone in accordance with the country or region where the user terminal 40 is located based on the time zone information.

Then, the storing/reading processing unit 89 searches the project member management DB 8007 (see FIG. 16) using the user ID of the user A received in step S37 as a search key to read out the project ID and the project name of all of projects including the user ID of the user A (step S41).

Then, the transmission/reception unit 81 transmits, to the sharing assistant server 11, the reservation information read out in step S39, the schedule information read out in step S40, and all of project IDs and all of project names read out in step S41 (step S42). Then, the transmission/reception unit 61 of the sharing assistant server 11 receives the reservation information, the schedule information, all of project IDs, and all of project names.

Then, the creation unit 63 of the sharing assistant server 11 creates a reservation list based on the reservation information and the schedule information received in step S42 (step S43).

Then, the transmission/reception unit 61 transmits, to the user terminal 40, reservation list information indicating content of the reservation list, and all of project IDs and all of project names (step S44). Then, the transmission/reception unit 51 of the user terminal 40 receives the reservation list information, and all of project IDs and all of project names.

Then, at the user terminal 40, the display control unit 54 instructs the display 506 to display a reservation list screen 230 illustrated in FIG. 27 (step S45). The reservation list screen 230 includes a display area 231 used for displaying a resource name (in this case, place name), and a display area 232 used for displaying date of today.

Further, the reservation list screen 230 displays event information 235 to 237 indicating each event using a particular resource (e.g., conference room X in this example) of the date of today. The event information includes, for example, scheduled use start time and end time of resource, event name, and name of person who has reserved each resource (reservation holder name) for each event. The event information includes, for example, start buttons 235s to 237s to be pressed when a user specifies or designates an event to be started.

Then, in FIG. 27, if the user A presses the start button 235s with the pointing device 512, the reception unit 52 receives a selection of an event indicated by the event information 235 (step S51).

Then, the display control unit 54 displays a project list screen 240, illustrated in FIG. 28, on the display 506 based on the project ID and the project name received in step S44 (step S52).

As illustrated in FIG. 28, the project list screen 240 includes, for example, project icons 241 to 246 indicating each project. The project list screen 240 further includes an "OK" button 248 to be pressed when to confirm a selected project icon, and a "CANCEL" button 249 to be pressed when to cancel a selection of project icon.

Then, in FIG. 28, when the user A presses the project icon 241 with the pointing device 512, the reception unit 52 receives a selection of a project indicated by the project icon 241 (step S53).

Then, the transmission/reception unit 51 of the user terminal 40 transmits, to the sharing assistant server 11, the scheduled event ID indicating the scheduled event selected in step S51, and the project ID indicating the project selected in step S53 (step S54). The processing of step S54 is a transmission request processing of conducted event identification information. Then, the transmission/reception unit 61 of the sharing assistant server 11 receives the selected scheduled event ID and the selected project ID.

Then, at the sharing assistant server 11, the generation unit 64 generates a unique conducted event ID (step S55).

Then, the storing/reading processing unit 69 stores or manages the conducted event ID generated in step S55, the scheduled event ID, user ID and organization ID of reservation holder, and the event information received in step S54 in association with each other (step S56).

The user ID and organization ID of the reservation holder and the event information are IDs and information based on the reservation information and the schedule information received in step S42. At this stage, information is not yet input in a column of participation or absence of the reservation management table (see FIG. 7).

Then, the storing/reading processing unit 69 stores or manages the project ID received in step S54, and the conducted event ID generated in step S55 in association with each other (step S57).

Then, at the sharing assistant server 11, the transmission/reception unit 61 transmits, to the schedule management server 12, file data transmission request information indicating a transmission request of file data registered in the schedule management server 12 (step S58). The file data transmission request information includes the scheduled event ID received in step S54, the user ID and organization ID of the user A received in step S34, and the access ID and access password read out in step S36. Then, the transmission/reception unit 81 of the schedule management server 12 receives the file data transmission request information.

Then, the storing/reading processing unit 89 of the schedule management server 12 searches the event management DB 8005 (see FIG. 14) using the scheduled event ID received in step S58 as a search key to read out file data associated with the scheduled event ID (step S59).

Then, the transmission/reception unit 81 transmits the file data read out in step S59 to the sharing assistant server 11 (step S60). Then, the transmission/reception unit 61 of the sharing assistant server 11 receives the file data.

Then, the storing/reading processing unit 69 of the sharing assistant server 11 stores and manages the file data received in step S60 in the schedule management DB 6003 (see FIG. 7) in association with the scheduled event ID received in step S54 and the conducted event ID generated in step S55 (step S61).

Then, the transmission/reception unit 61 transmits the conducted event ID generated in step S55 and the file data received in step S60 to the user terminal 40 used by the user A (step S62). Then, the transmission/reception unit 51 of the user terminal used by the user A receives the conducted event ID and the file data.

Further, the transmission/reception unit 61 transmits a participation request notice to the user terminal 40 used by other participant. The participation request notice for this particular event includes, for example, various information used for participating the event started by the user A.

With this configuration, the other participant can use the participation request notice for the particular event to notify his/her participation to the particular event from the user terminal 40 used by the other participant to the sharing assistant server 11 to participate the particular event, such as the online meeting started by the user A.

Then, at the user terminal 40, the storing/reading processing unit 59 stores the conducted event ID and the file data in the storage unit 5000 (step S63). The file data transmitted from the sharing assistant server 11 is stored in a specific storage area of the storage unit 5000. With this configuration, the user terminal 40 accesses the specific storage area during the execution of the event, and the display control unit 54 instructs the display 506 to display the file data stored in the specific storage area.

The specific storage area is a temporary storage destination of data provided for each event that is being conducted, and is a storage area specified by an arbitrary path (text string) indicating a location in the storage unit 5000.

Further, the specific storage area is not limited to the configuration provided inside the user terminal 40. For example, the specific storage area may be provided in an external storage device connected to the user terminal 40 or in a local server which exists in an on-premise environment and can communicate with the user terminal 40.

Then, as illustrated in FIG. 29, the display control unit 54 instructs the display 506 to display a detailed information screen 250 of the selected event (hereinafter, event detailed information screen 250) (step S64).

The event detailed information screen 250 includes, for example, a display area 251 used for displaying event name, a display area 252 used for displaying scheduled event execution time (scheduled start time and scheduled end time) of event, and a display area 253 used for displaying name of reservation holder.

Further, the event detailed information screen 250 includes a display area 256 used for displaying content of memo, a display area 257 used for displaying name of scheduled participant, and a display area 258 used for displaying identification information (e.g., file name) identifying file data stored in the specific storage area of the storage unit 5000.

The display area 257 displays the name of reservation holder and the name of selected other participant indicated in FIG. 24.

Further, the display area 258 displays a file name of file data stored in the specific storage area of the storage unit 5000, that is a file name of file data downloaded from the sharing assistant server 11, and also displays a file name of file data being downloaded from the sharing assistant server 11.

Further, the event detailed information screen 250 includes a "close" button 259 at the lower right portion of the event detailed information screen 250, which is to be pressed when the event detailed information screen 250 is closed.

Then, the other participant, who has received the participation request notice, sends or transmits a participation notification to the event from the user terminal 40 used by the other participant to the sharing assistant server 11, and then participates the event, such as an online meeting started by the user A (step S66). Then, the transmission/reception unit 61 of the sharing assistant server 11 receives the user ID of the other participant who has participated the event, such as the online meeting started by the user A.

Then, the sharing assistant server 11 inputs a mark of participation or absence of each participant in the column of participation or absence in the schedule management DB 6003 (see FIG. 7), that has not been input, and then stores and manages the participation or absence of each participant (step S67).

With this configuration, the user A and the other participant can start the event (e.g., online meeting) using the resource (e.g., conference room X) and the user terminal 40. Then, the display control unit 54 instructs the display 506 to display an event execution screen.

(Registration and Display Processing of Conducted Event Record)

Figure 30:
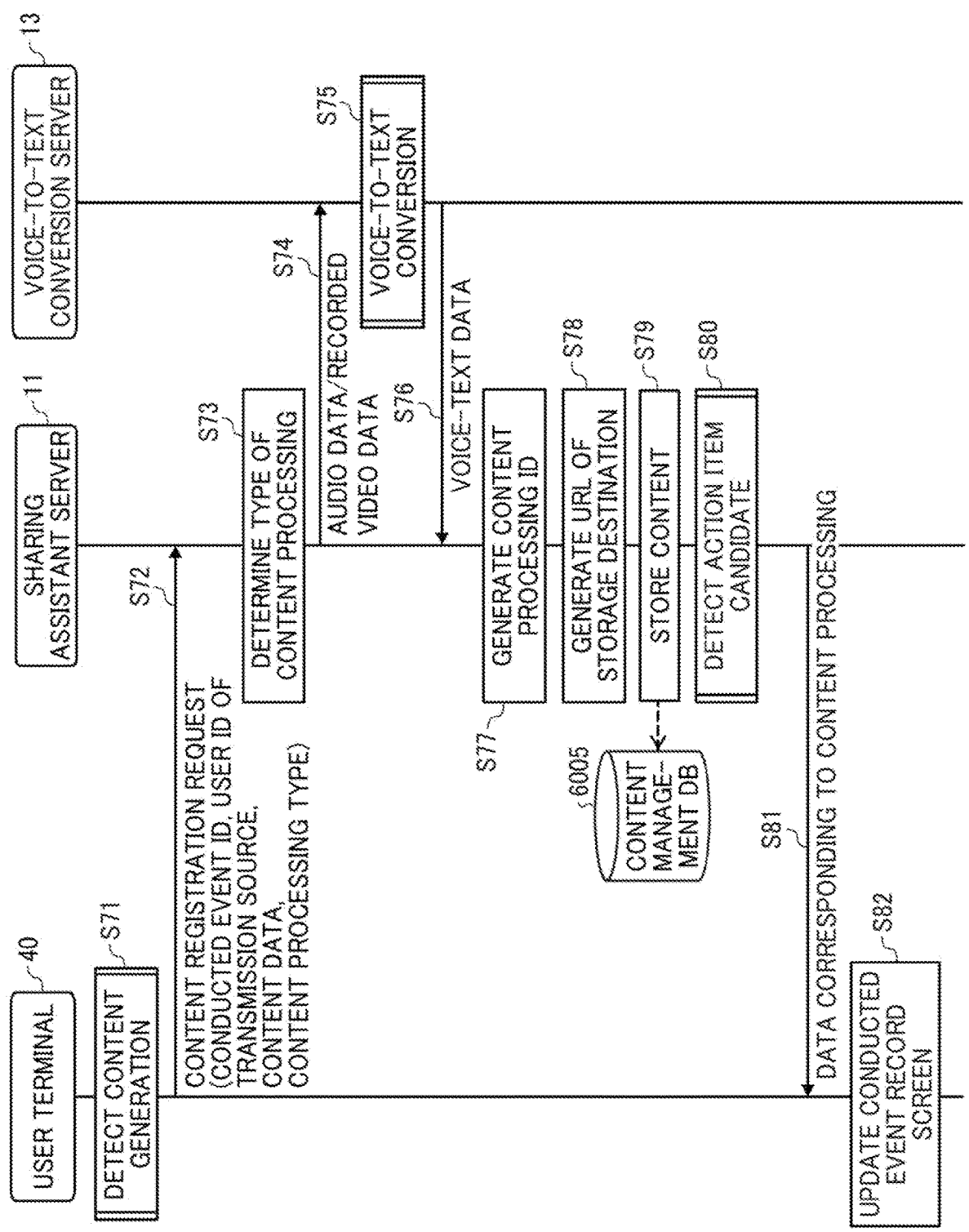
FIG. 30 is an example sequence diagram of a process of registering a conducted event record.
Figure 31:
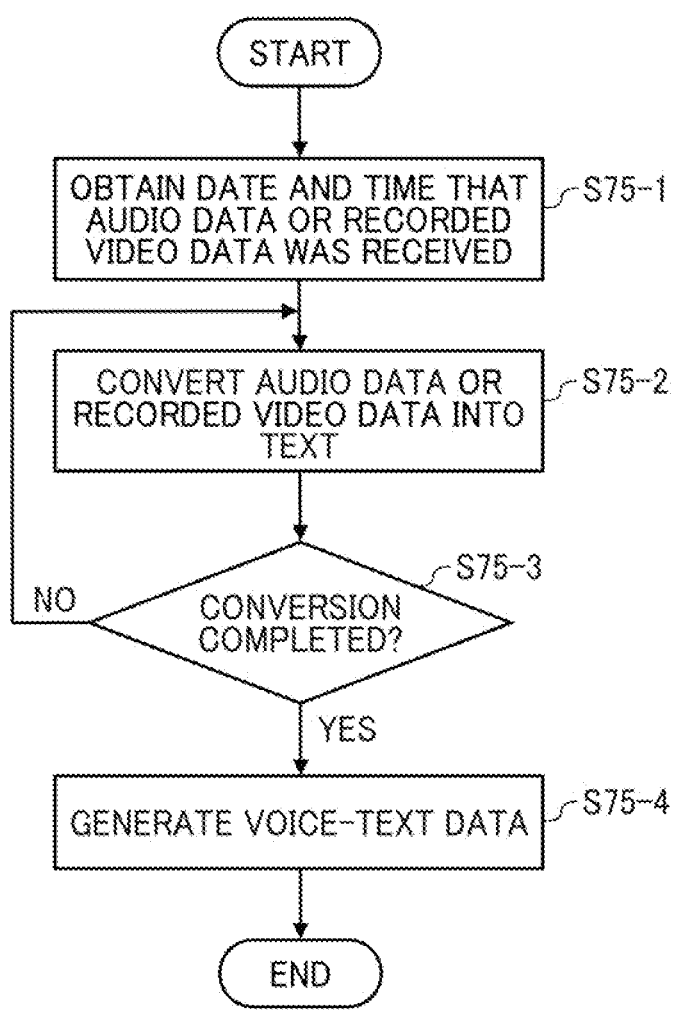
FIG. 31 is an example flowchart of processing of voice-to-text conversion.

Hereinafter, with reference to FIGS. 30 and 31, a description is given of registration and display processing of the conducted event record. FIG. 30 is an example sequence diagram of a process of registering a conducted event record. FIG. 31 is an example flowchart of processing of voice-to-text conversion.

When an event such as an online meeting has started, the user A and other participant who are members of a project for collaboration work can hold the online meeting using a voice call function, a video call function, a chat function, or the like. If the user A or other participant use functions, such as audio-recording/video-recording function, chat function, or message function, the user terminal 40 performs various types of content processing corresponding to each function (step S71).

For example, in a case of the audio-recording/video-recording function, the user terminal 40 performs the content processing in which the recorded audio data or recorded video data is generated as content. In a case of the chat function or message function, the user terminal 40 performs the content processing in which the input text data is generated as content.

Then, the transmission/reception unit 51 transmits registration request information indicating a registration request of the generated content to the sharing assistant server 11 (step S72). In step S72, the transmission/reception unit 51 automatically transmits the registration request information every time the content is generated. The content may be transmitted in a file format or in a stream format. The registration request information includes the conducted event ID, user ID of content transmission source, content data, and content processing type information. Then, the transmission/reception unit 61 of the sharing assistant server 11 receives the registration request information.

Then, the determination unit 65 of the sharing assistant server 11 determines the type of the received content processing based on the type information of the content processing included in the registration request information received by the transmission/reception unit 61 (step S73).

If the determination unit 65 determines that the type of content processing is "audio-recording function", the transmission/reception unit 61 of the sharing assistant server 11 transmits audio data (recorded audio) as content data to the voice-to-text conversion server 13 (step S74).

Further, if the determination unit 65 determines that the type of content processing is the "video-recording function", the transmission/reception unit 61 of the sharing assistant server 11 transmits the recorded video data as content data to the voice-to-text conversion server 13 (step S74).

Then, the transmission/reception unit 91 of the voice-to-text conversion server 13 receives the audio data or recorded video data. If the type of content processing is other than "audio-recording function/video-recording function", the sharing assistant server 11 does not perform the processing of steps S74 to S76, but proceeds the sequence to step S77.

Then, the conversion unit 93 of the voice-to-text conversion server 13 converts the audio data or recorded video data received by the transmission/reception unit 91 into text data (step S75). The processing of step S75 may be performable as a real-time process or a batch process.

Hereinafter, with reference to FIG. 31, a description is given of the voice-to-text conversion processing at the voice-to-text conversion server 13.

At first, the conversion unit 93 acquires or obtains information indicating the date and time when the audio data or recorded video data was received by the transmission/reception unit 91 (step S75-1). The information acquired in step S75-1 may be information indicating date and time when the sharing assistant server 11 has received the audio data or recorded video data, or date and time when the sharing assistant server 11 has transmitted the audio data or recorded video data. In this case, in step S74, the transmission/reception unit 91 of the voice-to-text conversion server 13 receives the audio data or recorded video data, and the information indicating the date and time transmitted from the sharing assistant server 11.

Then, the conversion unit 93 performs the text conversion processing on the audio data or recorded video data received by the transmission/reception unit 91 (step S75-2).

Then, if the conversion unit 93 has completed the text conversion processing on the audio data or recorded video data (step S75-3: YES), the conversion unit 93 proceeds the sequence to step S75-4. Further, the conversion unit 93 repeats the processing of step S75-2 until the conversion unit 93 has completed the text conversion processing on the audio data or recorded video data.

If the conversion unit 93 determines that the text conversion processing has completed (step S75-3: YES), the conversion unit 93 generates voice-text data converted from the audio data or recorded video data (step S75-4). Then, the voice-to-text conversion server 13 can convert the audio data or recorded video data transmitted from the sharing assistant server 11 into the voice-to-text data.

The information processing system 1 repeats the above described processing of steps S71 to S76 to repeat the text conversion processing on the audio data or recorded video data generated at the user terminal 40.

If the conversion unit 93 has completed the text conversion on the audio data or recorded video data (step S75), the transmission/reception unit 91 of the voice-to-text conversion server 13 transmits the voice-text data to the sharing assistant server 11 (step S76). Then, the transmission/reception unit 61 of the sharing assistant server 11 receives the voice-text data transmitted from the voice-to-text conversion server 13.

Then, the generation unit 64 generates a unique content processing ID identifying the content processing generated by the event (step S77).

Then, the generation unit 64 generates URL of content data indicating a material of content (step S78).

Then, the storing/reading processing unit 69 stores or manages the type of content processing, start date/time and end date/time of content processing, content processing ID generated in step S77, and the material of content (content data) in the content management DB 6005 (see FIG. 9) by associating with each other for each conducted event ID received in step S72 (step S79).

Figure 32:
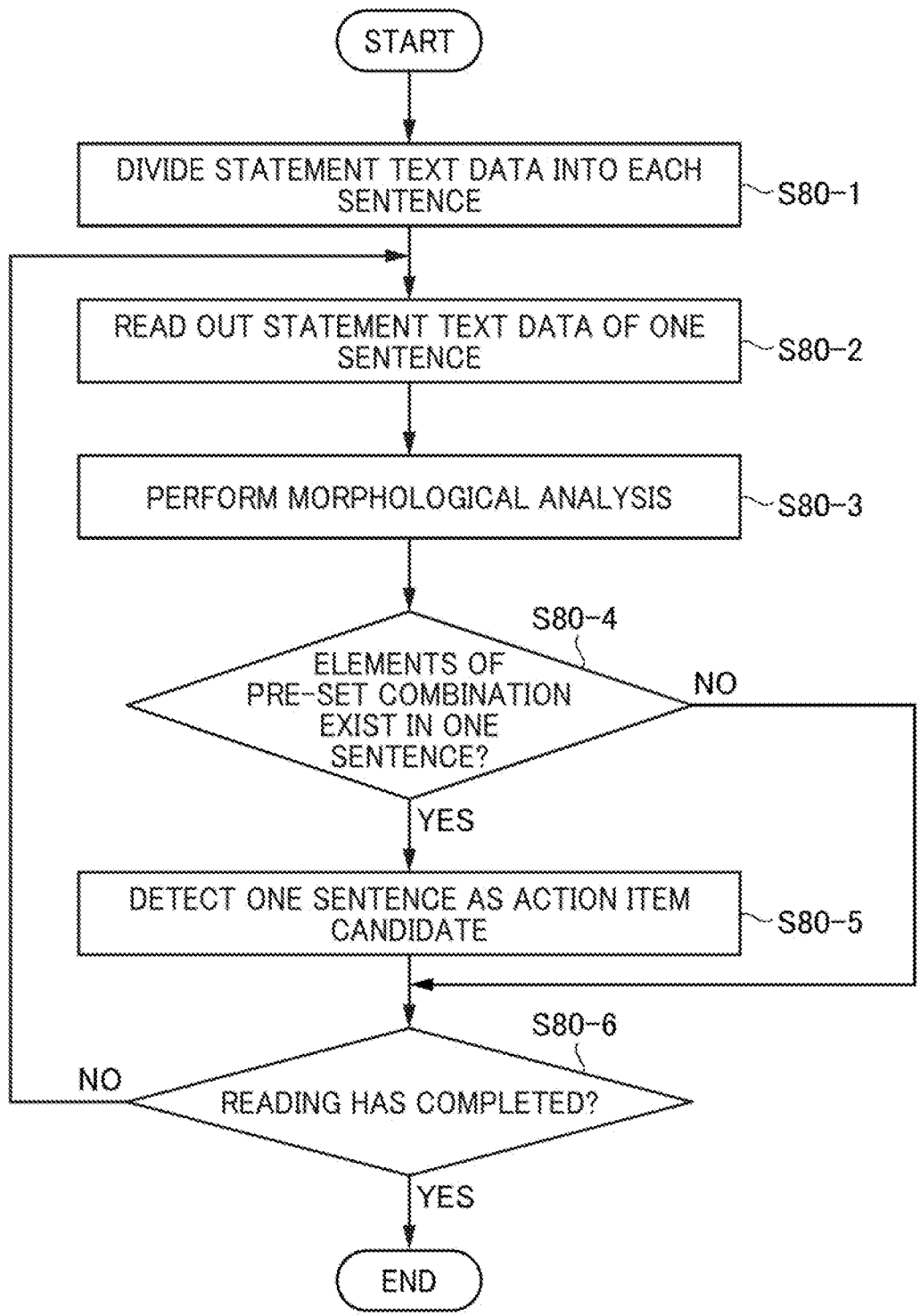
FIG. 32 is an example flowchart indicating a process of detecting an action item candidate.

Then, in step S80, the detection unit 66 detects statement text data to be settable as action item candidate from the statement text data including the voice-text data received in step S76 and the input text data received in step S72 as illustrated in FIG. 32. FIG. 32 is an example flowchart indicating a process of detecting an action item candidate.

At first, the detection unit 66 divides the statement text data including the voice-text data received in step S76 and the input text data received in step S72 into each one sentence (step S80-1).

Then, the detection unit 66 reads out one sentence of statement text data from the statement text data divided into each one sentence (step S80-2).

Then, the detection unit 66 performs a morphological analysis on the read-out one sentence of statement text data, and decomposes the one sentence of statement text data in consideration of extracting three elements, such as "who", "what", and "until when" (step S80-3). Although this example case may assume the morphological analysis on Japanese, the morphological analysis can be applied to any language, such as Chinese and Arabic, in which one sentence continues for a given length, and the one sentence is required to be divided into each sentence.

For example, as to the element [who], a noun representing [person] can be extracted.

Further, as to the element [until when] that can be configured with A-part and B-part, A-part is extracted using a phrase representing a date or a position on a calendar, such as [date], [day of week], [number+x days later], and [word indicating date (e.g., tomorrow, the day after tomorrow)], and B-part is extracted using a phrase representing a limit, such as [by (until)] and [by due date].

Further, as to the element [what] that can be configured with A-part and B-part, A-part is extracted using a phrase representing [noun]+(particle, auxiliary), and B-part is extracted using a phrase representing a request, such as

[verb]+[do it], [please], and [finish it off]. In this case, the order of A-part and B-part may be reversed and spoken.

Then, based on an analysis result of the morphological analysis, the detection unit 66 determines whether the elements having a given pre-set combination pattern, which is likely to become an action item, exists in the one sentence of statement text data (step S80-4).

For example, an action item is typically composed of three elements of "who", "what", and "until when." However, in some cases, some of these three elements may not be included in one single sentence of statement text data, which may become an action item. Therefore, for example, if the elements having any one of the following combination patterns exist in the one single sentence of statement text data, the detection unit 66 detects the statement text data as the action item candidate.

(Example of Combination of Elements)

Two elements of [who]+[what], such as "Mr. Tanaka, please call Company Z."

Two elements of [until when]+[what], such as "Call company Z by Friday.

Three Elements of [who]+[until when]+[what], such as "Mr. Tanaka, please call company Z by Friday."

In the above examples of the combination patterns of elements, the element [what] is set as an essential piece to configure the action item.

If the one sentence of statement text data includes the elements having any one of the above combination patterns (step S80-4: YES), the detection unit 66 detects the one sentence of statement text data read out in step S80-2 as an action item candidate (step S80-5).

If the one sentence of statement text data includes no elements having any one of the above combination patterns (step S80-4: NO), the detection unit 66 skips the processing in step S80-5 and does not detect the one sentence of statement text data read out in step S80-2 as the action item candidate.

The detection unit 66 repeats steps S80-2 to S80-6 until all of the statement text data divided into each one sentence in step S80-1 have been read out.

By performing the processing of detecting the action item candidate illustrated in FIG. 32, the detection unit 66 can detect the statement text data to be settable as action item candidate from the statement text data.

Further, the "elements having given pre-set combination patterns that are likely to become an action item" used for detecting the action item candidate illustrated in steps S80-4 to S80-5 (see FIG. 32) may be updated by performing the machine learning.

For example, in some cases, an action item candidate, which is detected using the above described "elements having given pre-set combination patterns that are likely to be an action item" by applying a basic rule, may not be registered as an action item by a project member or the like.

Further, in some cases, one sentence of statement text data, in which the above described "elements having given pre-set combination patterns that are likely to be an action item" cannot be detected by applying a basic rule, may be registered as an action item by a project member.

In such cases, the precision of detecting an action item candidate from the statement text data can be improved by applying the machine learning to the action item candidate not registered as the action item by the project member, and to one sentence of statement text data registered as the action item by the project member.

The machine learning is a technology for making a computer acquire learning ability like human, in which the computer autonomously generates an algorithm necessary for determining data identification or the like from learning data acquired in advance, and performs a prediction on new data by applying the generated algorithm.

The learning methods used for the machine learning may be any of supervised learning, unsupervised learning, semi-supervised learning, reinforcement learning, or deep learning, and may be a combination of these learning methods.

The description returns to FIG. 30. The transmission/reception unit 61 of the sharing assistant server 11 transmits data corresponding to the content processing generated in step S71 to the user terminal 40 used by the project member (step S81). For example, if recorded audio data or recorded video data is generated as the content in step S71, the transmission/reception unit 61 transmits, to the user terminal 40, the statement text data detected as the action item candidate in addition to the recorded audio data or recorded video data.

Then, the user terminal 40 updates the conducted event record screen (step S82).

Further, if text data input for chat or message is generated as the content in step S71, the transmission/reception unit 61 transmits to the user terminal 40, the statement text data detected as the action item candidate in addition to the input text data.

With this configuration, the user terminal 40 used by the project member can receive, from the sharing assistant server 11, the content input by the project member during an event (e.g., online meeting) by speaking opinions and inputting text, and the statement text data to be settable as action item candidate detected from the content input by the project member.

Figure 33:
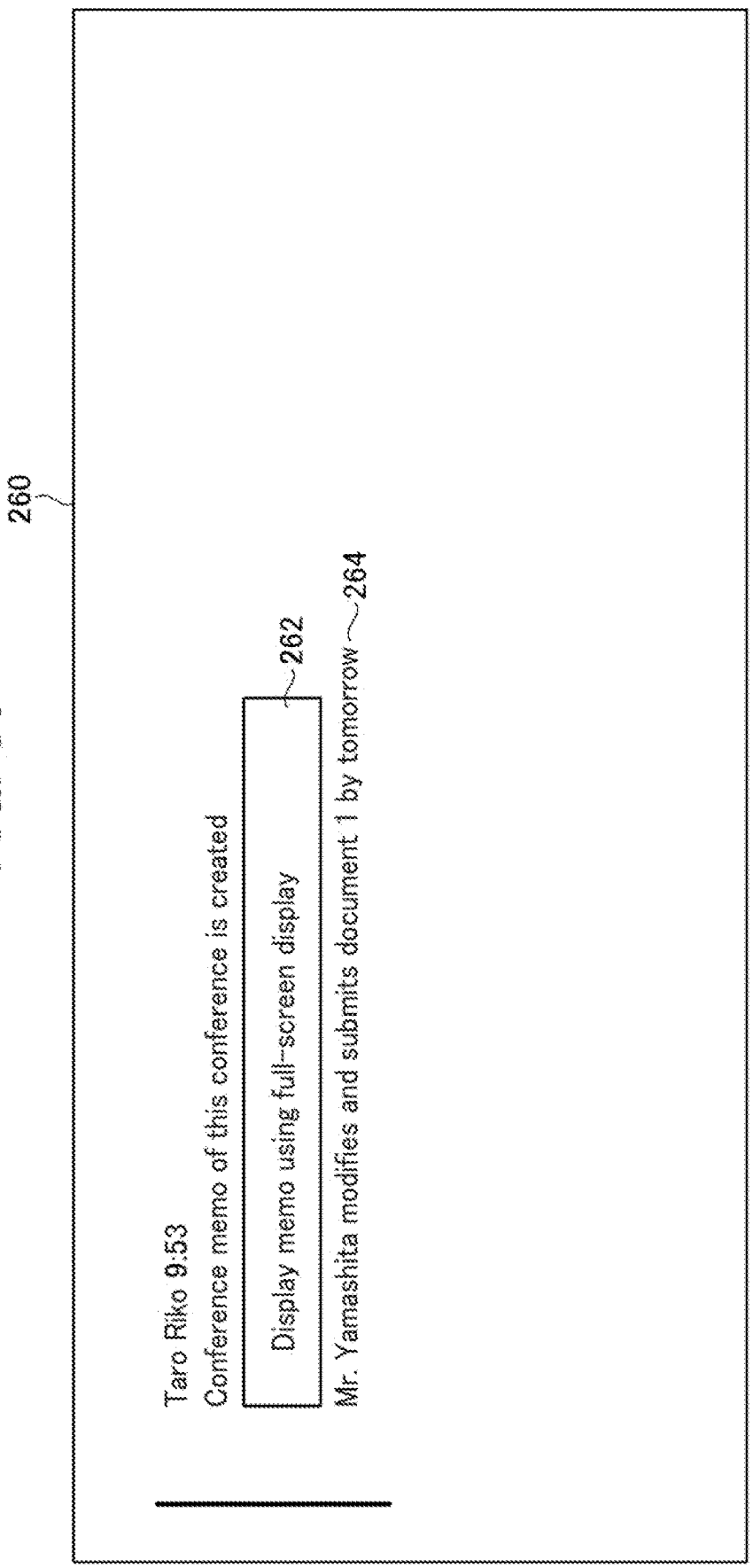
FIG. 33 is an example of a part of conducted event record screen.

Then, the display control unit 54 of the user terminal 40 used by the project member instructs the display 506 to display, for example, a conducted event record screen 260 illustrated in FIG. 33. The conducted event record screen 260 displays the content input by the project member during an event (e.g., online meeting) by speaking opinions and inputting text, and the statement text data to be settable as action item candidate detected from the content input by the project member, transmitted from the sharing assistant server 11.

FIG. 33 is an example of a part of the conducted event record screen 260. The conducted event record screen 260 may be also referred to as the conducted event history screen 260. As illustrated in FIG. 33, the conducted event record screen 260 includes, for example, a "display memo using full-screen display" button 262, and statement text data 264.

The "display memo using full-screen display" button 262 is used for displaying a content (meeting memo) spoken or input by a project member in voice or text during an event (e.g., online meeting) using a communication function using a full-screen display.

The statement text data 264 is detected as an action item candidate from the content of meeting memo. The statement text data corresponds to the statement data.

Further, a plurality of action item candidates may be detected. For example, "Mr. Suzuki creates document 2 within this month" may be displayed as another action item candidate at the bottom of "Mr. Yamashita modifies and submits document 1 by tomorrow" described as the statement text data 264.

The meeting memo is, for example, a speech record obtained by converting voice data into text data using the contents spoken by each project member by applying known voice recognition technologies. Further, the meeting memo may also include text input by each project member as a record of content.

As illustrated in FIG. 33, the conducted event record screen 260 displays the statement text data 264 of action item candidate received from the sharing assistant server 11, such as one sentence of "Mr. Yamashita modifies and submits document 1 by tomorrow", but the conducted event record screen 260 can display a plurality of sentences as the statement text data 264.

For example, each project member (hereinafter, registered member), who wants to register the statement text data 264 of action item candidate set on the conducted event record screen 260 (FIG. 33) as an action item in the action item management server 14, operates his/her user terminal 40 as follows.

Figure 34:
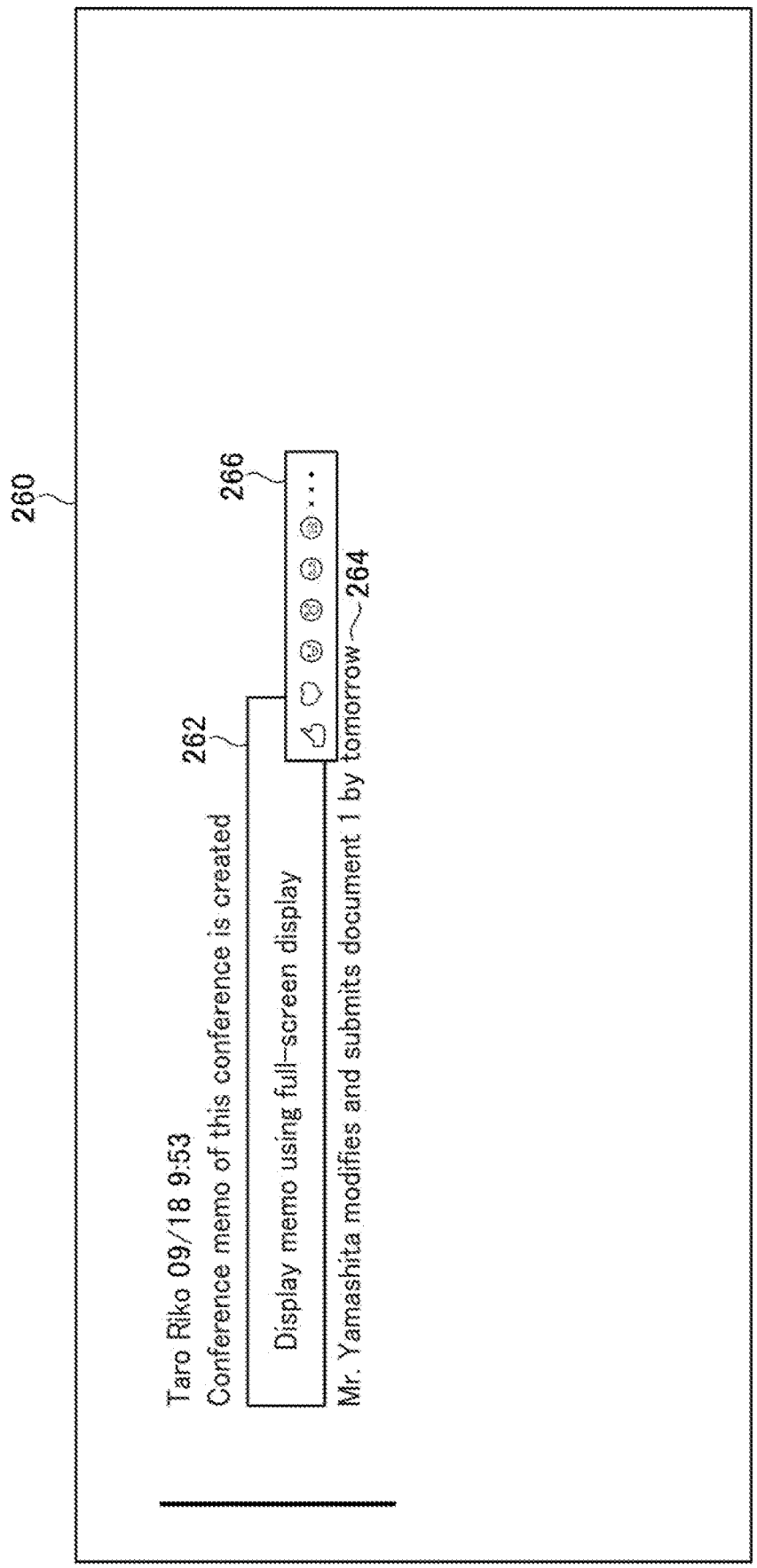
FIG. 34 is an example of a part of conducted event record screen.
Figure 35:
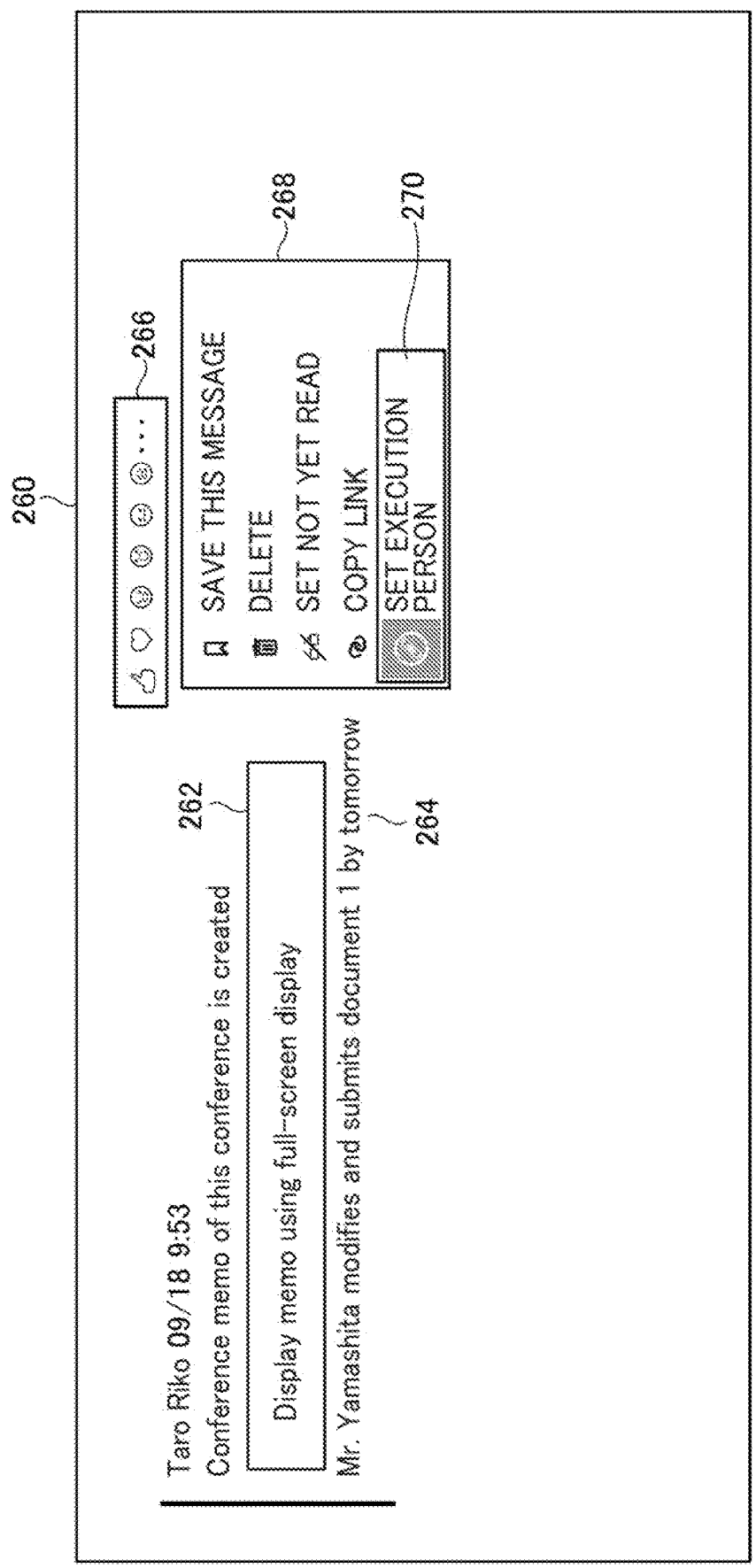
FIG. 35 is an example of a part of conducted event record screen.

At first, for example, the registered member places a pointer of the pointing device 512 at a position of the statement text data 264 of action item candidate (e.g., mouse-over) to instruct the conducted event record screen 260 to display action button groups 266 and 268 as illustrated in FIGS. 34 and 35. FIGS. 34 and 35 are examples of a part of the conducted event record screen 260.

In an example case of FIGS. 34 and 35, when a mouse is placed over (e.g., mouse-over) a three-point button " . . . " of the action button group 266 (FIG. 34), the action button group 268 is displayed as illustrated in FIG. 35. Further, the action button groups 266 and 268 illustrated in FIGS. 34 and 35 are just examples, and the action button groups may be one, or three or more action button groups.

Figure 36:
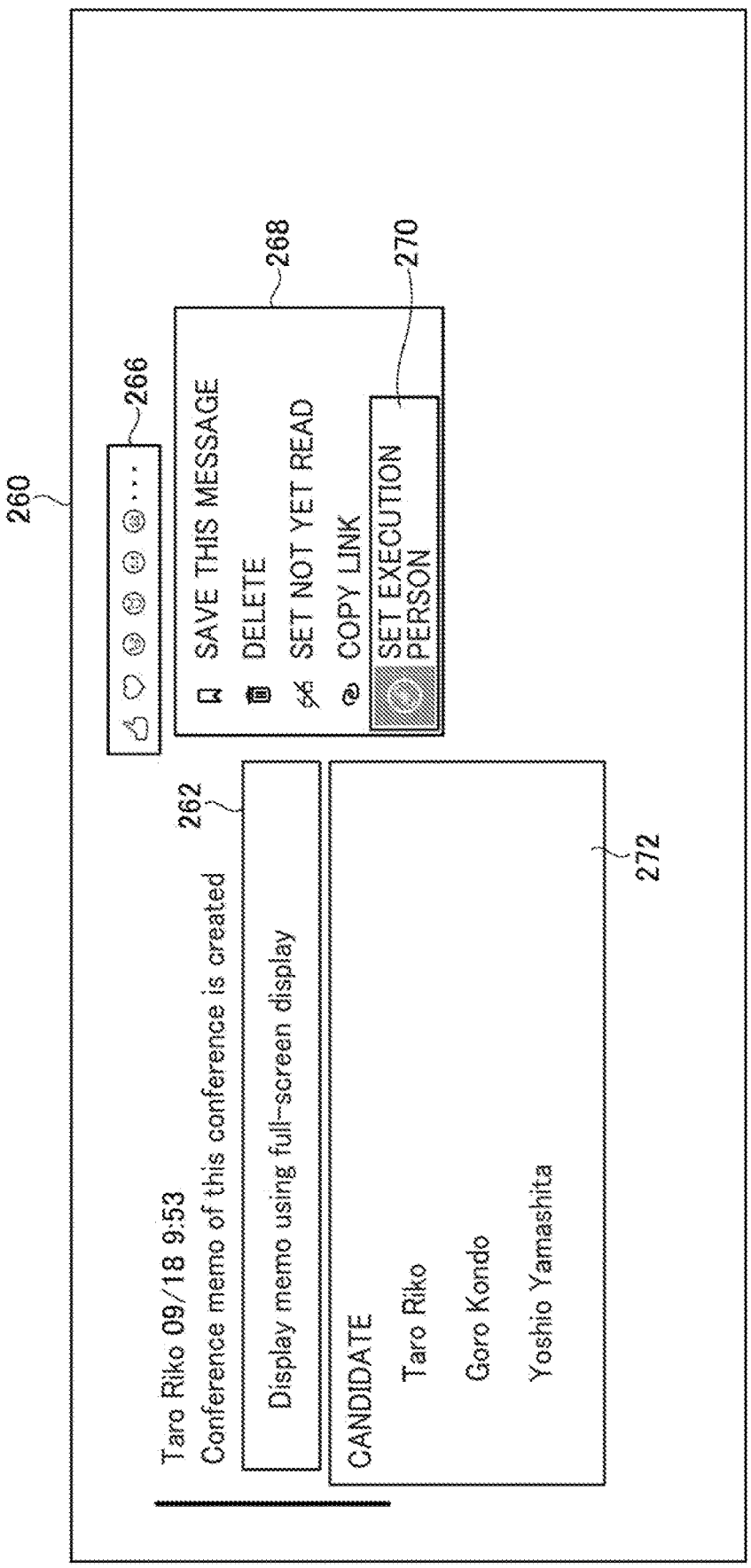
FIG. 36 is an example of a part of conducted event record screen.

If the registered member selects a "set execution person" button 270 of the action button group 268 (see FIG. 35), an execution person input field 272 is displayed on the conducted event record screen 260 as illustrated in FIG. 36.

FIG. 36 is an example of a part of the conducted event record screen 260. The execution person input field 272 displays candidates of execution person of action item as selectable members or options.

It should be noted that each project member (a member who has participated the online meeting and a member who has not participated the online meeting) who has been summoned to the online meeting is preferentially displayed as the candidate of person who is to execute the action item. The execution person candidate of action item is not limited to the project member. For example, the execution person candidate of action item can be narrowed down or selected and displayed in accordance with browsing authority levels (e.g., team, channel) set for the collaboration system in addition to the project member.

For example, a person who makes a reservation such as a meeting organizer (e.g., group organizer) and a member having a higher authority (upper-level authority person) among project members (e.g., user having a higher authority participating a group) can be narrowed down or selected by referring to the above described various tables as the execution person candidate of action item. The execution person of action item is not limited to one person, but can be assigned to a plurality of persons.

The registered member can set the execution person of action item from the execution person input field 272 (see FIG. 36). If the execution person of action item is set by the registered member, a due date input field 274 is displayed on the conducted event record screen 260 as illustrated in FIG. 37.

Figure 37:
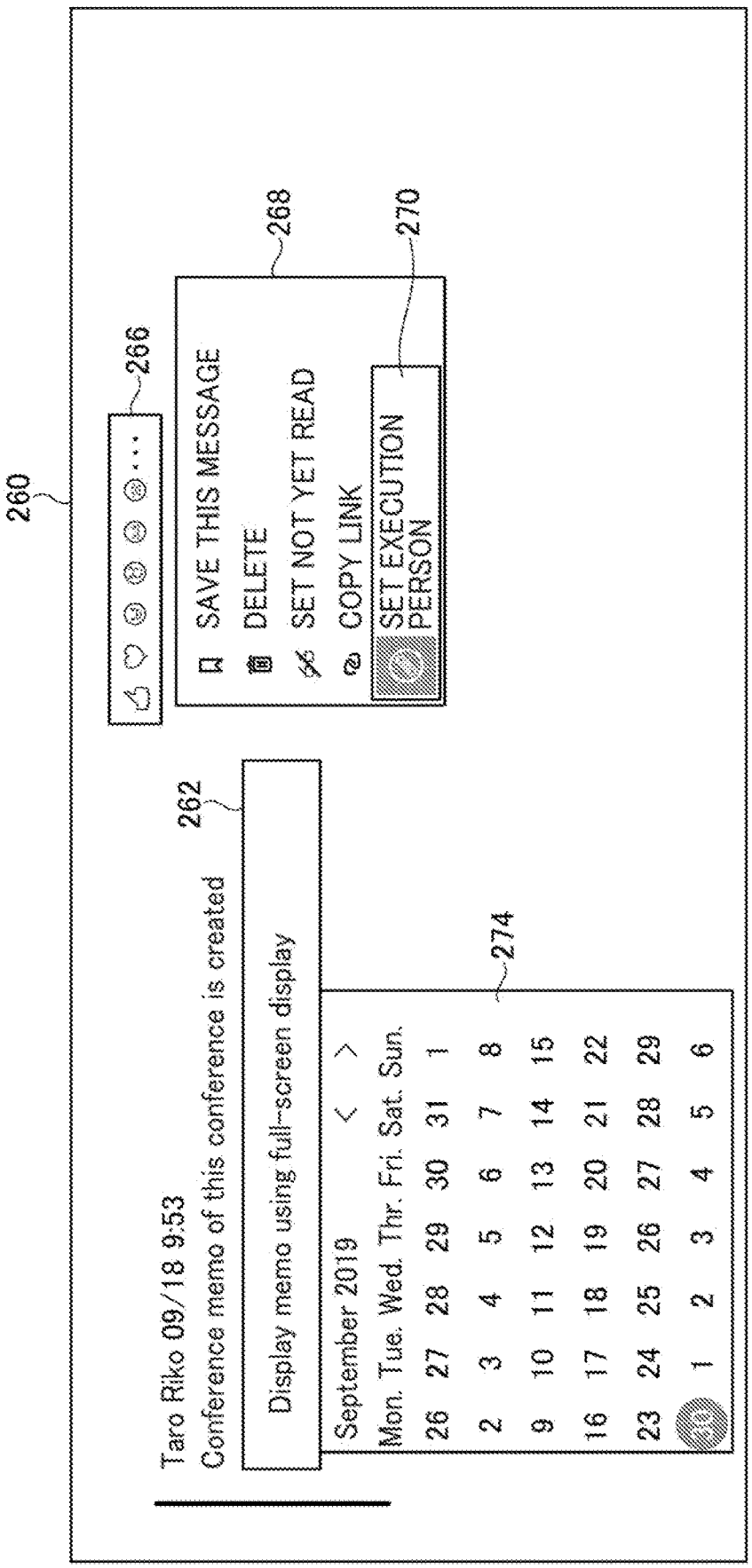
FIG. 37 is an example of a part of conducted event record screen.

FIG. 37 is an example of a part of the conducted event record screen 260. The due date input field 274 displays a calendar for inputting a due date so that the due date can be input or entered. The registered member can input the due date of action item from the due date input field 274 (see FIG. 37).

By performing the above described processing, the statement text data of action item candidate set with the execution person and input with the due date is registered as the action item of the set execution person to the action item management function of the action item management server 14 of the same collaboration system 10, from the user terminal 40 used by the registered member.

Further, the registration request of action item to the action item management server 14 can be performed, for example, by using an application programming interface (API) released to the public by the action item management server 14.

The above description has been given of an example in which the registered member sets the execution person and inputs the due date, but is not limited thereto. For example, in a case where all of three elements of "who", "what", and "until when" exist (e.g., action item candidate of "Mr. Yamashita modifies and submits document 1 by tomorrow" illustrated in FIG. 33), the action item may be automatically registered using the action item management function of the action item management server 14 without the above described manual operation.

For example, the request unit 55 of the user terminal 40 may determine "who" based on the spoken content related to "who" included in the statement text data 264 of action item candidate.

Further, if the statement text data 264 of action item candidate includes only one "person name" and the only one user can be identified in the information processing system 1, the request unit 55 may automatically determine "who". The following cases consider the determination priority order. In the following cases, if the execution person of action item cannot be set automatically, the registered member may set he execution person of action item manually.

Priority order 1: "who" corresponds to "Tanaka" and there are users having "Tanaka" as a part of first and last names are participating an online meeting.

Priority order 2: "who" corresponds to "Tanaka" and there are users having "Tanaka" as a part of first and last names are absent from an online meeting.

Priority order 3: "who" corresponds to "Tanaka" and there are users having "Tanaka" as a part of first and last names exist in the information processing system 1.

Further, for example, the request unit 55 of the user terminal 40 may determine "until when" based on the spoken content related to "until when" included in the statement text data 264 of action item candidate.

Further, the request unit 55 of the user terminal 40 may determine "until" from a schedule of the next meeting determined from the meeting attribute. For example, a periodic interval of the meeting can be acquired from the schedule management server 12, and then date of "next time" can be specified on a calendar. Similarly, the request unit 55 of the user terminal 40 can specify the date of "tomorrow" or "the day after tomorrow" on the calendar. Further, a phrase indicating "past" included in phrases that represent time or meeting may not be used as a target of specifying "next time"

Further, the registered member who makes the registration request of action item may be limited to, for example, a speaker of the statement text data 264 of action item candidate, a reservation holder such as a meeting organizer, and a member having a higher authority (upper-level authority person) among project members.

The registration unit 104 of the action item management server 14 that has received the action item registration request stores or manages the action item in the action item management table illustrated in FIG. 20. Further, the action unit 105 of the action item management server 14 stores or manages the status or state of the action item in accordance with the notification from the user terminal 40.

Further, when the action unit 105 of the action item management server 14 receives an inquiry request from the user terminal 40, the action unit 105 responds to the user terminal 40, the content of the action item corresponding to the inquiry request, and the status or state of the action item.

With this configuration, the display control unit 54 of the user terminal 40 instructs the display 506 to display, for example, a task management screen 271 illustrated in FIG. 38. FIG. 38 is an example of apart of the task management screen 271. As illustrated in FIG. 38, the task management screen 271 displays an action item 273 of "Mr. Yamashita modifies and submits document 1 by tomorrow" that was registered from the conducted event record screen 260.

As to the information processing system 1 according to the first embodiment, the action item can be easily registered to the action item management server 14 from the conducted event record screen 260.

The information processing system 1 illustrated in FIG. 1 includes, for example, a plurality of action item management servers 14. Therefore, the user terminal 40 may receive a selection of the action item management server 14 for registering the action item from the registered member. The selection of the action item management server 14 for registering the action item may be received, for example, from the conducted event record screen 260 illustrated in FIGS. 39 and 40.

Figure 39:
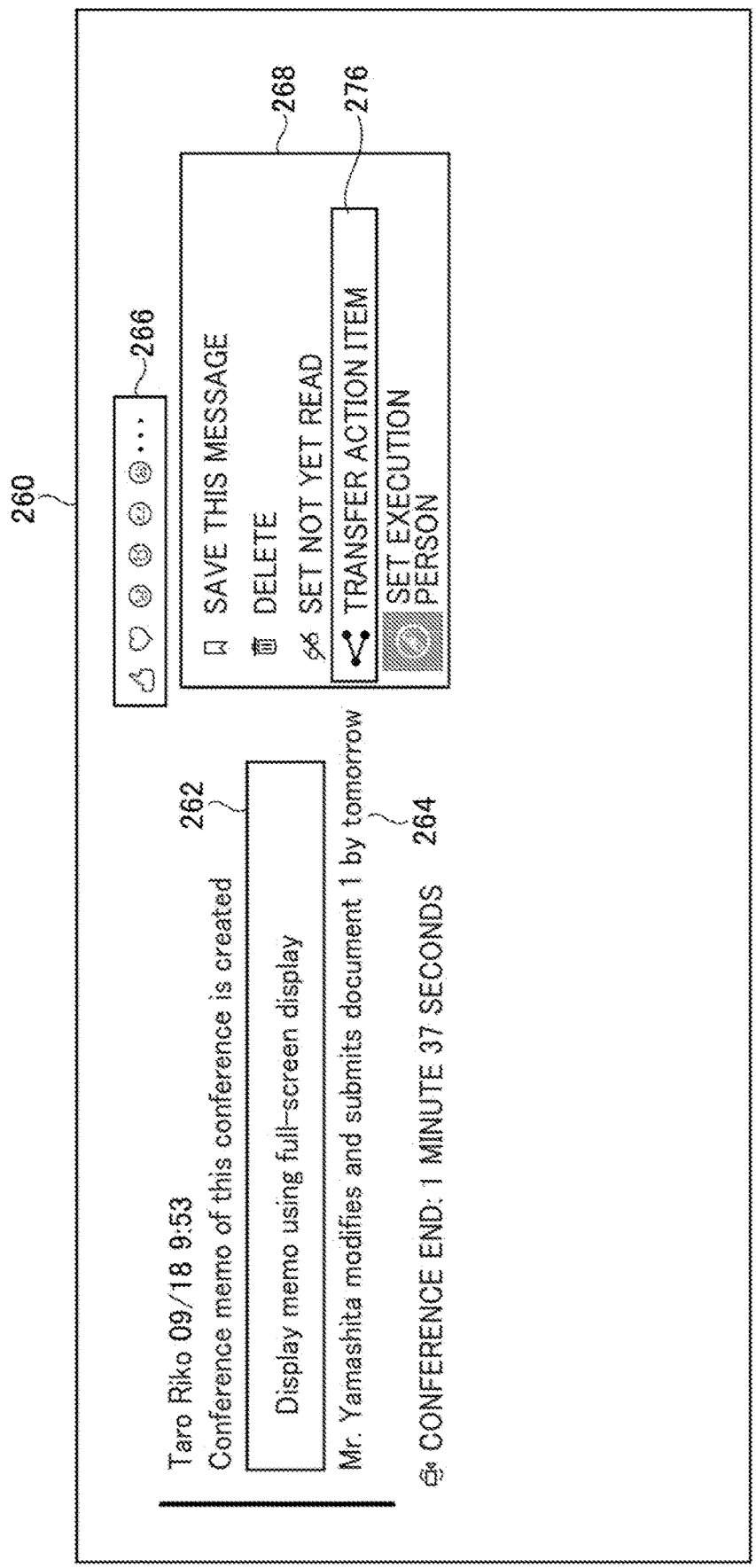
FIG. 39 is an example of a part of conducted event record screen.
Figure 40:
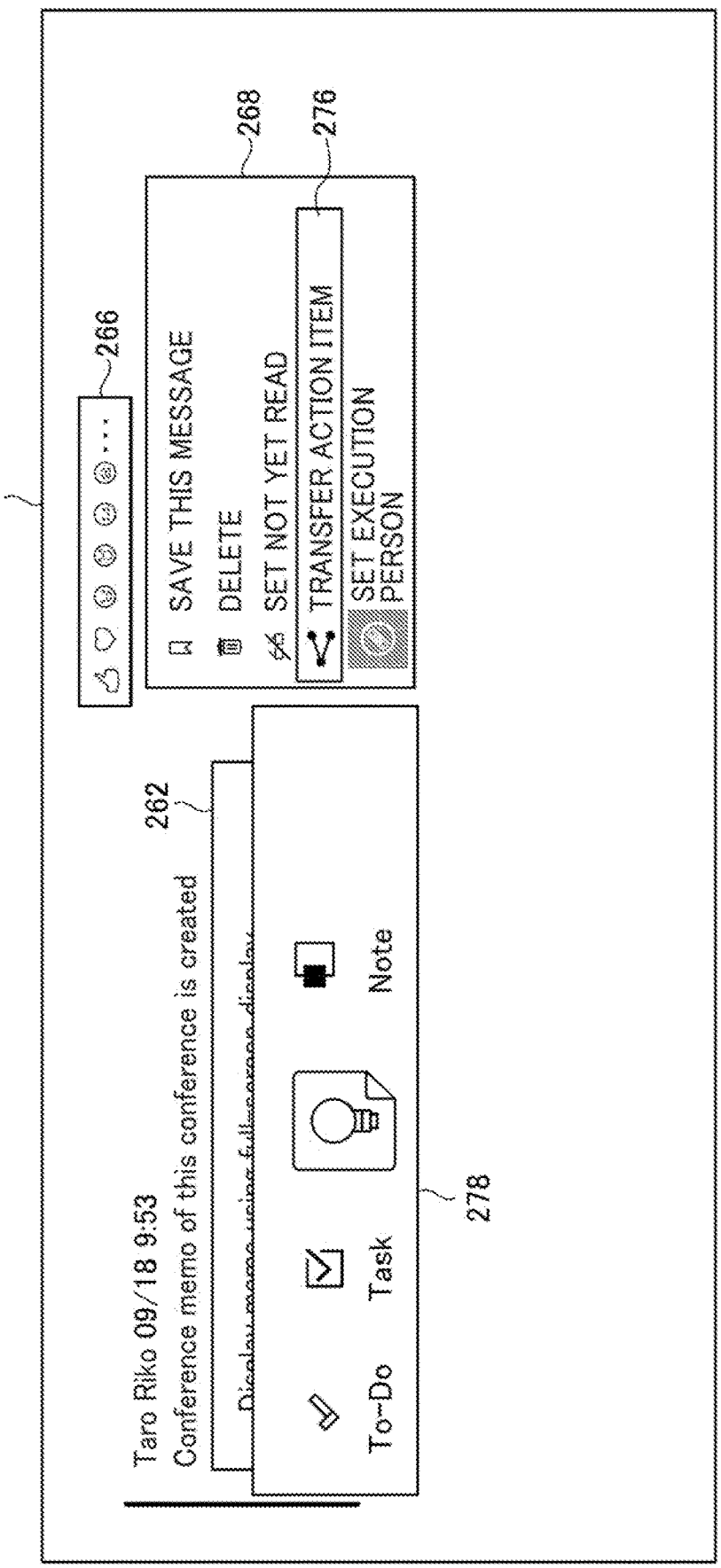
FIG. 40 is an example of a part of conducted event record screen.

FIGS. 39 and 40 are examples of a part of the conducted event record screen 260. If the registered member selects a "transfer action item" button 276 of the action button group 268 (see FIG. 39), an action item transfer destination selection field 278 is displayed on the conducted event record screen 260 as illustrated in FIG. 40. The action item transfer destination selection field 278 displays a transfer destination of the action item as selectable member or option.

If the registered member selects a transfer destination of the action item from the action item transfer destination selection field 278 (see FIG. 40), the registered member can register the action item to functions other than the action item management function of the action item management server 14 of the same collaboration system 10 corresponding to the selected transfer destination, and to the action item management server 14 not disposed in the same collaboration system 10. Further, the status or state of the action item registered in the other action item management server 14 can be acquired by transmitting an inquiry request to the other action item management server 14.

Further, it is convenient if a user can confirm whether the action item, registered in the action item management server 14 from the conducted event record screen 260 as described above, has completed or not completed using the conducted event record screen 260.

Figure 41:
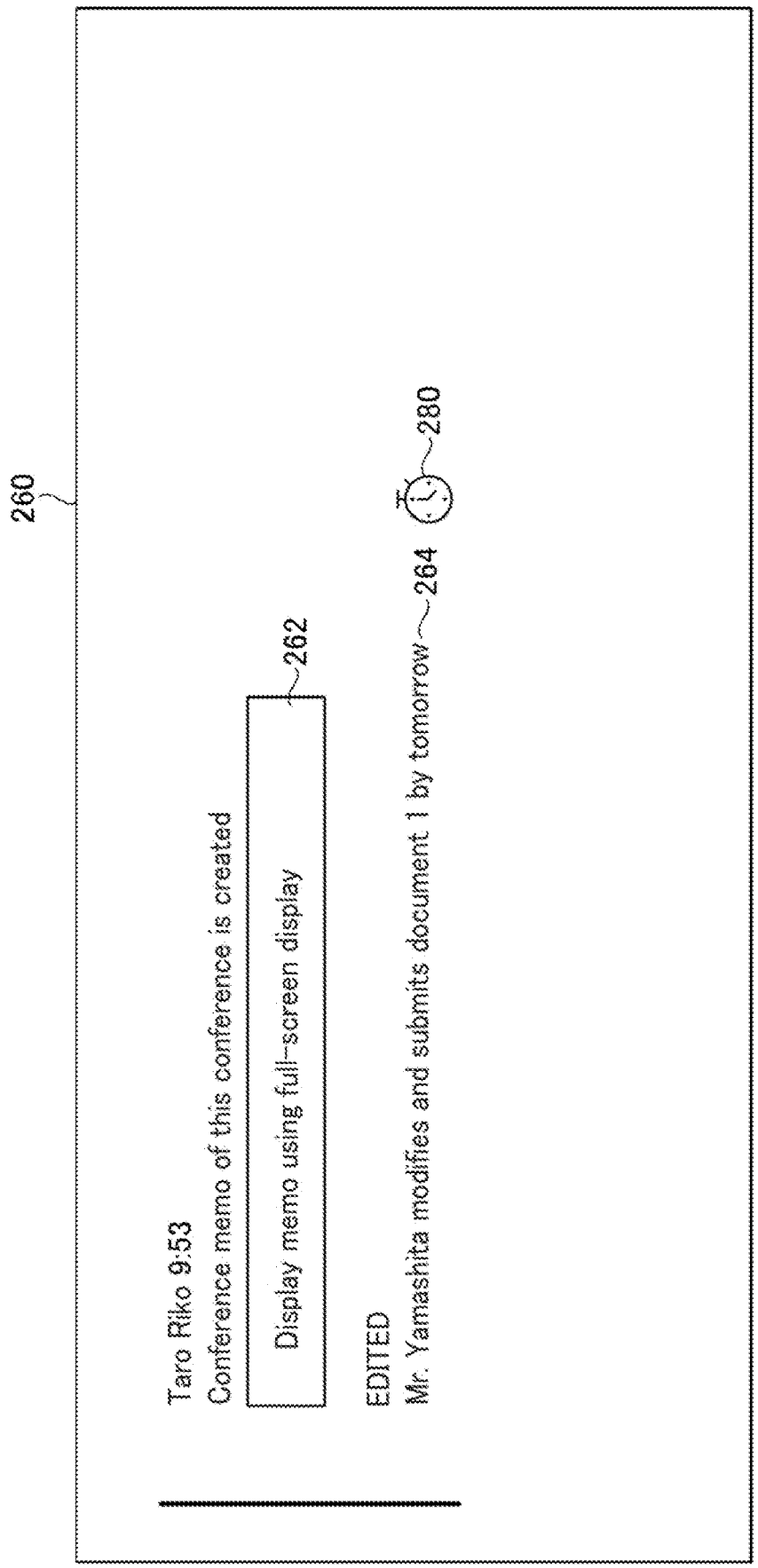
FIG. 41 is an example of a part of conducted event record screen.
Figure 42:
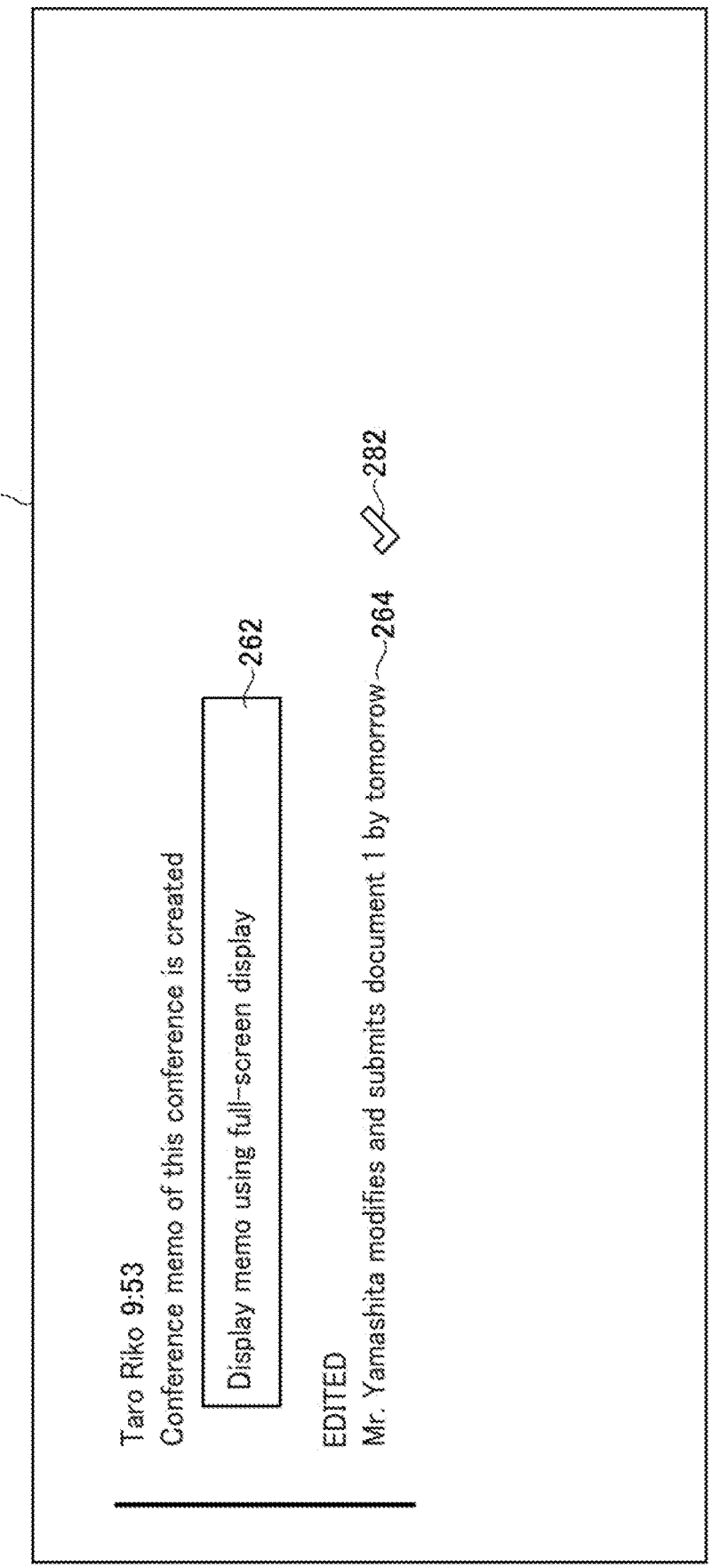
FIG. 42 is an example of a part of conducted event record screen.

Therefore, as to the information processing system 1 of the above described first embodiment, by synchronizing with the action item management server 14, as illustrated in FIG. 41 or FIG. 42, an icon 280 (FIG. 41) indicating that the action item has not been completed or an icon 282 (FIG. 42) indicating that the action item has been completed may be displayed in association with the statement text data 264 displayed on the conducted event record screen 260 registered as the action item. FIGS. 41 and 42 are examples of a part of the conducted event record screen 260.

The action item management server 14 of the collaboration system 10 stores or manages the state of "completed" or "not completed" of the action item in the action item management table illustrated in FIG. 20. The status or state of the action item management table in FIG. 20 is updated from "not completed" to "completed" by, for example, a user who has completed the action item by performing an operation for notifying completion of the action item from the user terminal 40.

Therefore, as illustrated in FIG. 41 or FIG. 42, by synchronizing with the action item management server 14, the icon 280 indicating that the action item has not been completed or the icon 282 indicating that the action item has been completed can be displayed in association with the statement text data 264 displayed on the conducted event record screen 260 registered as the action item.

Further, the status or state of the action item management table of FIG. 20 may be linked with, for example, the status or state of the action item of another action item management server 14 (e.g., the action item management server 14 in the action item management system 20) selected from the conducted event record screen 260 of FIG. 40.

If a user who has completed the action item of another action item management server 14 performs an operation for notifying completion of the action item from the user terminal 40, the status or state of the action item management table in FIG. 20 is updated from "not completed" to "completed".

Therefore, as illustrated in FIGS. 41 and 42, by synchronizing with the action item management server 14, the icon 280 indicating that the action item has not been completed or the icon 282 indicating that the action item has been completed can be displayed in association with the statement text data 264 displayed on the conducted event record screen 260 registered as the action item for another action item management server 14.

(Viewing Process of Conducted Event Record)

Figure 43:
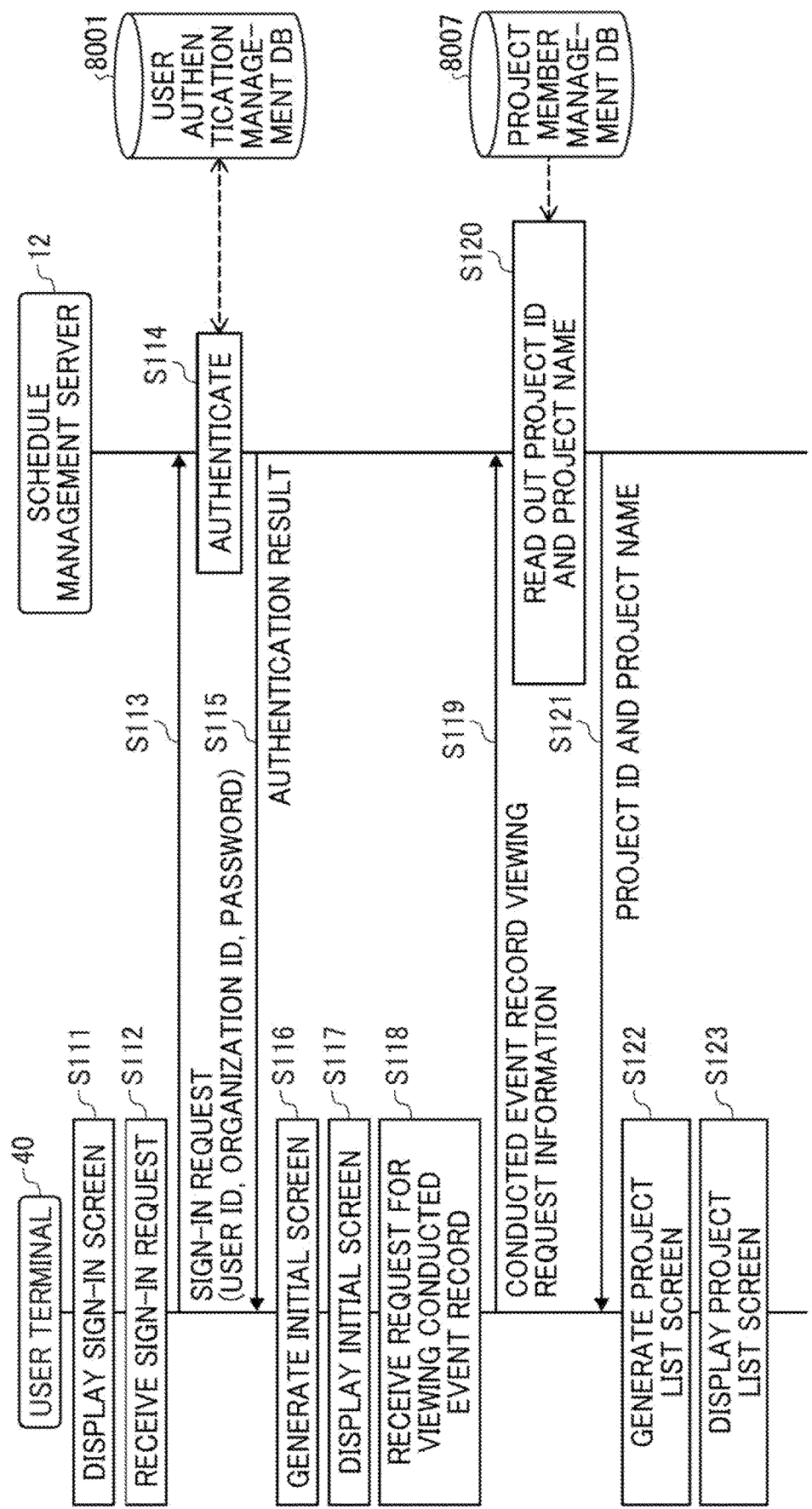
FIGS. 43 and 44 are examples of sequence diagrams indicating a process of browsing or viewing a conducted event record.
Figure 44:
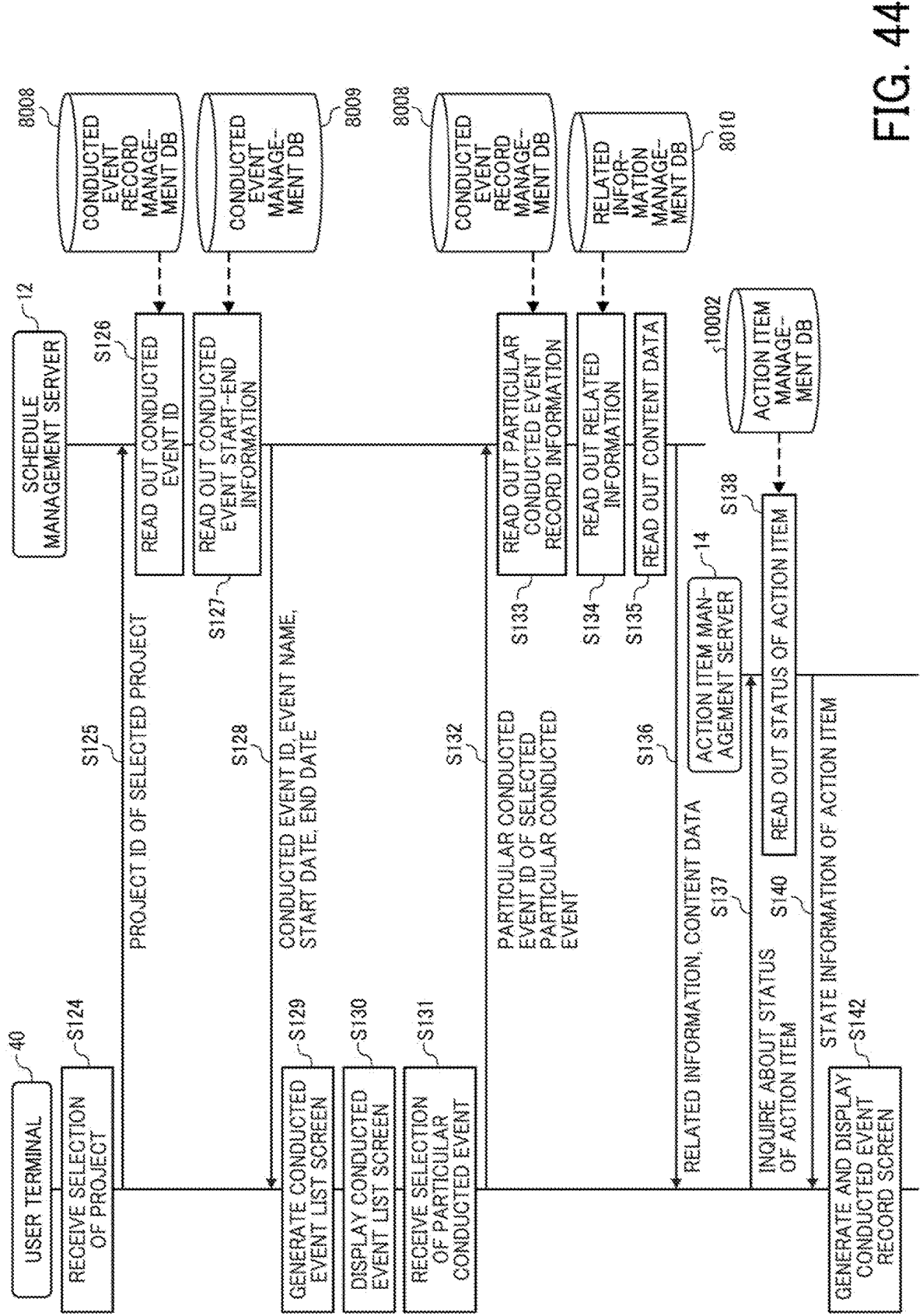

Hereinafter, with reference to FIGS. 43 and 44, a description is given of browsing or viewing process of conducted event record. FIGS. 43 and 44 are examples of sequence diagrams indicating a process of browsing or viewing a conducted event record. Since the processing in steps S111 to S117 in FIG. 43 is the same as the processing in steps S11 to S17 in FIG. 21, the description thereof will be omitted.

If the user presses the "view conducted event record" button 543 on the initial screen 540 (see FIG. 23), the reception unit 52 receives a request for viewing the conducted event record (step S118).

Then, the transmission/reception unit 51 transmits conducted event record viewing request information indicating a request for viewing the conducted event record to the schedule management server 12 (step S119). Then, the transmission/reception unit 81 of the schedule management server 12 receives the conducted event record viewing request information.

Then, the storing/reading processing unit 89 of the schedule management server 12 searches the project member management DB 8007 using the user ID and organization ID received in step S113 as search keys to read out the corresponding project ID and project name (step S120).

Then, the transmission/reception unit 81 transmits the project ID and the project name to the user terminal 40 (step S121).

Then, the generation unit 56 of the user terminal 40 generates a project list screen using the project ID and project name received in step S121 (step S122).

Then, at the user terminal 40, the display control unit 54 instructs the display 506 to display the project list screen generated by the generation unit 56 (step S123). The project list screen displays the same or similar contents as the project list screen 240 (see FIG. 28).

Then, in FIG. 44, if the user A presses the project icon 241 using, for example, a mouse or the like, the reception unit 52 receives a selection of the project indicated by the project icon 241 (step S124).

Then, the transmission/reception unit 51 of the user terminal 40 transmits the project ID of the project selected in step S124 to the schedule management server 12 (step S125). Then, the schedule management server 12 receives the project ID.

Then, at the schedule management server 12, the storing/reading processing unit 89 searches the conducted event record management DB 8008 using the project ID received in step S125 as a search key to read out the corresponding conducted event ID (step S126).

In step S126, the storing/reading processing unit 89 reads out all of the conducted event IDs associated with the project ID received in step S125.

Then, the storing/reading processing unit 89 searches the conducted event management DB 8009 using the conducted event ID read out in step S126 as a search key to read out the corresponding conducted event start-end information (step S127). The conducted event start-end information includes, for example, conducted event ID, event name, start date/time, and end date/time.

Then, the transmission/reception unit 81 transmits the conducted event ID, event name, start date/time, and end date/time read out in step S127 to the user terminal (step S128). Then, the transmission/reception unit 51 of the user terminal 40 receives the conducted event ID, event name, start date/time, and end date/time.

Figure 45:
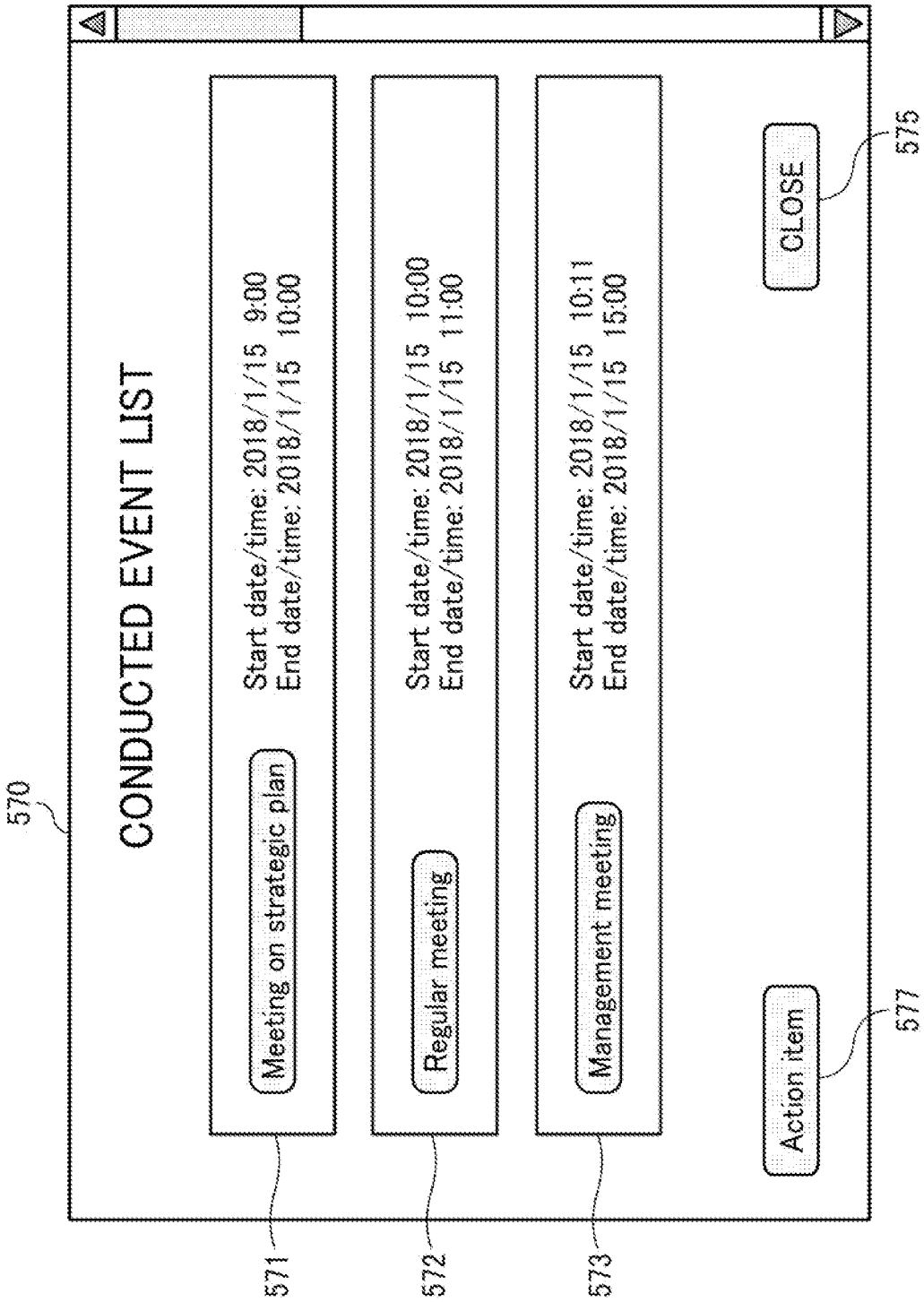
FIG. 45 is an example of conducted event list screen.

Then, the generation unit 56 of the user terminal 40 generates a conducted event list screen 570 as illustrated in FIG. 45 using the data received in step S128 (step S129). FIG. 45 is an example of the conducted event list screen 570.

Then, at the user terminal 40, the display control unit 54 instructs the display 506 to display the conducted event list screen 570 generated by the generation unit 56 (step S130). As illustrated in FIG. 45, the conducted event list screen 570 includes, for example, information 571 to 573 indicating each conducted event.

For example, the information 571 to 573 indicating the conducted event includes, for example, conducted event name, start date/time, and end date/time of event. The information 571 to 573 indicating the conducted event is an example of history information selection area for receiving a selection for displaying history information indicating the content of the conducted event. Further, the conducted event list screen 570 includes, for example, a "close" button 575 at the lower right portion to be pressed when to close the conducted event list screen 570.

Further, the conducted event list screen 570 includes, for example, an "action item" button 577 at the lower left portion to be pressed when the action item is to be viewed. The "action item" button 577 is an example of action item selection area for receiving a selection for displaying an action item stored or managed by the action item management server 14 of the collaboration system 10, in which the user has signed in. The action item management server 14 of the collaboration system 10, in which the user has signed in, stores or manages the action item registered using the sequence and configuration of FIGS. 33 to 38.

Then, the reception unit 52 of the user terminal 40 receives a selection of particular conducted event included in the conducted event list screen 570 (step S131). Specifically, if a user selects particular information indicating a particular conducted event included in the conducted event list screen 570, the reception unit 52 receives a selection of particular information indicating the particular conducted event.

Then, the transmission/reception unit 51 of the user terminal 40 transmits a particular conducted event ID of the particular conducted event selected by the reception unit 52 to the schedule management server 12 (step S132). Then, the transmission/reception unit 81 of the schedule management server 12 receives the particular conducted event ID.

Then, the storing/reading processing unit 89 of the schedule management server 12 searches the conducted event record management DB 8008 using the particular conducted event ID received in step S132 as a search key to read out the corresponding particular conducted event record information (step S133). The conducted event record information includes, for example, content processing ID, type of content processing, start date/time of content processing, and end date/time of content processing.

Further, the storing/reading processing unit 89 of the schedule management server 12 searches the related information management DB 8010 using the particular conducted event ID received in step S132 as a search key to read out the corresponding particular related information (step S134). The related information includes, for example, content generation time, content processing ID, type of content processing, and sequence No. The content generation time included in the related information is an example of time information.

Then, the storing/reading processing unit 89 reads out the content data indicating the content of the conducted event record from a storage destination of content data indicating the content of the particular conducted event record read out in step S133 (step S135).

Then, the transmission/reception unit 81 transmits the read-out particular related information and content data to the user terminal 40 (step S136). Then, the transmission/reception unit 51 of the user terminal 40 receives the particular related information and content data.

Then, the request unit 55 of the user terminal 40 requests or inquires about the status or state of the action item to the action item management server 14 of the collaboration system 10 being in the sign-in state (step S137).

If the action unit 105 of the action item management server 14 receives the request or inquiry of the status or state of the action item from the user terminal 40, the action unit 105 reads out the status or state of the action item corresponding to the request or inquiry, from the action item management table illustrated in FIG. 20 (step S138).

Then, the request unit 55 of the user terminal 40 receives the state information of the action item from the action item management server 14 (step S140).

Then, the generation unit 56 of the user terminal 40 generates the statement text data 264 to be set on the conducted event record screen 260 using the related information and the content data received in step S136, and generates the icon 280 or the icon 282 to be set on the conducted event record screen 260 using the state information of the action item received in step S140.

Then, the display control unit 54 of the user terminal 40 can display the conducted event record screen 260 (see FIG. 41 or 42) generated by the generation unit 56, on the display 506 (step S142).

As to the information processing system 1 according to the first embodiment, the registration to the action item management function can be assisted or supported using the content spoken between the project members using the communication function provided by the collaboration tool.

Second Embodiment

Figure 47:
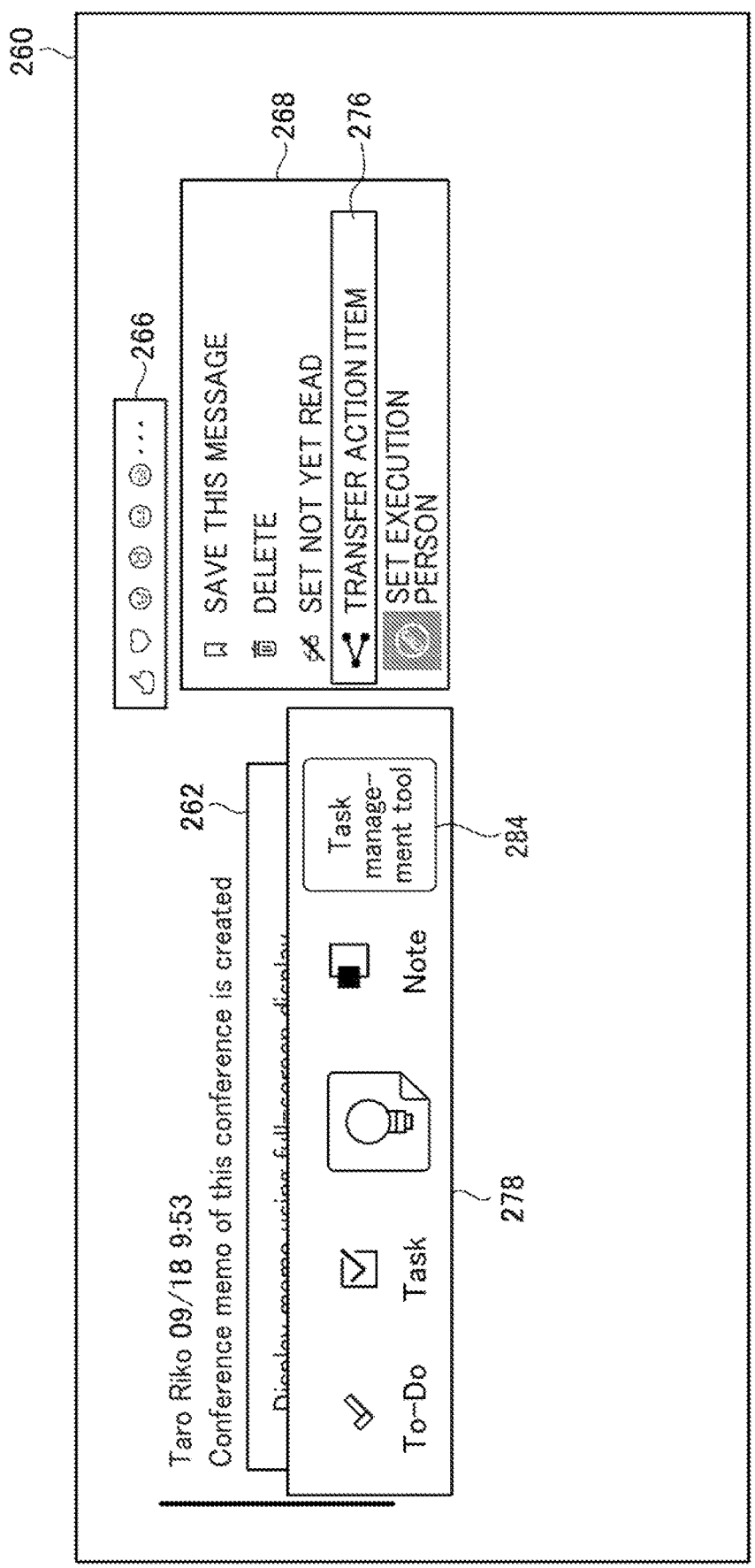
FIG. 47 is an example of a part of conducted event record screen.

The action item transfer destination selection field 278 illustrated in FIG. 40 may further display, for example, a "task management tool" button 284 illustrated in FIG. 47 as a selectable member or option.

The registered member can register an action item to the task management tool, which is an example of action item management function of the action item management server 14 not disposed in the same collaboration system 10, by selecting the "task management tool" button 284 as the transfer destination of action item from the action item transfer destination selection field 278 (see FIG. 47).

Figure 48:
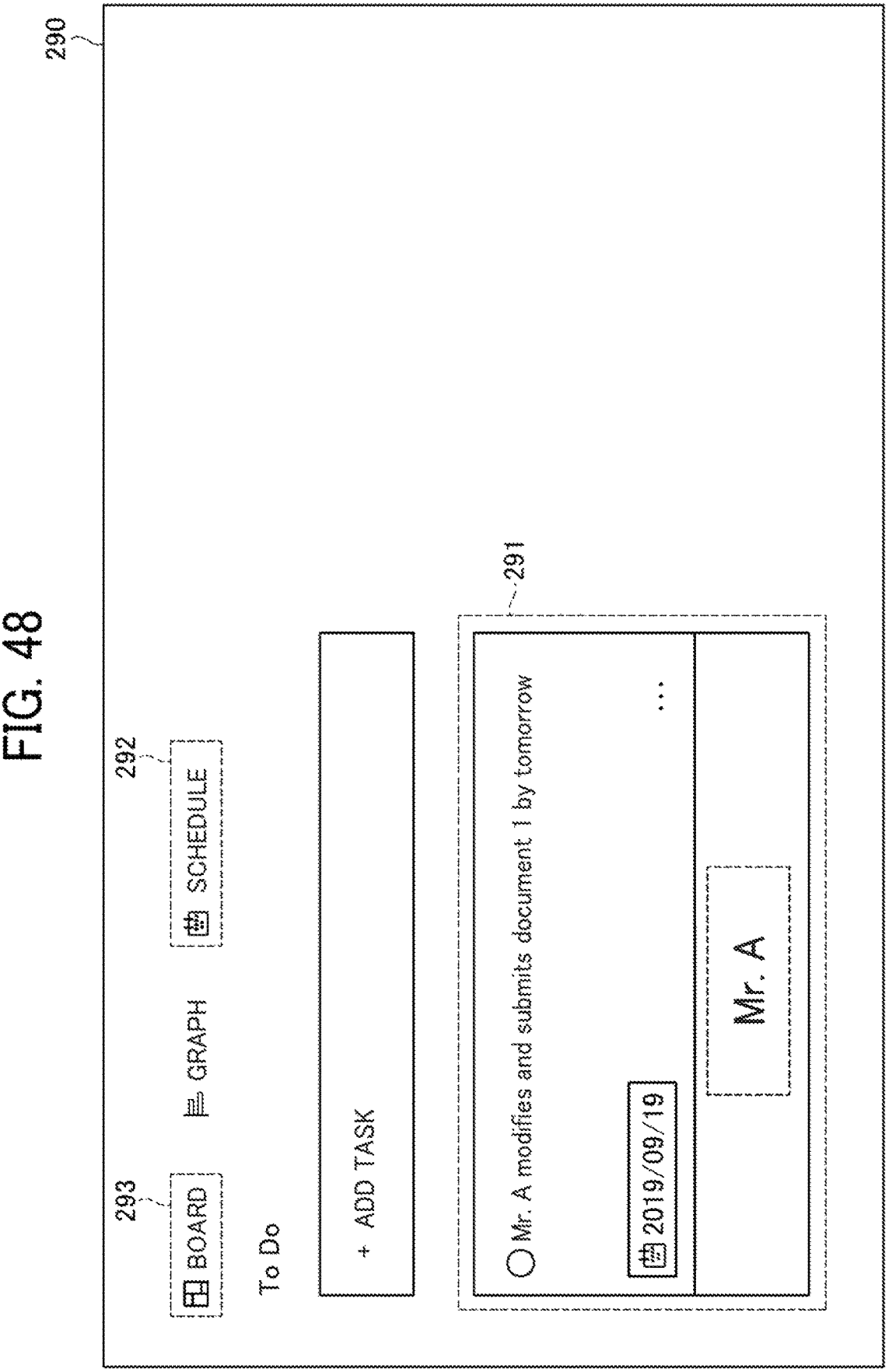
FIG. 48 is an example of a part of task management tool screen.

For example, when the user signs in the task management tool of the action item management server 14 not disposed in the same collaboration system 10, the action item registered to the task management tool is displayed as a task 291 on a screen 290 as illustrated in FIG. 48. The task 291 includes, for example, action item, execution person of action item, and due date of action item.

If a "schedule" tab 292 is selected on the screen 290 (see FIG. 48), the screen 290 of the task management tool (see FIG. 48) shifts to a scheduler screen 300 illustrated in FIG. 49.

As illustrated in FIG. 49, the scheduler screen 300 displays the task 291 on a date of "2019/09/19," wherein the task 291 having the due date of "2019/09/19" is displayed on the screen 290 (see FIG. 48). Further, if a "board" tab 293 of the scheduler screen 300 (see FIG. 49) is selected, the scheduler screen 300 shifts to the screen 290 (see FIG. 48).

As to the scheduler screen 300 of FIG. 49, since the action item is displayed at a position on the scheduler corresponding to the due date of action item, a user can easily recognize what action item should be performed until when. Further, an administrator of action item can recognize a progress state of action item performed by an execution person at one glance.

Third Embodiment

The action item transfer destination selection field 278 (see FIG. 40) can display, for example, a button for setting the scheduler tool as selectable member. By selecting, for example, a button for enabling the scheduler tool to be selected from the action item transfer destination selection field 278, the registered member can register the action item to the scheduler tool, which is an example of schedule management function in the same collaboration system 10.

Figure 50:
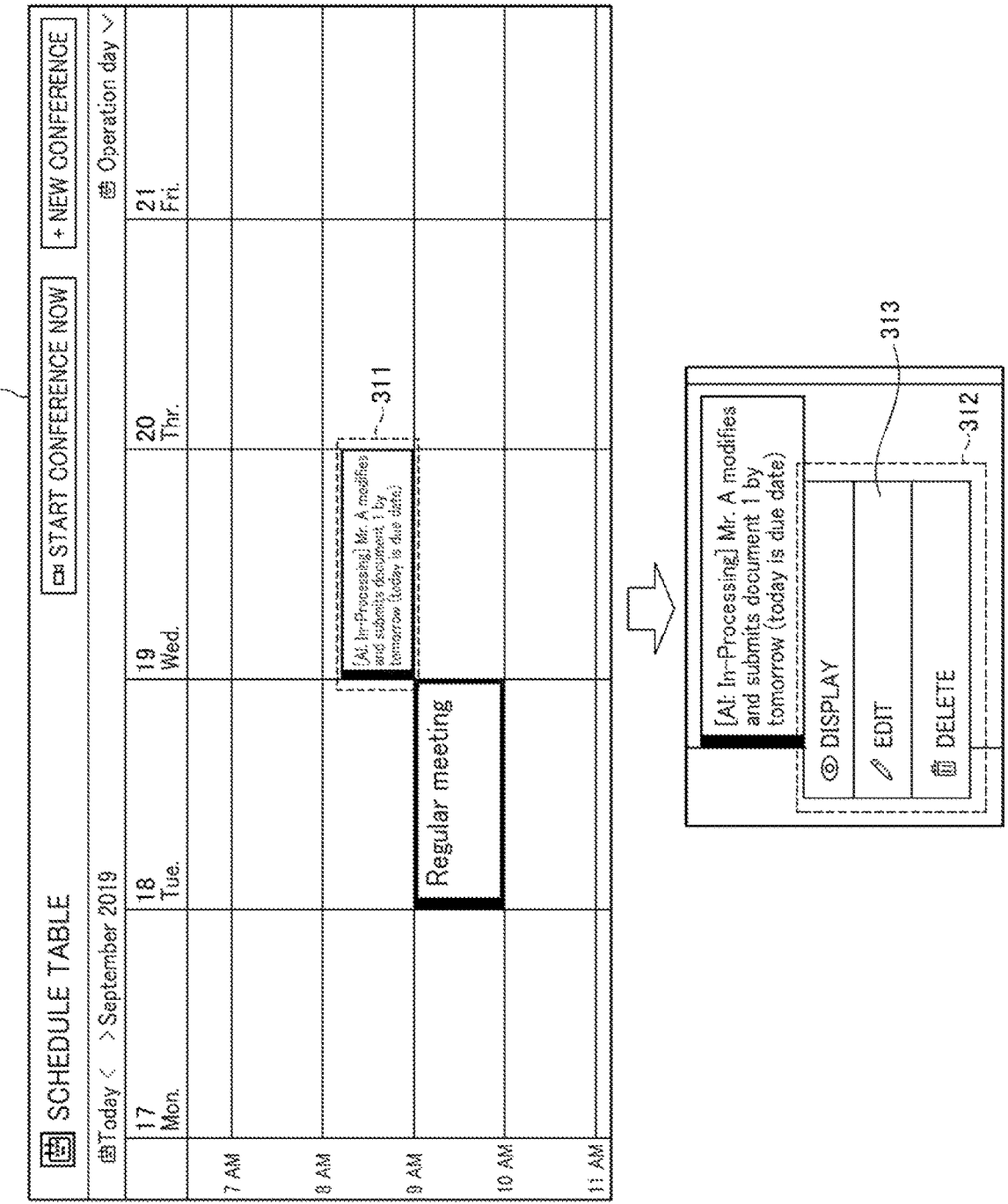
FIG. 50 is an example of a part of scheduler tool screen.

As illustrated in FIG. 50, a screen 310 of scheduler tool displays an action item 311 on the due date of "2019/09/19" of the action item of the scheduler of the execution person of the action item. The list of action items displayed in the scheduler may be configured to be traced or tracked from a link of the meeting displayed on the scheduler. Further, a scheduler of administrator may be configured to display a list of action items set for a meeting.

Further, a new window 312 can be configured to be displayed when an execution person of the action item operates (e.g., right click) an area of the action item 311 displayed on the scheduler. The new window 312 includes, for example, an "edit" button 313. For example, when the execution person clicks the "edit" button 313, the progress (status or state) of the action item can be updated from "not completed" to "completed."

As to the screen 310 of FIG. 50, since the action item is displayed at a position on the scheduler corresponding to the due date of the action item, a user can easily recognize what action item should be performed until when. Further, since the status or state of the action item can be updated, which action item is being performed and which action item is completed can be easily reflected.

Modification of System

Figure 46:
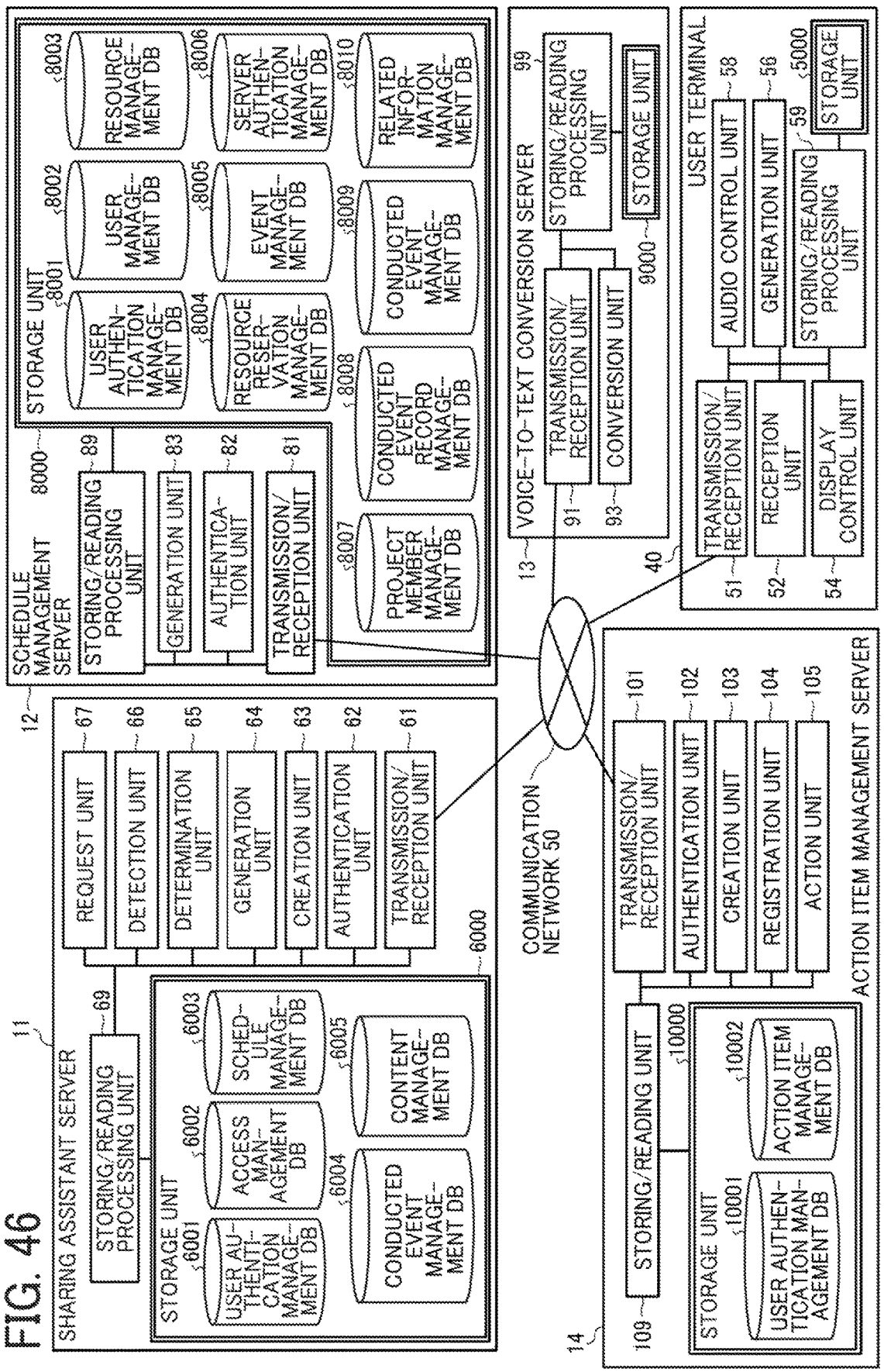
FIG. 46 is a functional block diagram of an information processing system according to an embodiment of this disclosure.

The information processing system 1 illustrated in FIG. 4 is just one example, and is not limited thereto. For example, the information processing system 1 can employ, a configuration illustrated in FIG. 46. FIG. 46 is an example of functional block diagram of the information processing system 1 according to a modification of the above described embodiments. As to the information processing system 1 illustrated in FIG. 46 as the modification, the request unit 55 of the user terminal 40 illustrated in FIG. 4 is replaced with a request unit 67 of the sharing assistant server 11 as illustrated in FIG. 46.

Therefore, various requests, such as a registration request of action item and an inquiry request of action item state to the action item management server 14, which are performed from the request unit 55 in FIG. 4, are performed from the request unit 67 of the sharing assistant server 11 (see FIG. 46).

Further, image data of screen such as a conducted event record screen, to be displayed under the control of the display control unit 54 of the user terminal 40, is created by the creation unit 63 of the sharing assistant server 11 (see FIG. 46).

Further, as to the information processing system 1 illustrated in FIG. 4, the user terminal 40 may be provided with the detection unit 66 provided in the server 11 illustrated in FIG. 4. In this case, the user terminal 40 detects the action item candidate from the statement text data of user.

Since the action item candidate, automatically extracted from the audio data included in the statement data by performing the voice recognition processing, is the action item candidate extracted from the content spoken during the meeting, an item that is not required to be registered as the action item may be included as the action item candidate with some possibility.

Therefore, in the modification of the embodiments, by performing the following screen shifting, such as calling a task setting screen from a list screen of action item candidate, a selection of action item candidate that needs to be registered and an action item candidate not need to be registered can be selected, and only the action item that the user should register as a responsible task can be shared with the execution person.

Figure 51:
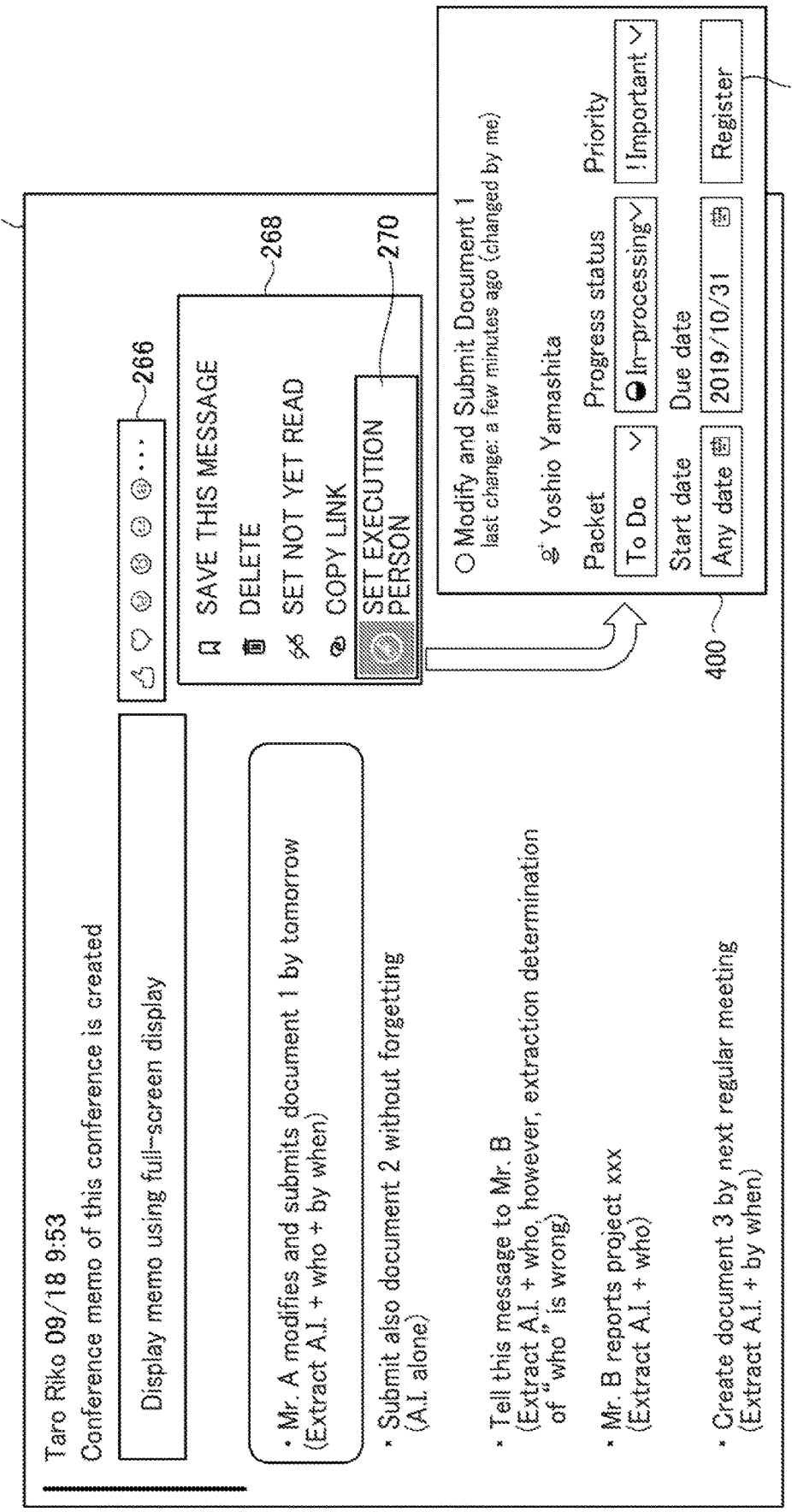
FIG. 51 is an example of diagram describing a cooperation of management tools of action item candidate.

FIG. 51 is an example of diagram describing a cooperation of management tools of action item candidate. As illustrated in FIG. 51, the action item automatically extracted by performing the voice recognition processing is extracted as a format of about one sentence, such as a meeting note (statement text data) after ending the meeting. For example, the display control unit 54 displays sentences, such as "Mr. A should modify and submit document 1 by tomorrow", "submit also document 2 without forgetting", and "tell this message to Mr. B" in the vertical direction on the conducted event record screen 260. The display control unit 54 may display only one piece of statement text data or a plurality of pieces of statement text data.

The conducted event record screen 260 is an example of list display screen. The display control unit 54 is an example of first display control unit.

The action item can be cooperated with the task management function by selecting the "set execution person" button 270 of the action button group 268 for each extracted action item.

The registered member, for example, places a pointer of the pointing device 512 (e.g., mouse-over) on a position of the statement text data of action item candidate. In response to this operation, the display control unit 54 instructs the action button groups 266 and 268 to be displayed on the conducted event record screen 260.

In an example case illustrated in FIG. 51, the action button group 266 is displayed by performing a mouse-over operation on the three-point button " . . . " of the action button group 268 (see FIG. 51). Further, the action button groups 266 and 268 are just examples, and the action button groups may be one, or three or more action button groups. The statement text data of action item candidate and the action button groups 266 and 268 are just examples of selectable member or option.

Further, the "set execution person" button 270 illustrated in FIG. 51 is just one example. The name of button can be any name indicating the registration or setting of action item, such as "task registration" button and "action item setting" button. These buttons are also examples of selectable member or option.

If the "set execution person" button 270 of the action button group 268 is selected, the display control unit 54 displays a task setting screen 400 as illustrated in FIG. 51. If "who", "action item", and "when" are specified in the content of document automatically extracted by performing the voice recognition processing, these pieces of information are automatically set in the task setting screen 400. Further, the extracted text can be changed on the task setting screen 400 manually.

The registered user confirms or inputs (selects) "who", "action item" and "when" on the task setting screen 400. Then, the registered user registers the action item by clicking (selecting) a register button 410 illustrated in FIG. 51. By clicking or selecting the register button 410, the request unit 55 transmits a registration request of action item to the action item management server 14.

The task setting screen 400 is an example of setting screen. The display control unit 54 is an example of second display control unit. The request unit 55 is an example of request unit.

Figure 52:
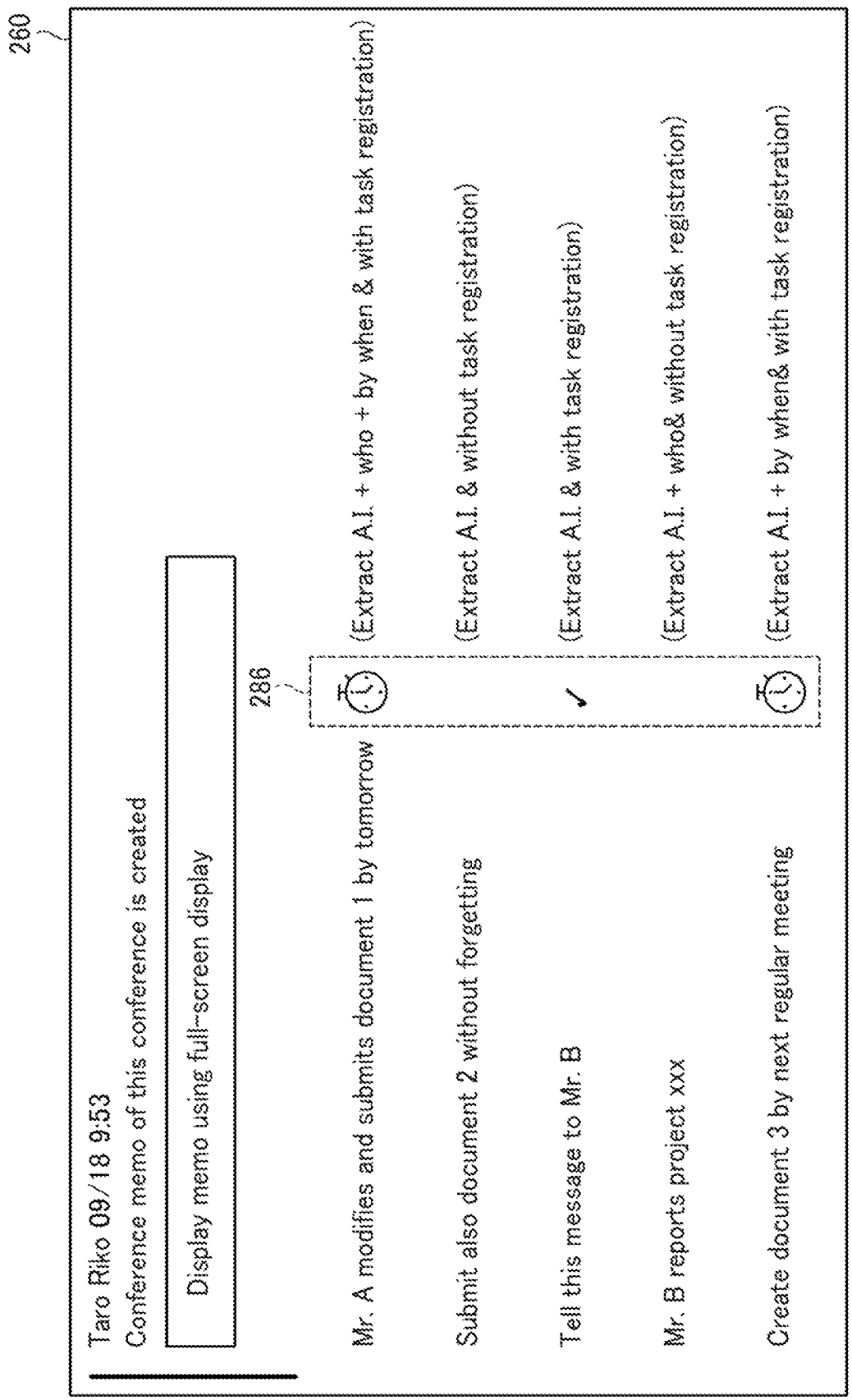
FIG. 52 is an example of diagram how to display a user interface using registered action item candidates.

FIG. 52 is an example of diagram how to display a user interface using registered action item candidates. If a task is registered, a progress display is added to a side of the action item candidate as illustrated in FIG. 52. In this example case, a progress state mark 286 is described, but is not limited thereto. For example, an icon indicating a user executing the action item, date information of scheduled completion, or the user icon and date information of scheduled completion may be displayed.

If the automatically extracted action item candidate is recognized by a user as an official action item, there is no problem. Further, the action item candidate not selected as the action item may be expressed in a form indicating a deletion or a format indicating the action item candidate is not the action item.

The above described embodiment is also implemented as an information processing apparatus, capable of communicating with a plurality of user terminals, for assisting a collaboration work performable by a plurality of users operating the respective user terminals. The information processing apparatus includes circuitry configured to display, on a display, an action item candidate based on statement data of the one or more users; create image data of a screen for receiving a registration operation of a particular action item selected from the action item candidate, a particular execution person who will execute the particular action item, and a particular due date of the particular action item; transmit the image data of the screen to at least one of the user terminals; receive, from at least one of the user terminals, a registration request of the particular action item, the particular execution person who will execute the particular action item, and the particular due date of the particular action item in response to performing the registration operation based on the action item candidate at the user terminal displaying the screen on the display; and request, to an action item management server for managing one or more action items, a registration request of the received particular action item, the received particular execution person who will execute the action item, and the received particular due date of the particular action item.

The above described embodiment is also implemented as a non-transitory computer readable storage medium storing one or more instructions that, when executed by one or more processors, instructs the one or more processors to perform a method of assisting a collaboration work performable by a plurality of users operating the respective user terminals, using an information processing apparatus capable of communicating with a plurality of user terminals. The method includes displaying, on a display, an action item candidate based on statement data of the one or more users; creating image data of a screen for receiving a registration operation of a particular action item selected from the action item candidate, a particular execution person who will execute the particular action item, and a particular due date of the particular action item; transmitting the image data of the screen to at least one of the user terminals; receiving, from at least one of the user terminals, a registration request of the particular action item, the particular execution person who will execute the particular action item, and the particular due date of the particular action item in response to performing the registration operation of the particular action item based on the action item candidate at the user terminal displaying the screen on the display; and requesting, to an action item management server for managing one or more action items, a registration request of the received particular action item, the received particular execution person who will execute the action item, and the received particular due date of the particular action item.

The above described embodiment is also implemented as a non-transitory computer readable storage medium storing one or more instructions that, when executed by one or more processors, instructs the one or more processors to perform a method of processing information performable by a user terminal capable of communicating with a collaboration work assisting system for assisting a collaboration work performable by a plurality of users. The method includes receiving an action item candidate based on statement data of the one or more users from the collaboration work assisting system; displaying, on a display, the received action item candidate, and a screen for receiving a registration request of a particular action item selected from the action item candidate, a particular execution person who will execute the particular action item, and a particular due date of the particular action item; receiving a registration operation of the particular action item selected from the action item candidate, the particular execution person who will execute the particular action item, and the particular due date of the particular action item; and requesting, to an action item management server for managing one or more action items, a registration request of the particular action item, the particular execution person who will execute the particular action item, and the particular due date of the particular action item in response to performing the registration operation of the particular action item.

The above described embodiment is also implemented as a user terminal capable of communicating with a collaboration work assisting system for assisting a collaboration work performable by a plurality of users. The user terminal comprising circuitry configured to display, on a display of the user terminal, a list display screen for displaying an action item candidate based on statement data of at least one user of the plurality of users received from the collaboration work assisting system, the list display screen including one or more selectable members for receiving a selection of a particular action item to be registered from the action item candidate; display, on the display of the user terminal, a setting screen for receiving a setting of the particular action item to be registered in accordance with a selection of a particular selectable member displayed on the user terminal; and request, the collaboration work assisting system, to register the selected particular action item, a particular execution person who will execute the particular action item, and a particular due date of the particular action item in response to receiving a registration operation of the particular action item on the setting screen.

The above described embodiment is also implemented as a non-transitory computer readable storage medium storing one or more instructions that, when executed by one or more processors, instructs the one or more processors to perform a method of processing information performable by a user terminal capable of communicating with a collaboration work assisting system for assisting a collaboration work performable by a plurality of users. The method includes displaying, on a display of the user terminal, a list display screen for displaying an action item candidate based on statement data of at least one user of the plurality of users received from the collaboration work assisting system, the list display screen including one or more selectable members for receiving a selection of a particular action item to be registered from the action item candidate; displaying, on the display of the user terminal, a setting screen for receiving a setting of the particular action item to be registered in accordance with a selection of a particular selectable member displayed on the user terminal; and requesting, the collaboration work assisting system, to register the selected particular action item, a particular execution person who will execute the particular action item, and a particular due date of the particular action item in response to receiving a registration operation of the particular action item on the setting screen.

As to the above described embodiments of this disclosure, an information processing system capable of assisting or supporting a registration of action item based on statement text data of user can be provided.

Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above. For example, a configuration that combines the first embodiment and the second embodiment, a configuration that combines the first embodiment and the third embodiment, a configuration that combines the second embodiment and the third embodiment, and a configuration that combines at least one of the first to third embodiments and the modification can be applied. The information processing system 1 described in the above described embodiments are just examples, and there are various system configurations depending on applications and purposes.

Each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The group of apparatuses or devices described in the above embodiment only represents one of a plurality of computing environments for implementing the embodiment disclosed herein.

In one embodiment, the sharing assistant server 11 and the schedule management server 12 may include a plurality of computing devices, such as server clusters. The plurality of computing devices are configured to communicate with each other over any type of communication link, including the communication network 50, shared memory, or the like, to perform the processing disclosed herein.

Further, the sharing assistant server 11, the schedule management server 12, the voice-to-text conversion server 13, the action item management server 14, and the user terminal 40 can be configured to share the processing steps disclosed herein in various combinations. For example, a process performable by a given unit may be performable by other unit. Similarly, the function performable by a given unit may be performable by other unit. Further, each of the functional units of the sharing assistant server 11, the schedule management server 12, the voice-to-text conversion server 13, and the action item management server 14 may be integrated into one apparatus or may be divided into a plurality of apparatuses.

What is claimed is:

1. An information processing system comprising:
   a collaborative work assisting system that assists collaborative work performable by a plurality of users operating respective user terminals of a plurality of user terminals, the collaborative work assisting system including
      a first hardware processor, and
      a first hardware memory storing program instructions that cause the first hardware processor to:
         transmit an action item candidate based on statement data of a user from among the plurality of users to each user terminal of the plurality of user terminals; and
   the plurality of user terminals, each user terminal of the plurality of user terminals including
      a second hardware processor, and
      a second hardware memory storing program instructions that cause the second hardware processor to:
         register one or more task management tools, the one or more task management tools including a scheduling tool;

receive a plurality of action item candidates including the action item candidate from the collaboration work assisting system;

display, on a display, the received plurality of action item candidates, and a screen for receiving a registration request to register a selected action item from among the action item candidates, a particular execution person who will execute the selected action item, and a due date of the selected action item;

receive a registration operation that requests registering of the selected action item, the particular execution person who will execute the selected action item, and the due date of the selected action item;

request an action item management server for managing one or more action items, to register the selected action item, the particular execution person who will execute the selected action item, and the due date of the selected action item in response to receiving the registration operation of the selected action item;

receive a selection of a task management tool from among the one or more registered task management tools, the selected task management tool being a transfer destination of the selected action item;

display the selected action item positioned on a display element corresponding to the due date of the selected action item, in a case where the selected task management tool is the scheduling tool, and display a window in response to receiving an operation of the selected action item displayed on the display element corresponding to the due date, the window including a display element that invokes an operation to update a progress status of the selected action item.

2. The information processing system according to claim wherein the program instructions further cause the first, hardware processor to:

detect the action item candidate based on the statement data including voice-text data converted from voice data spoken by the user or text data input the user.

3. The information processing system according to claim 2, wherein the program instructions further cause the first hardware processor to:

perform morphological analysis on the statement data of the one or more users to detect particular statement data of one sentence of the one or more users including a combination of at least two elements probably indicating a content of the selected action item, the particular execution person who will execute the selected action item, and the due date of the selected action item as the action item candidate.

4. The information processing system according to claim 2, wherein the program instructions further cause the first hardware processor to:

detect the action item candidate from the statement data input by the one or more users by applying a learning model that is learned by performing a machine-learning to detect the action item candidate from the statement data input by the one or more users, and wherein the learning model is updated by performing the machine learning based on a result of whether or not the detected action item candidate is registered in the action item management server and a result of whether or not a not-detected action item candidate is registered in the action item management server.

5. The information processing system according to claim 1, wherein the program instructions further cause the second processor to:

refer to a data table to select at least one of a speaker of the action item candidate, an upper-level authority person who has participated a group assisting the collaboration work, or an organizer of the group, each being a target of receiving the registration request, and instruct the display to, display a screen for receiving the registration request of the at least one of the speaker of the action item candidate, the upper-level authority person who has participated the group assisting the collaboration work, or the organizer of the group.

6. The information processing system according to claim 1, wherein the program instructions further cause the second processor to:

receive information indicating whether the registered selected action item is completed from the action item management server, and display, on the display, the information indicating whether the registered selected action item is completed at the action item management server.

7. A user terminal capable of communicating with a collaboration work assisting system for assisting a collaboration work performable by a plurality of users, the user terminal comprising circuitry configured to:

register one or more task management tools, the one or more task management tools including a scheduling tool;

receive an action item candidate based on statement data of a user from among the plurality of users from the collaboration work assisting, system;

display, on a display, the received action item candidate, and a screen for receiving a registration request to register a selected action item from among the extracted action item candidates, a particular execution person who will execute the selected action item, and a due date of the selected action item;

receive a registration operation of the selected action item, the particular execution person who will execute the selected action item, and the due date of the selected action item; and request, to an action item management server for managing one or more action items, a registration request of the selected action item, the particular execution person who will execute the selected action item, and the due date of the selected action item in response to receiving the registration operation of the selected action item;

receive a selection of a task management tool from among the one or more registered task management tools, the selected task management tool being a transfer destination of the selected action item;

display the selected action item positioned on a display element corresponding to the due date of the selected action item, in a case where the selected task management tool is the scheduling tool; and display a window in response to receiving an operation of the selected action item displayed on the display element corresponding to the due date, the window including a display element that invokes an operation to update a progress status of the selected action item.

8. A method of processing information performable by a user terminal capable of communicating with a collaboration work assisting system for assisting a collaboration work performable by a plurality of users, the method comprising:

receiving an action item candidate based on statement data of a user from among the plurality of users from the collaboration work assisting system;

displaying, on a display, the received action item candidate, and a screen for receiving a registration request to register a selected action item from among the extracted action item candidates, a particular execution person who will execute the selected action item, and a due date of the selected action item;

receiving a registration operation of the selected action item selected from the action item candidate, the particular execution person who will execute the selected action item, and the due date of the selected action item; and requesting, to an action item management server for managing one or more action items, a registration request of the selected action item, the particular execution person who will execute the selected action item, and the due date of the selected action item in response to receiving the registration operation of the selected action item;

receiving a selection of a task management tool from among the one or more registered task management tools, the selected task management tool being a transfer destination of the selected action item;

displaying the selected action item positioned on a display element corresponding to the due date of the selected action item, in a case where the selected task management tool is the scheduling tool; and displaying a window in response to receiving an operation of the selected action item displayed on the display element corresponding to the due date, the window including a display element to invoke an operation to update a progress status of the selected action item.

* * * * *